(12) United States Patent
Masatoki et al.

(10) Patent No.: US 12,384,928 B2
(45) Date of Patent: Aug. 12, 2025

(54) WATER-BASED INKJET INK AND METHOD FOR PRODUCING INKJET PRINTED MATERIAL

(71) Applicants: artience Co., Ltd., Tokyo (JP); TOYOCOLOR CO., LTD., Tokyo (JP)

(72) Inventors: Mutsuko Masatoki, Tokyo (JP); Atsushi Yoda, Tokyo (JP); Yuji Kameyama, Tokyo (JP)

(73) Assignees: artience Co., Ltd., Tokyo (JP); TOYOCOLOR CO., LTD., Tokyo (JP)

( * ) Notice: Subject to any disclaimer, the term of this patent is extended or adjusted under 35 U.S.C. 154(b) by 292 days.

(21) Appl. No.: 17/927,668

(22) PCT Filed: Mar. 22, 2021

(86) PCT No.: PCT/JP2021/011633
§ 371 (c)(1),
(2) Date: Nov. 23, 2022

(87) PCT Pub. No.: WO2021/240969
PCT Pub. Date: Dec. 2, 2021

(65) Prior Publication Data
US 2023/0212412 A1 Jul. 6, 2023

(30) Foreign Application Priority Data
May 26, 2020 (JP) ................. 2020-091677

(51) Int. Cl.
| | |
|---|---|
| *C09D 11/322* | (2014.01) |
| *B41J 2/01* | (2006.01) |
| *B41J 2/21* | (2006.01) |
| *B41M 7/00* | (2006.01) |
| *C08K 5/23* | (2006.01) |
| *C09D 11/10* | (2014.01) |
| *C09D 11/107* | (2014.01) |
| *C09D 11/38* | (2014.01) |

(52) U.S. Cl.
CPC .............. *C09D 11/322* (2013.01); *B41J 2/01* (2013.01); *B41J 2/2107* (2013.01); *C08K 5/23* (2013.01); *C09D 11/10* (2013.01); *C09D 11/107* (2013.01); *C09D 11/38* (2013.01); *B41M 7/009* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| | | |
|---|---|---|
| 2002/0096086 A1 | 7/2002 | Chisholm et al. |
| 2005/0034253 A1 | 2/2005 | Meier et al. |
| 2008/0241722 A1 | 10/2008 | Schmidt et al. |
| 2009/0030144 A1 | 1/2009 | Mizutani et al. |
| 2009/0181219 A1* | 7/2009 | Saito ............... C09D 11/322 524/588 |

(Continued)

FOREIGN PATENT DOCUMENTS

| | | |
|---|---|---|
| CN | 102482521 A | 5/2012 |
| CN | 103360867 A | 10/2013 |

(Continued)

OTHER PUBLICATIONS

International Search Report for PCT/JP2021/011633 dated Jun. 22, 2021.

(Continued)

*Primary Examiner* — Manish S Shah
(74) *Attorney, Agent, or Firm* — Sughrue Mion, PLLC

(57) ABSTRACT

An embodiment relates to an inkjet ink containing a mixed crystal pigment including two or more naphthol-based azo pigments, a binder resin (a-1) having an acid value of 1 to 80 mgKOH/g, a surfactant, and a water-soluble organic solvent, in which the amount of a water-soluble organic solvent having a boiling point of 240° C. or more at 1 atmosphere is 8% by mass or less relative to the total amount of the water-based inkjet ink.

10 Claims, No Drawings

(56) References Cited

U.S. PATENT DOCUMENTS

| | | | |
|---|---|---|---|
| 2009/0196995 A1* | 8/2009 | Saito | C09D 11/322 |
| | | | 427/256 |
| 2009/0239996 A1* | 9/2009 | Saito | C09D 11/322 |
| | | | 524/556 |
| 2011/0143270 A1* | 6/2011 | Seto | C09D 11/322 |
| | | | 430/7 |
| 2011/0230603 A1* | 9/2011 | Yoda | C09D 11/322 |
| | | | 524/95 |
| 2012/0156449 A1 | 6/2012 | Tateishi et al. | |
| 2013/0079447 A1* | 3/2013 | Koike | C09D 11/106 |
| | | | 524/377 |
| 2013/0257034 A1 | 10/2013 | Shimohara et al. | |
| 2014/0066550 A1* | 3/2014 | Shigemori | C09D 11/322 |
| | | | 524/190 |
| 2017/0183522 A1* | 6/2017 | Chaffins, Jr. | C09D 11/38 |
| 2018/0312704 A1 | 11/2018 | Rohr et al. | |
| 2019/0077978 A1* | 3/2019 | Suzuki | C09D 11/322 |
| 2019/0330486 A1* | 10/2019 | Sugihara | C09D 11/322 |
| 2020/0018878 A1* | 1/2020 | Chuko | C09D 4/06 |
| 2020/0199387 A1* | 6/2020 | Utsugi | B41J 2/01 |
| 2021/0238431 A1 | 8/2021 | Yoda et al. | |
| 2022/0073772 A1* | 3/2022 | Yoda | C09D 11/322 |

FOREIGN PATENT DOCUMENTS

| | | |
|---|---|---|
| CN | 103424987 A | 12/2013 |
| EP | 3 572 470 A1 | 11/2019 |
| EP | 3 805 323 A1 | 4/2021 |
| JP | 2004-510012 A | 4/2004 |
| JP | 2004-189992 A | 7/2004 |
| JP | 2004-269607 A | 9/2004 |
| JP | 2005-060708 A | 3/2005 |
| JP | 2007-186641 A | 7/2007 |
| JP | 2009-024072 A | 2/2009 |
| JP | 2010-195907 A | 9/2010 |
| JP | 2015-183156 A | 10/2015 |
| JP | 2016-204514 A | 12/2016 |
| JP | 2017-155092 A | 9/2017 |
| JP | 2018-528988 A | 10/2018 |
| JP | 2019-210452 A | 12/2019 |
| JP | 2019-214717 A | 12/2019 |
| WO | 2005/019346 A1 | 3/2005 |
| WO | 2014/156569 A1 | 10/2014 |
| WO | 2019/235628 A1 | 12/2019 |

OTHER PUBLICATIONS

Extended European Search Report dated Nov. 8, 2023 in Application No. 21814440.0.

Office Action dated Mar. 31, 2023 from the Chinese Patent Office in Application No. 202180035516.8.

Chun-Long Zhou, "Advance in Adjustment Technologies of Practical Diameter for Organic Pigment", Jul. 6, 2007, Fine and Specialty Chemicals, vol. 15, No. 13, pp. 9-16 (6 total pages).

* cited by examiner

WATER-BASED INKJET INK AND METHOD FOR PRODUCING INKJET PRINTED MATERIAL

CROSS REFERENCE TO RELATED APPLICATIONS

This application is a National Stage of International Application No. PCT/JP2021/011633 filed Mar. 22, 2021, claiming priority based on Japanese Patent Application No. 2020-091677 filed May 26, 2020.

TECHNICAL FIELD

An embodiment of the present invention relates to a water-based inkjet ink and an inkjet ink printing method using the water-based inkjet ink.

BACKGROUND ART

Together with smaller lot sizes in printing and a diversification of printing needs, digital printing systems are spreading rapidly. Since digital printing systems do not require plates, it is possible to accommodate small lots, reduce costs, and reduce the size of printing devices.

An inkjet printing system, which is a type of digital printing system, is a system in which very small droplets of ink are jetted from an inkjet head and made to land on a recording medium to form images and text on the recording medium (hereinafter, recording mediums on which images and/or text is recorded are collectively referred to as "printed materials"). Compared to other digital printing systems, the inkjet printing system is superior in terms of the size and cost of printing devices, the running cost during printing, the ease of implementing full-color printing, and so forth.

A wide range of inks are used in inkjet printing systems, such as oil-based inks, solvent-based inks, active energy ray curable-based inks, and water-based inks. Until now, solvent-based and active energy ray curable-based inks have been used in industrial printing applications. However, as a result of consideration and countermeasures for potential harm to people and the environment in recent years, there is an increasing demand for water-based inks.

Furthermore, in recent years, with the notable improvement in the performance of inkjet heads, inkjet printing systems are expected to expand into the industrial printing market and package printing market in which plate-base printing systems such as offset printing systems have been conventionally used. In these printing markets, the productivity and color reproducibility of printed materials are extremely important. For example, many special color inks are used in offset printing systems to produce printed materials having excellent color reproduction ranges, and it is therefore important to achieve excellent color reproducibility in order to achieve the practical application of inkjet printing systems in the above-mentioned printing markets.

To achieve excellent color reproducibility, it is important to determine the degree of color reproduction potential of the colorants used, particularly the three process colors of yellow, cyan, and magenta. As described in Patent Document 1, it is also possible to use special color inks in inkjet printing systems to improve color reproducibility, but from the viewpoint of reducing the cost and size of inkjet printing devices, this is not a preferable measure. Therefore, the issue of what to use as colorants for the above three colors becomes extremely important.

Generally, colorants are broadly classified into dyes and pigments. From thereamong, dyes have the advantages of good color development and low cost but have the disadvantage of easy discoloration with poor water resistance, light resistance, and so forth. In the industrial printing market and package printing market mentioned above, these disadvantages can often be fatal problems, and thus pigments are used as colorants in the inks used in these markets.

In general, pigments used in magenta inks include laked azo pigments, naphthol-based azo pigments, quinacridone pigments, diketopyrrolopyrrole pigments, and the like. From thereamong, naphthol-based azo pigments (hereinafter, also referred to simply as "naphthol-based pigments") have been actively used as colorants for inkjet inks in recent years due to being comparatively inexpensive, having high tinting strength, and many of them having superior characteristics compared to the other pigments listed above. However, naphthol-based pigments have the disadvantages of poor dispersion stability and poor discharge stability from inkjet heads.

For example, Patent Document 2 discloses a pigment composition in which C.I. Pigment Red 150, which is a naphthol-based pigment, and a compound that is different from the C.I. Pigment Red 150 are synthesized simultaneously. According to Patent Document 2, a pigment composition having good dispersion stability can be obtained, but there is a problem in that a dispersion stability improvement effect cannot be obtained depending on the binder resin, solvent, and so forth used in combination with the pigment composition.

Furthermore, it is extremely difficult to solve the above-mentioned issues and to also achieve the recent market demand for improved substrate versatility. For example, paper substrates are commonly used for water-based ink printing, but there are various types of paper substrates and each have different surface processing states, porosities, and pore size distributions. Furthermore, when considering expansion into the package printing market, it is necessary to accommodate the plastic substrates commonly used in these markets. In order to improve substrate versatility, it is necessary to accommodate various recording mediums that are completely different in terms of permeability (drying properties) and fixability (rub fastness).

Patent Document 3 discloses a water-based inkjet magenta ink containing two types of pigments that do not form a solid solution (mixed crystal) with each other and have different hue angles, but this was not necessarily favorable from the viewpoint of substrate versatility. Specifically, the water-based inkjet magenta ink had a problem of poor color development on high-quality paper, which is often used in the industrial printing market.

PRIOR ART DOCUMENTS

Patent Documents

Patent Document 1: Japanese Unexamined Patent Application Publication No. 2009-24072
Patent Document 2: Japanese Unexamined Patent Application Publication No. 2010-195907
Patent Document 3: Japanese Unexamined Patent Application Publication No. 2017-155092

SUMMARY OF THE INVENTION

Problems to be Solved by the Invention

An embodiment of the present invention has been devised in order to solve the aforementioned problems, and an object thereof is to provide a water-based inkjet ink containing a naphthol-based mixed crystal pigment having excellent image quality, color development (density), and color reproducibility on various recording mediums, and also excellent drying properties, printed material resistance (rub fastness), dispersion stability, and discharge stability.

Means to Solve the Problems

As a result of intensive research aimed at solving the above problems, the inventors of the present invention discovered that combined use of a binder resin having a specific acid value, a surfactant, a water-soluble organic solvent, and a naphthol-based mixed crystal pigment, and also limiting the amount of a water-soluble organic solvent having a specific boiling point were able to solve the problems outlined above, thus enabling the inventors to complete the present invention.

In other words, an embodiment of the present invention relates to a water-based inkjet ink containing a colorant, a binder resin (A), a surfactant, and a water-soluble organic solvent, in which the colorant includes a mixed crystal pigment containing two or more naphthol-based azo pigments, the binder resin (A) includes a binder resin (a-1) having an acid value of 1 to 80 mgKOH/g, and an amount of a water-soluble organic solvent having a boiling point of 240° C. or more at 1 atmosphere is 8% by mass or less relative to the total amount of the water-based inkjet ink.

Furthermore, an embodiment of the present invention relates to the water-based inkjet ink described above, in which the binder resin (a-1) includes at least one type of resin selected from the group consisting of a (meth)acrylic resin, a styrene-(meth)acrylic resin, a urethane resin, a urethane-(meth)acrylic composite resin, and a polyolefin resin.

Furthermore, an embodiment of the present invention relates to the water-based inkjet ink described above, in which the binder resin (a-1) includes a polyolefin resin, and at least one type of resin selected from the group consisting of a (meth)acrylic resin and a styrene-(meth)acrylic resin.

Furthermore, an embodiment of the present invention relates to the water-based inkjet ink described above, in which the water-soluble organic solvent includes an alkanediol of 2 to 5 carbon atoms.

Furthermore, an embodiment of the present invention relates to the water-based inkjet ink described above, in which the total amount of a nitrogen-containing compound having a pKa value of 2 or less at 25° C. and a nitrogen-containing compound having a pKa value of 10 or more at 25° C. is 3% by mass or less relative to the total amount of the water-based inkjet ink.

Furthermore, an embodiment of the present invention relates to the water-based inkjet ink described above, in which the two or more naphthol-based azo pigments include a compound having a structure represented by general formula (1) shown below, General Formula (1):

[Chemical formula 1]

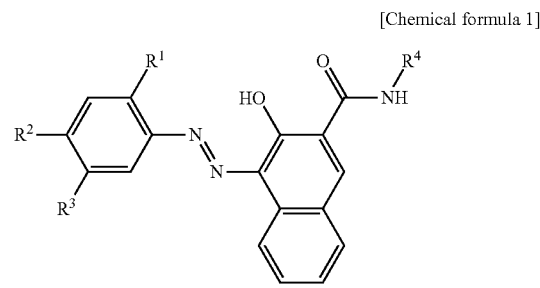

wherein, in general formula (1), $R^1$, $R^2$, and $R^3$ are each independently any one of a hydrogen atom, an alkyl group of 1 to 2 carbon atoms, an alkoxy group of 1 to 2 carbon atoms, an anilide group, a carbamoyl group, a methoxycarbonyl group, an ethoxycarbonyl group, an amino group, a nitro group, a sulfonamide group (aminosulfonyl group), a methylaminosulfonyl group, or an ethylaminosulfonyl group, and $R^4$ is any one of a hydrogen atom, an alkyl group of 1 to 2 carbon atoms, or a group having a structure represented by general formula (2) shown below, General Formula (2):

[Chemical formula 2]

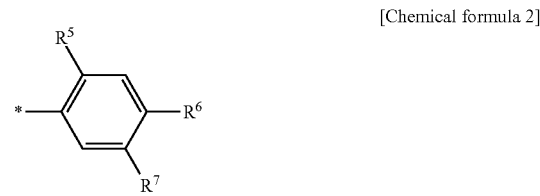

wherein, in general formula (2), $R^5$ is any one of a hydrogen atom, a chlorine atom, a bromine atom, an alkyl group of 1 to 2 carbon atoms, an alkoxy group of 1 to 2 carbon atoms, an amino group, or a nitro group, $R^6$ and $R^7$ are each independently any one of a hydrogen atom, a chlorine atom, a bromine atom, an alkyl group of 1 to 2 carbon atoms, an alkoxy group of 1 to 2 carbon atoms, an amino group, or a nitro group, or $R^6$ and $R^7$ are bonded to each other to form an imidazolidinone ring, and the position of * is a bonding site.

Furthermore, an embodiment of the present invention relates to the water-based inkjet ink described above, in which the two or more naphthol-based azo pigments include a compound having a structure represented by general formula (3) shown below, General Formula (3):

[Chemical formula 3]

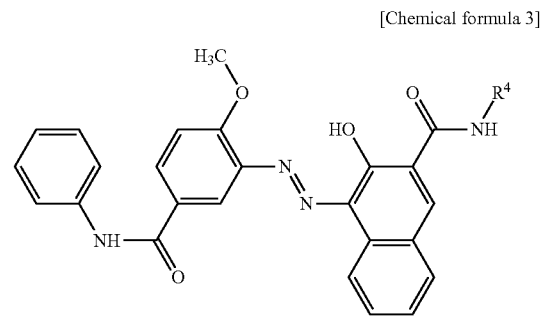

wherein, in general formula (3), $R^4$ is any one of a hydrogen atom, an alkyl group of 1 to 2 carbon atoms, or a group having a structure represented by general formula (2) shown below, General Formula (2):

[Chemical formula 4]

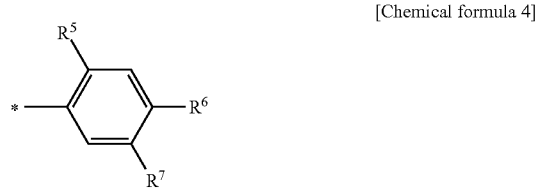

wherein, in general formula (2), $R^5$ is any one of a hydrogen atom, a chlorine atom, a bromine atom, an alkyl group of 1 to 2 carbon atoms, an alkoxy group of 1 to 2 carbon atoms, an amino group, or a nitro group, $R^6$ and $R^7$ are each independently any one of a hydrogen atom, a chlorine atom, a bromine atom, an alkyl group of 1 to 2 carbon atoms, an alkoxy group of 1 to 2 carbon atoms, an amino group, or a nitro group, or $R^6$ and $R^7$ are bonded to each other to form an imidazolidinone ring, and the position of * is a bonding site.

Furthermore, an embodiment of the present invention relates to the water-based inkjet ink described above, in which the two or more naphthol-based azo pigments include C.I. Pigment Red 150.

Furthermore, an embodiment of the present invention relates to the water-based inkjet ink described above, in which the two or more naphthol-based azo pigments include 10 to 80% by mole of C.I. Pigment Red 150 in the total amount of the naphthol-based pigments.

Furthermore, an embodiment of the present invention relates to a method for producing an inkjet printed material including discharging and applying the water-based inkjet ink described above from an inkjet head onto a non-permeable substrate or a permeable substrate.

Effects of the Invention

According to an embodiment of the present invention, it has become possible to provide a water-based inkjet ink including a naphthol-based mixed crystal pigment having excellent image quality, color development (density), and color reproducibility on various recording mediums, and also excellent drying properties, printed material resistance (rub fastness), dispersion stability, and discharge stability.

EMBODIMENTS FOR CARRYING OUT THE INVENTION

The water-based inkjet ink of the present invention (hereafter, also referred to simply as "water-based ink" or "ink") is described below using a series of preferred embodiments. Note that herein "aqueous medium" means a medium composed of a liquid containing at least water.

In general, while naphthol-based pigments have excellent color development, they are likely to form needle-shaped or column-shaped particles and have large particle interactions. Furthermore, they are known to have poor dispersion stability due to their molecular structure (see Japanese Unexamined Patent Application Publication No. 2016-108450 and so forth).

Meanwhile, a mixed crystal pigment (solid-solution pigment) is a pigment in which a crystal lattice is formed with a plurality of types of pigment molecules as constituent elements (the details are explained later). For example, the crystal X-ray diffraction pattern of a mixed crystal pigment is different from the crystal X-ray diffraction pattern obtained when a plurality of pigments are simply mixed. Furthermore, it is known that physical characteristics such as primary particle size and optical characteristics such as color development and color reproducibility also change due to the formation of mixed crystals. In particular, compared to when a plurality of pigments are simply mixed, the optical properties are improved by adjusting the type and blend ratio of the plurality of pigment molecules, and therefore mixed crystal pigments are often used as colorants for water-based inkjet inks.

However, pigment dispersions using mixed crystal pigments have a problem of poor dispersion stability. Furthermore, it is known that a mixed crystal pigment containing two or more naphthol-based azo pigments (also referred to as a "naphthol-based mixed crystal pigment" herein) has a smaller primary particle size than when each naphthol-based pigment constituting the mixed crystal pigment is used alone (see Japanese Unexamined Patent Application Publication No. 2010-195907 and so forth).

In a water-based ink, a pigment is generally present in an aqueous medium in a dispersed state. However, in the case of a naphthol-based mixed crystal pigment, in addition to the poor dispersion stability and small primary particle size, due also to the characteristics of the naphthol-based pigments themselves mentioned above, the dispersed state is likely to be destroyed due to subtle balance changes in the water-based ink. In the case of inkjet inks in particular, it is necessary to control physical property values such as viscosity, surface tension, and pH for stable discharge from an inkjet head, and the materials that can be used are limited, and therefore adjustment of the above balance is particularly difficult. In other words, in a water-based inkjet ink containing a naphthol-based mixed crystal pigment, it is a considerable challenge for persons skilled in the art to both maintain a suitable dispersed state and achieve the characteristics as an inkjet ink.

In addition, it is extremely difficult to solve the above-mentioned issues and to also achieve the recent market demand for improved substrate versatility. In particular, when a water-based ink containing a naphthol-based mixed crystal pigment is printed on a paper substrate that is porous and has a high porosity such as uncoated paper, due to the small primary particle size mentioned above, there is a risk that the naphthol-based mixed crystal pigment may penetrate and diffuse into the interior of the substrate, leading to poor color development and color reproducibility.

Furthermore, in order to ensure wet spreading on uncoated paper and to obtain a printed material having excellent color development, color reproducibility, and image quality, high-boiling point solvents having high surface tension and low volatility are often used in water-based inkjet inks. However, when printing on non-permeable substrates or the like described later, water-based ink droplets are likely to remain for a long time on the recording medium, the ink droplets coalesce, and as a result bleeding and density irregularities are liable to occur. Furthermore, there is also a possibility that the rub fastness of a printed material may deteriorate due to the high-boiling point solvent remaining in the printed material.

In order to solve the above problems, for example, it is feasible to implement measures such as also using a solvent having high volatility or reducing the amount of a solvent having low volatility and a high boiling point. However, highly volatile solvents are generally likely to destroy the dispersed state of pigments, making it difficult to use them with pigments that have strong intermolecular interactions such as naphthol-based mixed crystal pigments. Furthermore, there may also be problems such as drying occurring before sufficient wet spreading on the recording medium which results in void hickeys, or drying and solidifying on nozzle surfaces of the inkjet head which results in discharge deflection and discharge faults. In addition, when uncoated paper is used as a recording medium, highly volatile solvents permeate into the interior of the uncoated paper, and together therewith pigments also penetrate into the interior of the uncoated paper, and therefore there is a risk that the color development and color reproducibility of the printed material may deteriorate.

Meanwhile, binder resins are sometimes added to water-based inkjet inks for the purpose of improving the rub fastness of printed materials. However, acid groups and the like present in a binder resin may interact with polar groups in a pigment and materials that contribute to the dispersion of the pigment, and the dispersed state may be destroyed. In particular, as described above, naphthol-based mixed crystal pigments have a high risk of deterioration in dispersion stability due to the small primary particle size and large particle interaction. Furthermore, inks containing a binder resin are likely to dry and solidify on nozzle surfaces, and discharge stability is also likely to decline.

As a result of intensive research in order to solve the above problems, the inventors of the present invention discovered that, by combined use of a binder resin having a specific acid value, a surfactant, and a water-soluble organic solvent, and also limiting the amount of a water-soluble organic solvent having a specific boiling point, it is possible to obtain a water-based inkjet ink that achieves dispersion stability, discharge stability, and favorable drying properties, and also printed material image quality, rub fastness, color development, and color reproducibility. The reasons for this are not clear, but the following is feasible.

First, a water-based ink of an embodiment of the present invention contains a binder resin (a-1) which has a low acid value and low affinity with water, which is the main component of the ink. Therefore, it is thought that the binder resin (a-1) quickly moves to the gas-liquid interface during the drying process after droplets of the water-based ink have landed on the recording medium. Furthermore, together with the ink droplets drying on the recording medium, as the abundance ratio of water-soluble organic solvent increases, the binder resin (a-1) dissolves in the water-soluble organic solvent, causing localized thickening or film formation at the gas-liquid interface. As a result, it is thought that bleeding and density irregularities among ink droplets are suppressed, and image quality be improved. Note that this effect is more pronounced when a non-permeable substrate or a low-permeation substrate is used, in which water-based inks do not or are unlikely to permeate into the interior of the substrate. However, when a permeable substrate such as uncoated paper is used as a recording medium, it is thought that the binder resin (a-1) moves in such a way as to fill voids in the surface of the substrate, thereby suppressing the penetration and diffusion of pigments into the interior of the recording medium, and making it possible to prevent deterioration in color development and color reproducibility.

Furthermore, the amount of the acid value present in the binder resin (a-1) is specified and the amount of acid groups in the binder resin (a-1) is limited, thereby maintaining the dispersed state of the naphthol-based mixed crystal pigment.

However, once the binder resin (a-1) having a low acid value forms a film, it does not easily return to its original state even in the presence of an aqueous medium. While this is suitable from the viewpoint of improving the rub fastness of a printed material, on the other hand, if ink forms a film on a nozzle surface of the inkjet head, at least a part of the nozzle is blocked, and furthermore, since it is difficult to return to the state prior to the film forming, there is a risk that this may cause a deterioration in discharge stability. Thus, in an embodiment of the present invention, a surfactant is additionally used to solve this problem. In general, surfactants have hydrophobic groups and hydrophilic groups in their molecules. In the ink of an embodiment of the present invention, the binder resin (a-1) and the hydrophobic groups in the surfactant molecules, and water and the hydrophilic groups in the surfactant molecules, are considered to have an affinity with each other. Therefore, it is thought that a state is entered in which the binder resin (a-1) is protected by the surfactant in the ink within the inkjet head, and film formation of the binder resin (a-1) is suppressed. Meanwhile, in the ink droplets that have landed on the recording medium, with the influence of changes in the abundance ratios of constituent materials in the ink that accompany drying, the surfactant is thought to move to the solid-liquid interface formed by the recording medium and the ink. As a result, wet spreading of ink droplets occurs quickly on the recording medium, and combined with the thickening or film-forming effect brought about by the binder resin (a-1), the ink is considered to be excellent in terms of the image quality and drying properties of printed materials. Note that this effect is prominent when non-permeable substrates and low-permeation substrates are used as recording mediums.

When a permeable substrate is used as a recording medium, generally, the presence of a surfactant leads to excessive permeation and diffusion of a water-based ink, and the color development, color reproducibility, and image quality of printed materials are liable to deteriorate. However, as described above, the water-based ink of an embodiment of the present invention contains a binder resin (a-1), and therefore permeation and diffusion into the interior of the substrate are suppressed by the binder resin (a-1), and the above deterioration in quality does not occur.

In addition, the water-based inkjet ink of an embodiment of the present invention may contain a water-soluble organic solvent having a boiling point of 240° C. or more at 1 atmosphere (hereinafter also referred to as a "high-boiling point organic solvent"), but if a high-boiling point organic solvent is included, it is included at 8% by mass or less relative to the total amount of the water-based inkjet ink, and is preferably not included. Generally, high-boiling point organic solvents are compounds that have a large number of functional groups that can form hydrogen bonds and/or have a large molecular weight. Therefore, the high-boiling point organic solvent and the naphthol-based mixed crystal pigment form hydrogen bonds, and materials that contribute to the dispersion of the naphthol-based mixed pigment preferentially cause interaction with the high-boiling point organic solvent, and as a result there is a risk that the dispersed state of the pigment may be destroyed. In addition, high-boiling point organic solvents do not dry easily, and therefore there is also concern that they may remain for a long time in a printed material after printing especially when a permeable substrate is used as the recording medium, and that this may lead to deterioration in drying properties, rub fastness, and image quality. Based on the above considerations, as a result of intensive research, the inventors discovered that by limiting the amount of a water-soluble organic solvent having a boiling point of 240° C. or more at 1 atmosphere to 8% by mass or less, deterioration in dispersion stability, drying properties, and the rub fastness and image quality of a printed material can be prevented.

As described above, the constituent elements of an embodiment of the present invention are considered to be essential in order to obtain a water-based inkjet ink that achieves dispersion stability, discharge stability, and drying properties, and also printed material image quality, rub fastness, color development, and color reproducibility, while including a naphthol-based mixed crystal pigment.

Next, each of the components contained in the water-based inkjet ink of an embodiment of the present invention will be described below.

<Naphthol-Based Mixed Crystal Pigment>

The water-based inkjet ink of an embodiment of the present invention contains a mixed crystal pigment containing two or more naphthol-based pigments as a colorant. As described above, a naphthol-based mixed crystal pigment has excellent color development, and by using a naphthol-based mixed crystal pigment as an ink having a magenta color and/or an ink having a red color, a printed material having excellent color development and color reproducibility can be obtained.

The term "mixed crystal" herein refers to a material in which two or more compounds are mutually soluble and form a uniform solid phase as a whole, also called a solid solution. However, "mixed crystal" is clearly distinguished from a mixture in which the two or more compounds are simply mixed.

Note that whether or not pigments form mixed crystal can be easily verified by X-ray diffraction analysis or the like. When a mixture in which a plurality of pigments are simply mixed is used as a sample, the obtained X-ray diffraction pattern is a pattern in which the X-ray diffraction patterns of each pigment are superposed, and the intensity of each diffraction peak depends on the blend ratio of each pigment. In contrast, when a plurality of pigments form mixed crystal, a different X-ray diffraction pattern is obtained than when the plurality of pigments are simply mixed. Specifically, phenomena such as the following are observed: new diffraction peaks are obtained, the intensity of each diffraction peak does not depend on the pigment blend ratio, and the half value width of the diffraction peaks becomes larger.

Furthermore, a naphthol-based mixed crystal pigment can be produced using the methods described in, for example, Japanese Unexamined Patent Application Publication Nos. 2005-107147 and 2010-195907.

As a naphthol-based pigment forming a naphthol-based mixed crystal pigment, a laked azo pigment, insoluble azo pigment, or the like can be used, and in terms of tinting strength, dispersion stability, and so forth, it is preferable to use an insoluble azo pigment. Furthermore, examples of the insoluble azo pigment include a β-naphthol pigment, naphthol AS pigment, and the like, and in terms of tinting strength, dispersion stability, and so forth, a naphthol AS pigment in particular can be used favorably.

Examples of the laked azo pigment include C.I. Pigment Red 48:1, 48:2, 48:3, 48:4, 49, 49:1, 49:2, 50, 50:1, 50:2, 51, 52, 52:1, 52:2, 53, 53:1, 55, 56, 57, 57:1, 57:2, 58, 58:1, 58:2, 60, 60:1, 62, 63:1, 63:2, 64, 64:1, 65, 66, 67, 68, 69, 70, 99, 115, 117, 151, 193, 200, 201, 243, 247, and the like.

Furthermore, examples of the β-naphthol pigment include C.I. Pigment Red 1, 3, 4, 6, 40, 93, 144, and the like.

Furthermore, examples of the naphthol AS pigment include 2, 5, 7, 8, 9, 10, 11, 12, 13, 14, 15, 16, 17, 18, 19, 20, 21, 22, 23, 31, 32, 95, 112, 114, 119, 136, 146, 147, 148, 150, 162, 164, 170, 171, 175, 176, 183, 184, 185, 187, 188, 208, 210, 238, 242, 245, 253, 256, 258, 261, 266, 268, 269, and the like.

From among the naphthol-based pigments listed above, in terms of tinting strength, as the laked azo pigment, it is preferable to use one or more selected from the group consisting of C.I. Pigment Red 48:1, 48:2, 48:3, 53:1, 57:1, 119, and 253, and it is particularly preferable to use one or more selected from the group consisting of C.I. Pigment Red 48:1, 48:2, 48:3, and 57:1.

Furthermore, as the insoluble azo pigment, it is preferable to use one or more selected from the group consisting of C.I. Pigment Red 17, 22, 23, 31, 32, 112, 114, 146, 147, 150, 163, 166, 170, 176, 183, 184, 185, 187, 188, 208, 221, 245, 258, 266, 268, and 269, and it is particularly preferable to use one or more selected from the group consisting of C.I. Pigment Red 17, 22, 23, 31, 32, 114, 146, 147, 150, 170, 176, 184, 185, 245, 258, 266, 268, and 269.

In addition, as the insoluble azo pigment, it is also preferable to use a compound having a structure represented by general formula (1) shown below.

General Formula (1):

[Chemical formula 5]

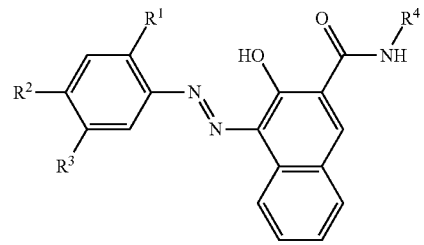

In general formula (1), $R^1$, $R^2$, and $R^3$ are each independently any one of a hydrogen atom, an alkyl group of 1 to 2 carbon atoms, an alkoxy group of 1 to 2 carbon atoms, an anilide group, a carbamoyl group, a methoxycarbonyl group, an ethoxycarbonyl group, an amino group, a nitro group, a sulfonamide group (aminosulfonyl group), a methylaminosulfonyl group, or an ethylaminosulfonyl group. Furthermore, $R^4$ is any one of a hydrogen atom, an alkyl group of 1 to 2 carbon atoms, or a group having a structure represented by general formula (2) shown below.

General Formula (2):

[Chemical formula 6]

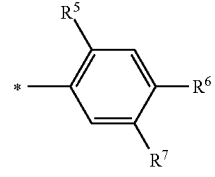

In general formula (2), $R^5$ is any one of a hydrogen atom, a chlorine atom, a bromine atom, an alkyl group of 1 to 2 carbon atoms, an alkoxy group of 1 to 2 carbon atoms, an amino group, or a nitro group. Furthermore, $R^6$ and $R^7$ are each independently any one of a hydrogen atom, a chlorine atom, a bromine atom, an alkyl group of 1 to 2 carbon atoms, an alkoxy group of 1 to 2 carbon atoms, an amino group, or a nitro group, or $R^6$ and $R^7$ are bonded to each other to form an imidazolidinone ring. Furthermore, the position of * is a bonding site.

Note that from among the pigments mentioned above as insoluble azo pigments that can be preferably used, examples of a pigment having a structure represented by general formula (1) include C.I. Pigment Red 17, 22, 23, 31, 32, 114, 146, 147, 150, 170, 176, 184, 185, 245, 266, 268, and 269.

From among compounds having a structure represented by general formula (1), in terms of color development and dispersion stability, a preferable compound (corresponding to general formula (3)) is one in which $R^1$ is a methoxy group, $R^2$ is a hydrogen atom, and $R^3$ is an anilide group in general formula (1), and it is particularly preferable that a naphthol-based pigment forming the naphthol-based mixed crystal pigment be composed of only a compound in which $R^1$ is a methoxy group, $R^2$ is a hydrogen atom, and $R^1$ is an anilide group in general formula (1). Specific examples of a compound in which $R^1$ is a methoxy group, $R^2$ is a hydrogen atom, and $R^3$ is an anilide group in general formula (1) include C.I. Pigment Red 31, 32, 146, 147, 150, 176, 269, and the like.

In an embodiment of the present invention, as a naphthol-based mixed crystal pigment, it is preferable to use a pigment obtained by mixed crystallization of two or more laked azo pigments, and/or a pigment obtained by mixed crystallization of two or more insoluble azo pigments. From thereamong, in terms of tinting strength and dispersion stability, it is preferable to use a naphthol-based mixed crystal pigment composed of two or more insoluble azo pigments. In addition, it is more preferable that a naphthol-based pigment forming a mixed crystal pigment composed of two or more naphthol-based pigments be a pigment obtained by mixed crystallization of two or more compounds having a structure represented by general formula (1), or that a naphthol-based pigment forming a mixed crystal pigment composed of two or more naphthol-based pigments include C.I. Pigment Red 150. Furthermore, in terms of tinting strength, color reproducibility, dispersion stability, and so forth, it is particularly preferable to use a mixed crystal pigment that contains C.I. Pigment Red 150 and a compound having a structure represented by general formula (1) and in which $R^1$ is a methoxy group, $R^2$ is a hydrogen atom, and $R^3$ is an anilide group in general formula (1).

When a naphthol-based mixed crystal pigment contains C.I. Pigment Red 150 as a constituent element, it is preferable to select one or more selected from the group consisting of C.I. Pigment Red 17, 22, 23, 31, 32, 112, 114, 146, 147, 163, 166, 170, 176, 183, 184, 185, 187, 188, 208, 221, 258, 268, and 269 as a naphthol-based pigment subjected to mixed crystallization with the C.I. Pigment Red 150. From thereamong, in terms of tinting strength, it is particularly preferable to select one or more selected from the group consisting of C.I. Pigment Red 31, 32, 146, 147, 184, 185, and 269.

Note that, as the naphthol-based pigment, when C.I. Pigment Red 150 and another naphthol-based pigment are subjected to mixed crystallization, the blend amount of the C.I. Pigment Red 150 is preferably 0.1 to 99 mol %, more preferably 10 to 80 mol %, and particularly preferably 20 to 70 mol %, in the naphthol-based mixed crystal pigment. By ensuring that the blend amount falls within the above ranges, tinting strength (particularly color development when printing on a permeable substrate), dispersion stability, and discharge stability can all be achieved.

Furthermore, from the viewpoint of obtaining a printed material having excellent color development and color reproducibility regardless of the recording medium used, the amount of naphthol-based mixed crystal pigment contained in the water-based ink is preferably 0.5 to 10% by mass, more preferably 1 to 9% by mass, and particularly preferably 2 to 8% by mass, relative to the total amount of the water-based ink.

<Other Pigments>

In an embodiment of the present invention, from the viewpoint of obtaining a printed material having excellent color development and color reproducibility regardless of the recording medium used, pigments other than a naphthol-based mixed crystal pigment (hereinafter, also called "other pigments") may be used in combination.

As the other pigments, pigments such as orange pigments, magenta pigments, and violet pigments can be used favorably, and it is particularly preferable to include a magenta pigment and/or a violet pigment in terms of obtaining a printed material having excellent color reproducibility in the red region. Note that when a magenta pigment and/or a violet pigment is used as a pigment other than a naphthol-based mixed crystal pigment, the blend amount thereof is preferably 10 to 100% by mass, and particularly preferably 20 to 70% by mass, relative to the total blend amount of the naphthol-based mixed crystal pigment.

Examples of an orange pigment that can be used together with a naphthol-based mixed crystal pigment include C.I. Pigment Orange 13, 16, 17, 22, 24, 34, 36, 38, 40, 43, 51, 60, 62, 64, 71, 72, 73, and the like. From thereamong, in terms of the dispersed state of the naphthol-based mixed crystal pigment being unlikely to be destroyed, and obtaining excellent color reproducibility when mixed with the naphthol-based mixed crystal pigment, one or more selected from the group consisting of C.I. Pigment Orange 36, 38, 43, 60, 62, 64, and 72 can be preferably used.

Furthermore, examples of a magenta pigment that can be used together with a naphthol-based mixed crystal pigment include naphthol-based pigments (excluding those that are mixed crystal pigments), quinacridone-based pigments, and diketopyrrolopyrrole-based pigments. Specifically, examples of a naphthol-based pigment include the pigments listed above as specific examples of naphthol-based pigments that form a naphthol-based mixed crystal pigment, examples of a quinacridone-based pigment include C.I. Pigment Red 122, 202, 207, 209, and the like, and examples of a diketopyrrolopyrrole-based pigment include C.I. Pigment Red 254, 255, and the like.

From thereamong, in terms of the dispersed state of the naphthol-based mixed crystal pigment being unlikely to be destroyed, and obtaining excellent color reproducibility when mixed with the naphthol-based mixed crystal pigment, a naphthol-based pigment (excluding those that are mixed crystal pigments) or a quinacridone-based pigment can be preferably used. For example, one or more selected from the group consisting of C.I. Pigment Red 31, 32, 122, 146, 147, 150, 176, 185, 202, 209, 282, and 269 are preferred.

Furthermore, examples of a violet pigment that can be used together with a naphthol-based mixed crystal pigment include C.I. Pigment Violet 19, 23, 29, 30, 37, 40, 42, 43, 50, and the like. From thereamong, in terms of the dispersed state of the naphthol-based mixed crystal pigment being unlikely to be destroyed, and obtaining excellent color reproducibility when mixed with the naphthol-based mixed crystal pigment, one or more selected from the group consisting of C.I. Pigment Violet 19, 23, 32, and 42 can be preferably used.

From among the pigments exemplified and selected above, one or more selected from the group consisting of benzimidazolone-based pigments, quinacridone-based pigments, naphthol-based pigments (excluding those that are mixed crystal pigments), diketopyrrolopyrrole-based pigments, and dioxazine-based pigments are favorably selected. All of these pigments have a substructure similar to that of a naphthol-based mixed crystal pigment, and therefore they are less likely to destroy the dispersed state of a naphthol-based mixed crystal pigment and a water-based ink having excellent dispersion stability can be obtained. Furthermore, these pigments are also preferable from the viewpoint of the color reproducibility of the printed material. From thereamong, it is more preferable to use a quinacridone pigment and/or a naphthol pigment (excluding naphthol pigments that are mixed crystal pigments) in combination.

When a quinacridone pigment and/or a naphthol pigment (excluding naphthol pigments that are mixed crystal pigments) is used in combination with a naphthol-based mixed crystal pigment, the blend amount of the quinacridone pigment or the naphthol pigment is preferably 0.1 to 50% by mass, and more preferably 1 to 30% by mass, relative to the total amount of the naphthol-based mixed crystal pigment. By adopting the above ranges, the dispersion stability improves, and in addition the color development and color reproducibility of the printed material improves regardless of the recording medium.

<Pigment Dispersing Resin>

Examples of methods of stably dispersing and maintaining a pigment including a naphthol-based mixed crystal pigment within a water-based inkjet ink include the following: (1) a method in which at least part of the pigment surface is coated with a pigment dispersing resin; (2) a method in which a water-soluble and/or water-dispersible surfactant is adsorbed on the pigment surface; and (3) a method in which a hydrophilic functional group is chemically or physically introduced to the pigment surface, and the pigment is dispersed in the ink without a dispersing resin or surfactant (self-dispersing pigment).

For the water-based inkjet ink of an embodiment of the present invention, method (1) from among the above, in other words, the method using a pigment dispersing resin, is favorably selected. This is because by selecting and examining the composition and molecular weight of a polymerizable monomer forming the resin, the coating ability of the pigment dispersing resin with respect to the pigment and the electric charge of the pigment dispersing resin can be easily adjusted, which makes it possible to provide dispersion stability even for fine pigments, and in addition it is possible to obtain a printed material having excellent discharge stability, color development, and color reproducibility.

The type of the pigment dispersing resin is not particularly limited, and (meth)acrylic resin, styrene-(meth)acrylic resin, (anhydrous) maleic acid resin, styrene (anhydrous) maleic acid resin, olefin (anhydrous) maleic acid resin, urethane resin, ester resin (polycondensation polymer of polyvalent carboxylic acid and polyhydric alcohol), and the like can be used; however, the pigment dispersing resin is not limited thereto. From thereamong, in terms of the breadth of material selectivity and ease of synthesis, it is preferable to use one or more selected from the group consisting of (meth)acrylic resin, styrene-(meth)acrylic resin, urethane resin, and ester resin. Furthermore, from the viewpoint of improving the dispersion stability and discharge stability of the water-based ink, it is preferable to use the same type of resin as the binder resin (A) described later.

Note that the term "(meth)acrylic resin" herein means acrylic resin, methacrylic resin, or acrylic-methacrylic resin. Herein, "acrylic-methacrylic resin" means a resin for which an acrylic acid and/or acrylic acid ester, and a methacrylic acid and/or methacrylic acid ester, are used as polymerizable monomers. Furthermore, "(anhydrous) maleic acid" means maleic anhydride or maleic acid.

The above pigment dispersing resins can be synthesized by known methods or commercially available products can be used. Furthermore, there are no particular limitations on the structure thereof, and resins having various structures such as random structures, block structures, comb-like structures, and star-like structures can be used. In addition, a water-soluble resin or a water-insoluble resin may be selected as a pigment dispersing resin. Note that "water-insoluble resin" refers to a resin that is not transparent to the naked eye in a 1% by mass aqueous mixed liquid at 25° C. of the pigment dispersing resin in question.

In an embodiment of the present invention, when a water-soluble resin is used as a pigment dispersing resin, the acid value thereof is preferably greater than 100 mgKOH/g and 450 mgKOH/g or less, more preferably 120 to 400 mgKOH/g, and particularly preferably 150 to 350 mgKOH/g. By having the acid value within the above ranges, it is possible to maintain the dispersion stability of the pigment and it becomes possible to discharge from the inkjet head in a stable manner. Furthermore, it becomes possible to maintain discharge stability on the inkjet head. In addition, the solubility of pigment dispersing resins in water can be ensured, and the interaction among pigment dispersing resins becomes favorable, which is preferable also in terms of thereby being able to suppress the viscosity of the pigment dispersion.

Meanwhile, when a water-insoluble resin is used as a pigment dispersing resin, the acid value thereof is preferably 0 to 100 mgKOH/g, more preferably 5 to 90 mgKOH/g, and even more preferably 10 to 80 mgKOH/g. If the acid value is within the above ranges, a printed material having excellent drying properties and rub fastness can be obtained.

Note that the acid value of the resin can be measured by using a known device. The acid values of resins herein are values measured by using a potentiometric titration method in accordance with JIS K 2501. An example of a specific measurement method is a method in which the resin is dissolved in a toluene-ethanol mixed solvent, then titration is carried out with a potassium hydroxide solution, and the acid value is calculated from the titer obtained up to the endpoint, using an AT-610 manufactured by Kyoto Electronics Manufacturing Co., Ltd.

In the water-based inkjet ink of an embodiment of the present invention, from the viewpoint of improving the adsorption capacity with respect to the pigment and ensuring dispersion stability, it is preferable to introduce an aromatic group into the pigment dispersing resin. In particular, in an embodiment of the present invention, due to interaction between an aromatic ring structure included in the naphthol-based mixed crystal pigment and an aromatic ring structure included in the pigment dispersing resin, the adsorption capacity of the pigment dispersing resin with respect to the naphthol-based mixed crystal pigment is significantly improved. As a result, even when fine dispersion of a pigment is carried out, it becomes possible to ensure dispersion stability and discharge stability of the water-based ink and color reproducibility of the printed material over a long period of time. Note that examples of an aromatic group include, but are not limited to, a phenyl group, naphthyl group, anthryl group, tolyl group, xylyl group, mesityl group, and anisyl group. From thereamong, a phenyl group, naphthyl group, and tolyl group are preferred in terms of being able to sufficiently ensure dispersion stability.

From the viewpoint of achieving dispersion stability, print quality, and drying properties of an ink containing a naphthol-based mixed crystal pigment, the amount of a monomer containing an aromatic ring is preferably 5 to 75% by mass, more preferably 5 to 65% by mass, and even more preferably 10 to 50% by mass, relative to the total amount of the pigment dispersing resin.

Furthermore, in addition to an aromatic group, it is particularly preferable to introduce an alkyl group of 8 to 36 carbon atoms into the pigment dispersing resin. Due to the number of carbon atoms of the alkyl group being 8 to 36, it is possible to reduce the viscosity of the pigment dispersion, improve the dispersion stability of an ink containing a naphthol-based mixed crystal pigment, and improve discharge stability. Note that the number of carbon atoms of the alkyl group is more preferably 10 to 30 carbon atoms, and even more preferably 12 to 24 carbon atoms. Furthermore, as long as the alkyl group is in the range of 8 to 36 carbon atoms, either a linear or branched alkyl group can be used, but a linear alkyl group is preferred. Examples of linear alkyl groups include an ethylhexyl group (C8), lauryl group (C12), myristyl group (C14), cetyl group (C16), stearyl group (C18), arachyl group (C20), behenyl group (C22), lignoceryl group (C24), cerotoyl group (C26), montanyl group (C28), melissyl group (C30), dotriacontanyl group (C32), tetratriacontanyl group (C34), hexatriacontanyl group (C36), and the like From the viewpoint of achieving both low viscosity of the pigment dispersion and rub fastness of the printed material, the amount of a monomer containing an alkyl chain of 8 to 36 carbon atoms is preferably 5 to 60% by mass, more preferably 10 to 55% by mass, and particularly preferably 15 to 50% by mass, relative to the total amount of the pigment dispersing resin.

Note that when a water-soluble resin is used as a pigment dispersing resin, in order to enhance the solubility into the water-based ink, it is preferable that the acid groups within the resin be neutralized with a base. Whether the added amount of the base is excessive can be checked by, for example, preparing a 10% by mass aqueous solution of the pigment dispersing resin and measuring the pH of the aqueous solution. From the viewpoint of improving the dispersion stability of an ink containing a naphthol-based mixed crystal pigment, the pH of the aqueous solution is preferably 7 to 11, and more preferably 7.5 to 10.5.

Examples of a base for neutralizing a pigment dispersing resin include, but are not limited to, organic amine-based solvents such as triethylamine, monoethanolamine, diethanolamine, N-methyldiethanolamine, dimethylaminoethanol, diethylaminoethanol, and aminomethylpropanol; ammonia water; alkali metal hydroxides such as lithium hydroxide, sodium hydroxide, and potassium hydroxide; and alkali metal carbonates such as lithium carbonate, sodium carbonate, sodium hydrogen carbonate, and potassium carbonate.

When a water-soluble resin is used as a pigment dispersing resin, the weight average molecular weight thereof is preferably in the range of 1,000 to 500,000, more preferably in the range of 5,000 to 40,000, even more preferably in the range of 10,000 to 35,000, and particularly preferably in the range of 15,000 to 30,000. By having the weight average molecular weight within the above ranges, a naphthol-based mixed crystal pigment is stably dispersed in water, and furthermore it is easy to adjust the viscosity and so forth when applied to a water-based ink. If the weight average molecular weight is 1,000 or more, it becomes difficult for the pigment dispersing resin to dissolve in a water-soluble organic solvent added to the water-based ink, and therefore the adsorption of the pigment dispersing resin with respect to the naphthol-based mixed crystal pigment is enhanced and the dispersion stability improves. If the weight average molecular weight is 50,000 or less, the viscosity during dispersion is kept low, and the dispersion stability of the ink and the discharge stability from the inkjet head are improved, and stable printing become possible over a long period of time.

The blend amount of the pigment dispersing resin is preferably 1 to 100% by mass relative to the blend amount of the pigment. By having the ratio of the pigment dispersing resin within the above range, the viscosity of the pigment dispersion is suppressed, and the dispersion stability and discharge stability of the water-based inkjet ink are improved. The ratio of the pigment and the pigment dispersing resin is more preferably 2 to 50% by mass, and particularly preferably 4 to 45% by mass.

<Dispersion Aid>

In the water-based inkjet ink of an embodiment of the present invention, from the viewpoint of significantly improving the dispersion stability and discharge stability of a naphthol-based mixed crystal pigment, and also improving the color reproducibility of a printed material by enabling the fine dispersion of the pigment, a dispersion aid may also be used when selecting method (1) or (2) out of the dispersion techniques mentioned above. A dispersion aid is a material that contributes to improving the adsorption ratio of a pigment dispersing resin or a surfactant with respect to a pigment. In an embodiment of the present invention, any conventionally known material can be used as a dispersion aid, and in particular, compounds referred to as colorant derivatives can be used favorably. A colorant derivative is a compound having a substituent introduced into an organic colorant molecule, and examples of the organic colorant include monoazo-based colorants, disazo-based colorants, polyazo-based colorants, anthraquinone-based colorants, isoindolinone-based colorants, isoindoline-based colorants, quinacridone-based colorants, quinophthalone-based colorants, dioxazine-based colorants, diketopyrrolopyrrole-based colorants, threne-based colorants, thioindigo-based colorants, naphthalocyanine-based colorants, phthalocyanine-based colorants, perinone-based colorants, perylene-based colorants, benzimidazolone-based colorants, metal complex-based colorants, and the like. Note that "colorants" mentioned above is a collective term for pigments and dyes.

When a dispersion aid is used in an embodiment of the present invention, the blend amount thereof is preferably 0.1 to 10% by mass, and particularly preferably 0.5 to 5% by mass, relative to blend amount of a naphthol-based mixed crystal pigment. By having the blend amount be 0.1% by mass or more, the addition ratio with respect to the naphthol-based mixed crystal pigment is sufficient, and the dispersion stability, discharge stability, and color reproducibility of a printed material are improved. Furthermore, by having the blend amount be 10% by mass or less, pigment refinement does not progress beyond the necessary level, and therefore dispersion stability is improved and also deterioration in the light resistance of a printed material is prevented.

<Binder Resin (A)>

In the water-based inkjet ink of an embodiment of the present invention, a binder resin (A) is used to improve the rub fastness, color development, and color reproducibility of a printed material. Note that two or more resins may be used together as the binder resin (A), in which case at least one of the two or more resins is the binder resin (a-1) described below.

A "binder resin" herein is a resin that is used to bind a layer of a printed material (printed layer, ink layer) to a recording medium. Note that, as mentioned above, the ink of an embodiment of the present invention may contain a pigment dispersing resin, but when the resin contained in the water-based ink is a water-soluble resin, whether the resin corresponds to a pigment dispersing resin or a binder resin is distinguished by the adsorption ratio with respect to the pigment. In other words, a resin having an adsorption ratio with respect to the pigment of 50% by mass or more relative to the total blend amount is determined as being a pigment dispersing resin, and a resin having an adsorption ratio of less than 50% by mass relative to the total blend amount is determined as being a binder resin.

Note that, as an example of a method of measuring the adsorption ratio with respect to the pigment, a centrifugal separation treatment is carried out on a water-based ink diluted with water as necessary (for example, 4 hours at 30,000 rpm) to separate into pigment and supernatant liquid. Then, when the solid fraction contained in the supernatant liquid is measured, if the solid fraction is 50% by mass or more relative to the total amount of resins having the same composition contained in the water-based ink, the resin is determined as being a binder resin.

Water-soluble resins and resin microparticles (a form of water-insoluble resin) are commonly known as forms of binder resins for water-based inks, and either one may be selected for use in an embodiment of the present invention or both may be used in combination. For example, resin microparticles have a high molecular weight compared to water-soluble resins and can enhance the rub fastness of printed materials, and is also excellent in terms of the image quality of printed materials. Furthermore, when printing on a permeable substrate, voids in the substrate surface can be effectively filled, and therefore the color development and color reproducibility of the printed material is improved. Meanwhile, a water-based inkjet ink that uses a water-soluble resin as a binder resin has excellent discharge stability. Note that "water-soluble resin" herein refers to a resin that is not a water-insoluble resin mentioned above, in other words, a resin that is transparent to the naked eye in a 1% by mass aqueous mixed liquid at 25° C. of the resin in question.

As described above, the inkjet ink of an embodiment of the present invention contains a binder resin (a-1) having an acid value of 1 to 80 mgKOH/g, as a binder resin (A). Furthermore, the acid value is preferably 3 to 60 mgKOH/g, and particularly preferably 5 to 40 mgKOH/g, from the viewpoint of obtaining a printed material having excellent image quality by ensuring the dispersion stability of a naphthol-based mixed crystal pigment and by the binder resin (A) moving quickly to the gas-liquid interface, and in addition, when a permeable substrate such as uncoated paper is used, obtaining a printed material also having excellent color development and color reproducibility due to the binder resin (A) moving quickly in such a way as to fill voids in the surface of the substrate. Note that the acid value of the binder resin (a-1) can be measured in the same manner as that described above for the acid value of the pigment dispersing resin.

Meanwhile, the glass transition temperature of the binder resin (a-1) in the ink of an embodiment of the present invention can be selected according to the required characteristics as follows, for example. Specifically, in order to improve discharge stability and the rub fastness of a printed material, and to obtain an ink also having excellent drying properties and blocking resistance (phenomenon in which a printed layer sticks to another recording medium when recording mediums are stacked after printing), the glass transition temperature is preferably 60 to 140° C., more preferably 70 to 135° C., and particularly preferably 80 to 130° C.

Meanwhile, when the ink of an embodiment of the present invention is used for a non-permeable substrate typified by plastic substrates, from the viewpoint of image quality and adhesion, the glass transition temperature is preferably −120 to 45° C., more preferably −80 to 25° C., and particularly preferably −60 to 15° C.

The glass transition temperature is a value measured using a DSC (differential scanning calorimeter), and can be measured in accordance with JIS K 7121 as follows, for example. A sample of approximately 2 mg of a dried resin is weighed on an aluminum pan, and the aluminum pan is set as a test container in a holder of a DSC measurement device (for example, DSC-60Plus manufactured by Shimadzu Corporation). Measurements are then performed under a temperature increase condition of 5° C./minute, and the temperature at an intersection between a low-temperature baseline and a tangent at an inflection point, read from an obtained DSC chart, is taken as the glass transition temperature herein.

Examples of types of binder resins (A) used in an embodiment of the present invention include (meth)acrylic resin, styrene-(meth)acrylic resin, urethane resin, urethane-(meth) acrylic composite resin, styrene-butadiene resin, vinyl chloride resin, styrene (anhydrous) maleic acid resin, ester resin, polyolefin resin, and the like. From thereamong, from the viewpoint of obtaining an ink having excellent dispersion stability and discharge stability, for the binder resin (a-1) it is preferable to use one or more resins selected from the group consisting of (meth)acrylic resin, styrene-(meth) acrylic resin, urethane resin, urethane-(meth)acrylic composite resin, and polyolefin resin. Furthermore, in general, urethane resin, urethane-(meth)acrylic composite resin, and polyolefin resin have a low glass transition temperature, and are therefore favorably selected from the viewpoint of image quality and adhesion to a non-permeable substrate typified by plastic substrates.

In addition, from the viewpoint of adhesion to plastic substrates, rub fastness of the printed material, color development and color reproducibility when printing on a permeable substrate, and blocking resistance, it is preferable for one or more resins selected from the group consisting of polyolefin resin, (meth)acrylic resin, styrene-(meth)acrylic resin, urethane resin, and urethane-(meth)acrylic composite resin to be included as the binder resin (a-1).

The binder resin (A) described above can be synthesized by a known method or a commercially available product can also be used. Furthermore, there are no particular limitations on the structure thereof, and resins having various structures such as random structures, block structures, comb-like structures, and star-like structures can be used.

When a water-soluble resin is used as the binder resin (a-1) in an embodiment of the present invention, the weight average molecular weight thereof is preferably 5,000 to 50,000 from the viewpoint of ensuring discharge stability from the inkjet nozzles and obtaining a printed material having excellent adhesion and rub fastness with respect to various recording mediums, and is more preferably 8,000 to 45,000, and even more preferably 10,000 to 40,000, from the viewpoint of excellent color development and color reproducibility when printing on a permeable substrate.

The weight average molecular weight of the binder resin (a-1) in an embodiment of the present invention is a polystyrene-equivalent value that can be measured by a method according to JIS K 7252, for example. An example of a specific measurement method is a method of measurement using a HLC-8120GPC manufactured by Tosoh Corporation, fitted with a TSKgel column manufactured by Tosoh Corporation and an RI detector, and using THF as an eluent.

The amount of the binder resin (A) with respect to the total amount of the ink is preferably 1 to 15% by mass, more preferably 2 to 12% by mass, and even more preferably 4 to 10% by mass in terms of the solid fraction equivalent. By having the amount of the binder resin (A) within the above ranges, it is possible to obtain an ink that is excellent in terms of printed material rub fastness, drying properties, image quality, and also color development and color reproducibility when printing on a permeable substrate, without there being any deterioration in the dispersion stability and discharge stability.

Furthermore, from the viewpoint of obtaining an ink having excellent dispersion stability and discharge stability, good adhesion to plastic substrates and image quality, and also excellent color development and color reproducibility when printing on a permeable substrate, the amount of binder resin (a-1) is preferably 20 to 100% by mass, more preferably 35 to 100% by mass, and particularly preferably 50 to 100% by mass, relative to the total amount of the binder resin (A).

<Surfactant>

In the present invention, from the viewpoint of obtaining a water-based inkjet ink having excellent discharge stability, printed material image quality, and drying properties when used in combination with a binder resin (a-1), it is preferable to include one or more surfactants and to use nonionic surfactants as the surfactants. Furthermore, generally, various surfactants are known as nonionic surfactants depending on the use, such as acetylenediol-based surfactants, acetylene alcohol-based surfactants, siloxane-based surfactants, acrylic-based surfactants, fluorine-based surfactants, and polyoxyalkylene-based surfactants. The water-based inkjet ink of an embodiment of the present invention preferably contains one or more nonionic surfactants selected from the group consisting of acetylenediol-based surfactants, siloxane-based surfactants, and polyoxyalkylene-based surfactants (the polyoxyalkylene-based surfactants being represented by general formula (4) shown below), more preferably contains acetylenediol-based surfactants and/or siloxane-based surfactants, and particularly preferably contains siloxane-based surfactants. It is thought that, in the water-based ink droplets after landing on the recording medium, acetylenediol-based surfactants and siloxane-based surfactants quickly orient toward the gas-liquid interface and the recording medium-droplet interface without being affected by the naphthol-based mixed crystal pigment present in the droplets. As a result, even on non-permeable substrates, the wettability of the water-based ink can be improved and the ink droplets can be quickly smoothed, drying properties can be improved, and in addition it becomes possible to obtain a printed material having excellent image quality with little bleeding or density irregularities between droplets. Furthermore, when a siloxane-based surfactant is used, the rub fastness of the printed material is also improved in addition to the above, and, although the details are unclear, when printing on a permeable substrate such as uncoated paper, a printed material having excellent color development and color reproducibility can be obtained with there being no excessive permeation and diffusion of the water-based ink. In particular, in an embodiment of the present invention, although the details are unclear, a water-based ink is obtained also having excellent discharge stability in addition to the aforementioned improvements in characteristics, and therefore it is preferable to use an acetylenediol-based surfactant and a siloxane-based surfactant in combination.

Examples of acetylenediol-based surfactants that can be used in an embodiment of the present invention include, but are not limited to, 2,4,7,9-tetramethyl-5-decyne-4,7-diol, 2,5,8,11-tetramethyl-6-dodecyne-5,8-diol, hexadec-8-yne-7,10-diol, 6,9-dimethyl-tetradec-7-yne-6,9-diol, 7,10-dimethylhexadec-8-yne-7,10-diol, and ethylene oxide and/or propylene oxide adducts thereof.

Furthermore, examples of siloxane-based surfactants that can be favorably used in an embodiment of the present invention include siloxane-based surfactants in which one or more ethylene oxide groups and/or one or more propylene oxide groups are introduced into a side chain and/or both ends of a polydimethylsiloxane chain. Specific examples include: 8032 ADDITIVE, FZ-2104, FZ-2120, FZ-2122, FZ-2162, FZ-2164, FZ-2166, FZ-2404, FZ-7001, FZ-7002, FZ-7006, L-7001, L-7002, SF8427, SF8428, SH3748, SH3749, SH3771M, SH3772M, SH3773M, SH3775M, and SH8400 manufactured by Dow Corning Toray Co., Ltd.; BYK-331, BYK-333, BYK-345, BYK-346, BYK-347, BYK-348, BYK-349, BYK-UV3500, BYK-UV3510, BYK-UV3530, and BYK-UV3570 manufactured by BYK Chemie GmbH; TEGO Wet 240, TEGO Wet 250, TEGO Wet 260, TEGO Wet 270, TEGO Wet 280, TEGO Glide 410, TEGO Glide 432, TEGO Glide 435, TEGO Glide 440, and TEGO Glide 450 manufactured by Evonik Industries AG; KF-351A, KF-352A, KF-353, KF-354L, KF-355A, KF-615A, KF-640, KF-642, KF-643, KF-644, KF-945, KF-6011, KF-6012, KF-6015, KF-6017, KF-6020, KF-6204, and X-22-4515 manufactured by Shin-Etsu Chemical Co., Ltd.; the SILFACE SAG series of Nissin Chemical Industry Co., Ltd.; and the like.

Furthermore, examples of a polyoxyalkylene-based surfactant that can be used favorably in an embodiment of the present invention include compounds represented by general formula (4) shown below.

R—O-(EO)$m$-(PO)$n$-H  General formula (4):

In general formula (4), R represents an alkyl group of 8 to 22 carbon atoms, an alkenyl group of 8 to 22 carbon atoms, an alkylcarbonyl group of 8 to 22 carbon atoms, or an alkenylcarbonyl group of 8 to 22 carbon atoms. Note that R may be a branched structure. Furthermore, EO represents an ethylene oxide group, and PO represents a propylene oxide group. m indicates the average number of added moles of EO, which is a number from 2 to 50, and n indicates the average number of added moles of PO, which is a number from 0 to 50. Note that if n is not zero, the addition may be block addition or random addition irrespective of the order of addition of (EO)m and (PO)n.

It is preferable that surfactants used in an embodiment of the present invention be present divided into hydrophobic groups and hydrophilic groups in the molecules. Therefore, among the surfactants exemplified above, surfactants having ethylene oxide groups, which are hydrophilic, are particularly favorable for selection.

Furthermore, from the viewpoint of enhancing affinity with the binder resin (a-1), obtaining an ink having excellent dispersion stability and discharge stability, and obtaining a printed material having excellent image quality without bleeding or density irregularities, it is preferable to use a surfactant having an HLB value of 0 to 5, and it is particularly preferable to include a surfactant in which the HLB value is 0 to 4.

In particular, in addition to dispersion stability and discharge stability, from the viewpoint of obtaining a printed material having excellent image quality with little bleeding or density irregularities among ink droplets on non-permeable substrates such as plastic substrates, and at the same time obtaining a printed material having excellent color development and color reproducibility on permeable substrates such as uncoated paper, it is preferable to use both a surfactant having an HLB value of 0 to 5 (preferably 0 to 4) and a surfactant having an HLB value of 6 to 18 (preferably 7 to 18, particularly preferably 8 to 16).

Note that when a compound represented by general formula (4) shown above is used as a surfactant, the HLB value thereof is preferably 13 or less, and more preferably 10 or less. By having the HLB value within the above ranges, a printed material having excellent image quality with no bleeding or density irregularities can be obtained with non-permeable substrates and low-permeation substrates.

Note that the HLB (hydrophile-lipophile balance) value is one parameter that represents the hydrophilicity or hydrophobicity of a material, with a smaller value indicating a higher hydrophobicity, and a larger value indicating a higher hydrophilicity. There are various known methods for calculating the HLB value from the chemical structure and various known methods for actual measurement. In an embodiment of the present invention, when the structure of a compound is clearly known, such as in the case of acetylenediol-based surfactants and polyoxyalkylene-based surfactants, the HLB value is calculated using Griffin's method. Note that Griffin's method is a method that calculates the HLB value using formula (5) shown below, using the molecular structure and molecular weight of the target material.

HLB value=20×(sum of molecular weight of hydrophilic portions)÷(molecular weight of material)   Formula (5):

On the other hand, when a compound having an unclear structure such as a siloxane-based surfactant is included, the HLB value of the surfactant can be determined experimentally using, for example, the method below described on page 324 of "The Surfactant Handbook" (edited by Ichiro Nishi et al., Sangyo-Tosho Publishing Co. Ltd., 1960). Specifically, 0.5 g of the surfactant is first dissolved in 5 mL of ethanol, and with the resulting solution undergoing stirring at a temperature of 25° C., titration is performed with a 2% by mass aqueous solution of phenol, with the point where cloudiness of the liquid occurs being deemed the end point. When the amount of the aqueous solution of phenol required to reach the end point is taken as A (mL), the HLB value can be calculated according to formula (6) shown below.

HLB value=0.89×$A$+1.11   Formula (6):

The amount of surfactant in the inkjet ink of an embodiment of the present invention is preferably 0.2 to 4% by mass, and more preferably 0.5 to 2% by mass, relative to the total amount of the ink.

<Water-Soluble Organic Solvent>

The water-based inkjet ink of an embodiment of the present invention contains a water-soluble organic solvent. In an embodiment of the present invention, an alcohol-based solvent, glycol ether-based solvent, polyalkylene glycol-based solvent, or the like can be used favorably as a water-soluble organic solvent. Note that "water-soluble organic solvent" herein refers to a solvent of which the solubility with respect to water is 5 g/100 g$H_2O$ or higher at 25° C. and 1 atmosphere, and which is a liquid. Furthermore, among the pH adjusters described later, solvents that satisfy the aforementioned conditions are also included in the water-soluble organic solvents.

Note that, as described above, in the water-based inkjet ink of an embodiment of the present invention, the amount of a water-soluble organic solvent having a boiling point of 240° C. or more at 1 atmosphere is 8% by mass or less (may be 0% by mass) relative to the total amount of the water-based inkjet ink. In particular, from the viewpoint of obtaining a printed material having excellent drying properties, image quality, and rub fastness with respect to non-permeable substrates such as plastic substrates, the amount of the water-soluble organic solvent having a boiling point of 240° C. or more at 1 atmosphere is more preferably 5% by mass or less (may be 0% by mass), even more preferably 2% or less (may be 0% by mass), and particularly preferably 1% or less (may be 0% by mass).

Note that the boiling point at 1 atmosphere can be measured by using a thermal analysis device such as a DSC (differential scanning calorimeter).

Examples of a water-soluble organic solvent having a boiling point of 240° C. or more at 1 atmosphere include glycerol, 3-methyl-1,5-pentanediol, 1,6-hexanediol, triethylene glycol monomethyl ether, triethylene glycol monobutyl ether, tetraethylene glycol dimethyl ether, diethylene glycol, triethylene glycol, tripropylene glycol, tetrapropylene glycol, 2-pyrrolidone, ε-caprolactone, polyethylene glycol 200, polyethylene glycol 400, polyethylene glycol 600, and the like.

The water-soluble organic solvent used in an embodiment of the present invention has a weight average boiling point at 1 atmosphere of preferably 100 to 235° C., even more preferably 120 to 210° C., and particularly preferably 120 to 195° C. Furthermore, considering image quality on non-permeable substrates such as plastic substrates, 120 to 180° C. is particularly preferable. If the weight average boiling point at 1 atmosphere of the water-soluble organic solvent is 100° C. or more, discharge stability from the inkjet head is improved, and color development and color reproducibility when printing on permeable substrates are improved. Furthermore, if the weight average boiling point is 235° C. or lower, there is no drying failure on the recording medium, and the remaining water-soluble organic solvent does not cause bleeding or the like among water-based ink droplets, thus improving image quality. In addition, adhesion to non-permeable substrates typified by plastic substrates and rub fastness of printed materials are also improved. Note that, in calculating the weight average boiling point, water-soluble organic solvents having a boiling point of 240° C. or more at 1 atmosphere are also included. Furthermore, when there are two or more water-soluble organic solvents contained in the water-based inkjet ink, the weight average boiling point at 1 atmosphere is a value obtained by multiplying the boiling point at 1 atmosphere for each water-soluble organic solvent by the mass ratio of that solvent relative to the total amount of the water-soluble organic solvent, and then adding the values calculated for the various solvents. However, when there is only one type of water-soluble organic solvent included in the water-based inkjet ink, the "weight average boiling point" is replaced with the "boiling point of the water-soluble organic solvent".

Furthermore, from the viewpoint of ensuring that the weight average boiling point is within the above ranges, the blend amount of a water-soluble organic solvent having a boiling point of 100 to 220° C. at 1 atmosphere is preferably 50% by mass or more, more preferably 70% by mass or more, and particularly preferably 85% by mass or more, with respect to the total amount of the water-soluble organic solvent in the ink.

Examples of water-soluble organic solvents that are favorably used in an embodiment of the present invention include, but are not limited to, the following:

- as monohydric alcohol-based solvents, ethanol, 1-propanol, isopropanol, 1-butanol, 2-butanol, 3-butanol, isobutanol, 3-methoxy-1-butanol, 3-methoxy-3-methyl-1-butanol, and the like;
- as dihydric alcohol-based solvents (diol-based solvents), ethylene glycol, propylene glycol, 1,3-propanediol, 1,2-butanediol, 1,3-butanediol, 1,4-butanediol, 2,3-butanediol, 1,2-pentanediol, 1,3-pentanediol, 1,2-hexanediol, 2-methyl-1,3-propanediol, 2,2-dimethyl-1,3-propanediol, 3-methyl-1,3-butanediol, and the like;
- as trihydric or higher alcohol-based solvents (polyol solvents), glycerol, 1,2,4-butanetriol, diglycerol, and the like;
- as glycol ether-based solvents, polyoxyalkylene monoalkyl (c≤6) ethers and polyoxyalkylene dialkyl (c=1 to 4) ethers such as ethylene glycol monoethyl ether, ethylene glycol monobutyl ether, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, diethylene glycol monoisopropyl ether, diethylene glycol monoisobutyl ether, triethylene glycol monomethyl ether, triethylene glycol monoethyl ether, triethylene glycol monopropyl ether, triethylene glycol monobutyl ether, tetraethylene glycol monomethyl ether, dipropylene glycol monomethyl ether, diethylene glycol dimethyl ether, triethylene glycol dimethyl ether, tetraethylene glycol dimethyl ether, diethylene glycol diethyl ether, diethylene glycol methyl butyl ether, triethylene glycol methyl butyl ether, triethylene glycol diethyl ether, tetraethylene glycol diethyl ether, diethylene glycol methyl ethyl ether, triethylene glycol methyl ethyl ether, tetraethylene glycol methyl ethyl ether, tetraethylene glycol butyl methyl ether, propylene glycol monomethyl ether, dipropylene glycol monopropyl ether, dipropylene glycol monobutyl ether, tripropylene glycol monomethyl ether, propylene glycol dimethyl ether, and tripropylene glycol dimethyl ether;
- as polyalkylene glycol-based solvents, diethylene glycol, dipropylene glycol, and the like;
- as chain-like amide-based solvents, N,N-dimethylformamide, N,N-dimethyl-β-methoxypropionamide, N,N-dimethyl-β-ethoxypropionamide, N,N-dimethyl-β-butoxypropionamide, N,N-dimethyl-β-pentoxypropionamide, N,N-dimethyl-β-hexoxypropionamide, N,N-dimethyl-β-heptoxypropionamide, N,N-dimethyl-β-2-ethylhexoxypropionamide, N,N-dimethyl-β-octoxypropionamide, N,N-diethyl-β-butoxypropionamide, N,N-diethyl-β-pentoxypropionamide, N,N-diethyl-β-hexoxypropionamide, N,N-diethyl-β-heptoxypropionamide, N,N-diethyl-β-octoxypropionamide, and the like;
- as cyclic amide-based solvents, 2-pyrrolidone, N-methylpyrrolidone, N-ethylpyrrolidone, and the like; and
- as cyclic carbamate-based solvents, 3-methyl-2-oxazolidinone, 3-ethyl-2-oxazolidinone, and the like.

For the water-soluble organic solvent used in an embodiment of the present invention, a water-soluble organic solvent having one or two hydroxyl groups is favorably selected from the viewpoint of obtaining a printed material having excellent image quality and drying properties, and obtaining a water-based ink having excellent compatibility with a binder resin (a-1) and surfactant, and in addition also having low viscosity of the aforementioned water-soluble organic solvent itself and excellent discharge stability. From thereamong, although the details are unclear, a water-soluble organic solvent having two hydroxyl groups, in other words, a diol-based solvent, is particularly favorable for selection from the viewpoint of being unlikely to adversely affect the dispersion stability of a naphthol-based mixed crystal pigment.

Furthermore, among diol-based solvents, it is preferable to at least use one or more alkanediols of 2 to 5 carbon atoms, more preferably alkanediols of 3 to 4 carbon atoms, and particularly preferably alkanediols of 3 carbon atoms.

The amount of the water-soluble organic solvent used in an embodiment of the present invention is preferably 1 to 30% by mass relative to the total amount of the inkjet ink. Furthermore, from the viewpoint of ensuring discharge stability on the inkjet head and obtaining a printed material having excellent adhesion, drying properties, and image quality even with non-permeable substrates, the amount of the water-soluble organic solvent is more preferably 3 to 27% by mass, and particularly preferably 5 to 25% by mass.

<Water>

The water included in the water-based inkjet ink of an embodiment of the present invention is preferably not typical water containing various ions, and the use of ion-exchanged water (deionized water) is preferred. Furthermore, the amount thereof is preferably represents 20 to 90% by mass of the total mass of the ink.

<Other Components>

Besides the components described above, a pH adjuster can be added to the water-based inkjet ink of an embodiment of the present invention as required to obtain an ink having the desired physical property values. Examples of compounds that can be used as a pH adjuster include, but are not limited to, the following:

- as alkanolamines, triethylamine, monoethanolamine, diethanolamine, N-methyldiethanolamine, dimethylaminoethanol, diethylaminoethanol, aminomethylpropanol, and the like;
- as other nitrogen-containing compounds, ammonia water, monoethylamine, diethylamine, triethylamine, cyclohexylamine, benzylamine, urea, piperidine, and the like;
- as alkali metal hydroxides, lithium hydroxide, sodium hydroxide, potassium hydroxide, and the like;
- as carbonates of alkali metals, lithium carbonate, sodium carbonate, sodium bicarbonate, potassium carbonate, and the like; and
- as acidic compounds, hydrochloric acid, sulfuric acid, acetic acid, citric acid, maleic acid, maleic anhydride, succinic acid, tartaric acid, malic acid, phosphoric acid, boric acid, fumaric acid, malonic acid, ascorbic acid, and glutamic acid.

One of the above pH adjusters may be used alone, or a combination of two or more pH adjusters may be used.

The blend amount of the pH adjuster is preferably from 0.01 to 5% by mass, more preferably from 0.1 to 3% by mass, and most preferably from 0.2 to 1.5% by mass, relative to the total amount of the water-based inkjet ink.

Furthermore, in the water-based inkjet ink of an embodiment of the present invention, besides the components described above, additives such as anti-foaming agents, preservatives, infrared absorbers, and UV absorbers can be added as appropriate to obtain an ink having the desired physical property values as required. The amount added of these additives is preferably 0.01 to 10% by mass relative to the total mass of the ink.

Note that the water-based inkjet ink of an embodiment of the present invention preferably does not substantially contain a polymerizable monomer.

<pKa Value of Nitrogen-Containing Compound>

As described above, a nitrogen-containing compound having a molecular weight of 500 or less can be used as a water-soluble organic solvent and/or a pH adjuster in the water-based inkjet ink of an embodiment of the present invention. However, depending on the nitrogen-containing compound used, there may be an adverse effect on the dispersion stability and discharge stability of a naphthol-based mixed crystal pigment, and therefore it is preferable that the amount of the nitrogen-containing compound be limited in an embodiment of the present invention.

Note that herein, a nitrogen-containing compound having a molecular weight of 500 or less is simply referred to as a "nitrogen-containing compound". Examples of the nitrogen-containing compound include alkanolamines, chain-like alkylamines, cyclic alkylamines, aromatic amines, chain-like amides, cyclic amides, cyclic carbamates, and ammonia.

In general, in a water-based ink, due to a charge repulsion that occurs among pigment particles, the dispersed state of the pigment is maintained, and dispersion stability is ensured. As a method to maintain dispersion stability over a long period of time, there is a technique of adjusting the pH of the ink to within a range from neutral to weakly basic. By maintaining the pH at neutral to weakly basic, the ion concentration in an electric double layer covering the pigment surface can be increased, an electric double layer repulsive force can be increased, and a large repulsive force can be generated among pigment particles. However, among nitrogen-containing compounds, there are compounds that are acidic and compounds that are strongly basic, and by using these compounds in combination with a naphthol-based mixed crystal pigment, there is a risk that the dispersion stability of the naphthol-based mixed crystal pigment may deteriorate and discharge stability may also deteriorate therewith. Furthermore, when a binder resin (a-1) having an acid value of 1 to 80 mgKOH/g is also used in combination, the compatibility of the binder resin (a-1) with the ink may deteriorate, and the image quality of the printed material may deteriorate.

As a result of intensive research carried out by the inventors of the present invention, from among the nitrogen-containing compounds, the total blend amount of a nitrogen-containing compound having a pKa value of 2 or less (preferably the pKa value is less than 4) or 10 or more (preferably the pKa exceeds 9.5) at 25° C. is preferably 3% by mass or less, and more preferably 1% by mass or less, relative to the total amount of the water-based inkjet ink. This is because these compounds are acidic or strongly basic, and if blended in large amounts, there is a risk that there may be an adverse effect on dispersion stability, discharge stability, and image quality, as described above.

However, when a nitrogen-containing compound is used, it is preferable to use a basic organic compound having a pKa value of 4 to 9.5 at 25° C. Although the detailed causes remain unclear, it is thought that the acid dissociation constant (pKa value) being suitably low and the nitrogen-containing compound being an organic compound suppresses damage to the naphthol-based mixed crystal pigment and the binder resin (a-1).

Specific examples of a basic organic compound having a pKa value of 4 to 9.5 at 25° C. include diethanolamine (pKa=8.9), methyldiethanolamine (pKa=8.5), triethanolamine (pKa=7.8), 1-amino-2-propanol (pKa=9.4), diisopropanolamine (pKa=9.0), triisopropanolamine (pKa=8.0), tris(hydroxymethyl)aminomethane (pKa=8.1), imidazole (pKa=7.0), and aniline (pKa=4.6). From thereamong, in terms of high solubility in an aqueous medium, safety with respect to the human body, and so forth, when a basic organic compound is used, it is preferable to use an alkanolamine, and it is especially preferable to include triethanolamine, which has a low pKa value. Note that one type of the above compounds may be used alone, or a combination of two or more types may be used.

When a basic organic compound having a pKa value of 4 to 9.5 is used, the amount thereof is preferably 1.25% by mass or less, and even more preferably 0.1 to 1.0% by mass, relative to the total amount of the ink. If within the above ranges, deterioration in the image quality of printed materials can be prevented without causing deterioration in dispersion stability and discharge stability.

Note that, from the viewpoint of comprehensively achieving dispersion stability, discharge stability, and image quality for the ink, regardless of the pKa value, it is preferable that the total blend amount of a nitrogen-containing compound be 3% by mass or less, and even more preferably 1.25% by mass or less, relative to the total amount of the water-based inkjet ink.

Note that the pKa value in an embodiment of the present invention can be measured by a known method, for example, a potentiometric titration method. Furthermore, an example of a nitrogen-containing compound having a pKa value of 2 or less at 25° C. is urea (pKa value=0.2), and examples of nitrogen-containing compounds having a pKa value of 10 or more at 25° C. include cyclohexylamine (pKa value=10.6), monoethylamine (pKa value=10.7), diethylamine (pKa value=11.0), triethylamine (pKa value=10.7), and piperidine (pKa value=11.2).

<Method for Producing Water-Based Inkjet Ink>

The water-based inkjet ink of an embodiment of the present invention composed of the components mentioned above can be produced by a known method. In particular, in terms of obtaining an ink having excellent dispersion stability and discharge stability, the following manufacturing method is favorably selected: a pigment dispersion containing a naphthol-based mixed crystal pigment is produced in advance, and then the pigment dispersion, a binder resin (a-1), a surfactant, and so forth are mixed. Examples of methods for producing the water-based inkjet ink of an embodiment of the present invention are described below, but as described above, the production method is not limited to those described below.

(1) Production of Pigment Dispersion (1-1) Method of Performing a Dispersion Treatment Using a Pigment Dispersing Resin that is a Water-Soluble Resin When a water-soluble resin is used as pigment dispersing resin, the pigment dispersing resin and water, and a water-soluble organic solvent as necessary, are mixed and stirred to produce an aqueous solution of pigment dispersing resin.

A naphthol-based mixed crystal pigment and as necessary a dispersion aid, additional water, and (additional) water-soluble organic solvent are added to the aqueous solution of pigment dispersing resin, the resulting mixture is mixed and stirred (premixing), and then a dispersion treatment is performed using a dispersion device. Thereafter, centrifugal separation, filtration, and solid fraction adjustment are carried out as necessary to obtain a pigment dispersion.

(1-2) Method of Performing a Dispersion Treatment Using a Pigment Dispersing Resin that is a Water-Insoluble Resin Furthermore, when producing a dispersion of a naphthol-based mixed crystal pigment coated with a pigment dispersing resin that is a water-insoluble resin, the pigment dispersing resin is dissolved in an organic solvent such as methyl ethyl ketone in advance, and the pigment dispersing resin is neutralized as necessary to produce a pigment dispersing resin solution. A naphthol-based mixed crystal pigment, water, a dispersion aid as necessary, a water-soluble organic solvent, and an additional organic solvent are added to the pigment dispersing resin solution, the resulting mixture is mixed and stirred (premixing), and then a dispersion treatment is performed using a dispersion device. Thereafter, the organic solvent is distilled by distillation under reduced pressure, and centrifugal separation, filtration, and solid fraction adjustment are carried out as necessary to obtain a pigment dispersion.

In methods (1-1) and (1-2) above, the dispersion device used during dispersion treatment of the naphthol-based mixed crystal pigment may be any commonly used dispersion device, and examples thereof include a ball mill, a roll mill, a sand mill, a bead mill, and a nanomizer. From thereamong, a bead mill is preferably used, and specifically is commercially available under product names such as Super Mill, Sand Grinder, Agitator Mill, Grain Mill, Dyno Mill, Pearl Mill and Cobol Mill.

In methods (1-1) and (1-2) above, methods to control the particle size distribution of the pigment dispersion include adjusting the size of the grinding media used in the dispersion device mentioned above, changing the material of the grinding media, increasing the filling ratio of the grinding media, changing the shape of the stirring member (agitator), lengthening the dispersion treatment time, performing classification by filtration or centrifugal separation or the like after the dispersion treatment, and a combination of these methods. In order to ensure that the pigment is within a suitable particle size distribution range, the diameter of the grinding media in the dispersion device is preferably 0.1 to 3 mm. Furthermore, grinding media materials such as glass, zircon, zirconia, and titania can be preferably used.

(1-3) Method of Performing a Grinding/Kneading Treatment Using a Pigment Dispersing Resin In addition, in an embodiment of the present invention, a method employing a grinding/kneading treatment described below can also be used favorably. A naphthol-based mixed crystal pigment, a pigment dispersing resin, a water-soluble organic solvent, an inorganic salt, and as necessary a dispersion aid are kneaded using a kneading device, and then water is added to the resulting mixture, which is mixed and stirred. Then, the inorganic salt and as necessary the water-soluble organic solvent are removed by centrifugal separation, filtration, and washing, and in addition the solid fraction is adjusted to obtain a pigment dispersion.

The kneading device used in the above method (1-3) may be any typically used dispersion device, but in terms of obtaining a printed material having excellent image quality, color development, and color reproducibility, a kneader or a Trimix is preferably used due to being able to knead a mixture of high viscosity and produce a pigment dispersion containing fine pigments. Note that the particle size distribution of the obtained pigment dispersion can be controlled by adjusting the temperature during kneading.

Furthermore, sodium chloride, barium chloride, potassium chloride, sodium sulfate, potassium sulfate, or the like can be used favorably as the inorganic salt.

(2) Preparation of Water-Based Inkjet Ink

A binder resin (a-1), surfactant, water-soluble organic solvent, water, and as necessary a pH adjuster and other additives given above are added to the obtained pigment dispersion and stirred and mixed. Note that as necessary the mixture may be stirred and mixed while being heated in the range of 40 to 100° C.

(3) Removal of Coarse Particles

Coarse particles included in the mixture are removed by techniques such as filtration and centrifugal separation to obtain a water-based inkjet ink. As a method of filtration separation, a known method can be used as appropriate, but when a filter is used, the diameter of the openings therein is preferably 0.3 to 5 μm, and more preferably 0.5 to 3 μm. Furthermore, when filtration is carried out, one type of filter may be used alone, or a plurality of types may be used in combination.

<Characteristics of Water-Based Inkjet Ink>

The water-based inkjet ink of an embodiment of the present invention preferably has a viscosity at 25° C. that is adjusted to 3 to 20 mPa s. In this viscosity range, stable discharge characteristics are exhibited not only for heads having a frequency of 4 to 10 KHz but also for heads having a high frequency of 10 to 70 KHz. In particular, by having the viscosity at 25° C. as 4 to 10 mPa·s, stable discharge can be achieved even when used for an inkjet head having a design resolution of 600 dpi or more. Note that the above viscosity can be measured according to typical methods. Specifically, the viscosity can be measured using an E-type viscometer (TVE25L viscometer manufactured by Toki Sangyo Co., Ltd.) and using 1 mL of ink.

Furthermore, in terms of obtaining a water-based inkjet ink that can be stably discharged, and a printed material having excellent image quality, the water-based inkjet ink of an embodiment of the present invention has a static surface tension at 25° C. that is preferably 18 to 35 mN/m, and particularly preferably 20 to 32 mN/m. Note that static surface tension refers to the surface tension measured according to the Wilhelmy method in an environment at 25° C. Specifically, the static surface tension can be measured using a CBVP-Z manufactured by Kyowa Interface Science Co., Ltd. and using a platinum plate.

In addition, from the viewpoint of obtaining excellent image quality by obtaining favorable wettability on a recording medium with prompt orientation of the surfactant after landing on the recording medium, the inkjet ink of an embodiment of the present invention has a dynamic surface tension at 10 ms according to the maximum bubble pressure method that is preferably 26 to 36 mN/m, more preferably 28 to 36 mN/m, and particularly preferably 30 to 36 mN/m. Note that the dynamic surface tension herein is a value measured in an environment at 25° C. using a bubble pressure dynamic surface tension meter BP100 manufactured by Kruss GmbH.

In the water-based inkjet ink of an embodiment of the present invention, in order to obtain a printed material having excellent color development, the average secondary particle size (D50) of pigments is preferably 40 to 500 nm, more preferably 50 to 400 nm, and particularly preferably 60 to 300 nm. To ensure that the average secondary particle size is within the above favorable ranges, the pigment dispersion treatment step is preferably controlled as described above. Note that the average secondary particle size (D50) of pigments represents the median diameter on a volume basis measured according to the dynamic light scattering method using a particle size distribution measurement device (herein, a Nanotrac UPA EX-150 manufactured by MicrotracBEL Corporation was used).

<Set of Water-Based Inkjet Inks>

The water-based inkjet ink of an embodiment of the present invention may be used for a single color, or depending on the use, can also be used as a set of water-based inkjet inks in which a plurality of colors are combined. From thereamong, a printed material having excellent color reproducibility particularly in the red region can be obtained by also using a yellow ink in combination. Furthermore, by adding a black ink, the level of blackness can be improved, and the legibility of text and the like can be improved. In addition, when printing is to be carried out on a recording medium that is not white, a distinct image can be obtained by also using a white ink in combination.

<Ink-Pretreatment Liquid Set>

The water-based inkjet ink of an embodiment of the present invention can also be used in combination with a pretreatment liquid containing a coagulant, in the form of an ink-pretreatment liquid set. By applying a pretreatment liquid containing a coagulant onto a recording medium, it is possible to form a layer (ink aggregation layer) that deliberately causes aggregation of solid components included in the water-based inkjet ink. Then, by having the water-based inkjet ink land on the ink aggregation layer, bleeding and color irregularities among ink droplets can be prevented and the image quality of printed materials can be significantly improved. Note that this effect is prominent when a permeable substrate is used as a recording medium, and it is possible to obtain a printed material having excellent color development and color reproducibility as well as image quality. Furthermore, depending on the materials used in the pretreatment liquid, the adhesion, rub fastness, and blocking resistance of printed materials can also be further improved.

The term "coagulant" herein means a component that is contained in the water-based inkjet ink, destroys the dispersed state of pigments and resin microparticles and causes them to aggregate, and/or insolubilizes water-soluble resins and causes the water-based inkjet ink to thicken. As a coagulant used in the pretreatment liquid combined with the water-based inkjet ink of an embodiment of the present invention, from the viewpoint of significantly improving image quality, color development, and color reproducibility, it is preferable to include one or more selected from a metal salt and a cationic polymer compound. From thereamong, from the viewpoint of obtaining excellent image quality, color development, and color reproducibility, it is preferable to use a metal salt as the coagulant, and it is particularly preferable to include a salt of a polyvalent metal ion selected from the group consisting of $Ca^{2+}$, $Mg^{2+}$, $Zn^{2+}$, and $Al^{3+}$. Note that when a metal salt is used as the coagulant, the amount thereof is preferably 2 to 30% by mass, and particularly preferably 3 to 25% by mass, relative to the total amount of the pretreatment liquid.

In addition, an organic solvent, surfactant, pH adjuster, anti-foaming agent, preservative, and the like can be added as appropriate to the pretreatment liquid. Specifically, the materials that can be used for each thereof are the same as in the case of the water-based inkjet ink described above.

Note that, from the viewpoint of obtaining a printed material having excellent image quality when the pretreatment liquid is used in combination with the water-based inkjet ink of an embodiment of the present invention, the static surface tension of the pretreatment liquid is preferably 20 to 45 mN/m, more preferably 23 to 40 mN/m, and particularly preferably 25 to 37 mN/m. Note that the static surface tension of the pretreatment liquid can be measured using the same method as that used for the static surface tension of the water-based inkjet ink.

<Inkjet Recording Method>

The water-based inkjet ink of an embodiment of the present invention is used in a recording method in which the water-based inkjet ink is discharged from an inkjet head and applied on a recording medium.

As a pass system in the inkjet recording method, either the single-pass system or the serial system may be employed. In the single-pass system, inkjet ink is discharged only once onto the recording medium and recorded thereon. In the serial system, discharge and recording are performed while a short shuttle head is scanned back and forth in a direction perpendicular to the direction in which the recording medium is conveyed. However, in the case of the serial system, it is necessary to adjust the discharge timing taking into account the movement of the inkjet head, which is likely to cause a deviation in the landing position. Therefore, when printing the water-based inkjet ink of an embodiment of the present invention, the single-pass system is preferably used, particularly a system in which the recording medium passes underneath a fixed inkjet head.

There are also no particular limitations on the system of discharging the water-based ink, and a known system can be used, such as the drop-on-demand system (pressure pulse system) that uses the vibration pressure of a piezo element, and the thermal inkjet (Bubble Jet (registered trademark)) system that uses the pressure generated by a bubble formed by heating the ink.

Furthermore, the amount of ink droplets discharged from the inkjet head is preferably 0.2 to 30 picoliters, and more preferably 1 to 20 picoliters, in terms of also achieving a large drying load reduction effect and improving color reproducibility and other aspects of image quality.

It is preferable to provide a mechanism for drying the water-based inkjet ink of an embodiment of the present invention on a recording medium after the water-based inkjet ink has been applied onto the recording medium by the inkjet printing system. Examples of the drying method used in the drying mechanism include a heating drying method, hot-air drying method, infrared (infrared rays having a wavelength of 700 to 2500 nm, for example) drying method, microwave drying method, drum drying method, and the like.

In an embodiment of the present invention, from the viewpoint of preventing explosive boiling of the liquid components in the water-based ink, and obtaining a printed material having excellent color reproducibility and image quality, the drying temperature is preferably 35 to 100° C. when a heat drying method is employed, and the hot-air temperature is preferably 50 to 250° C. when a hot-air drying method is employed. Furthermore, from the same viewpoint, when an infrared drying method is employed, it is preferable that 50% or more of the integrated value of the total output of the infrared rays used for infrared irradiation be in the wavelength range of 700 to 1500 nm.

Furthermore, the above drying methods may be used alone, or a plurality thereof may be used in succession or in combination simultaneously. For example, through combined use of a heat drying method and a hot-air drying method, the water-based ink can be dried more quickly than when each method is used alone.

<Recording Medium>

The recording medium on which the water-based ink of an embodiment of the present invention is printed is not particularly limited, and any known recording medium can be used as desired, such as a permeable substrate, low-permeation substrate, or non-permeable substrate. As mentioned above, the ink of an embodiment of the present invention can produce a printed material having excellent image quality, color development, and color reproducibility, regardless of the permeability of the recording medium.

Note that, herein, the permeability of a recording medium is determined by a water absorption amount measured by a dynamic scanning absorption meter. Specifically, a recording medium having a water absorption amount of less than 1 $g/m^2$ of pure water at a contact time of 100 msec, as measured by the following method, is considered to be a "non-permeable substrate", a recording medium having a water absorption amount of 1 $g/m^2$ or more and less than 10 $g/m^2$ is considered to be a "low-permeation substrate", and a recording medium having a water absorption amount of 10 $g/m^2$ or more is considered to be a "permeable substrate".

The water absorption amount of a recording medium can be measured under the following conditions. The amount of pure water transferred is measured under the following conditions, using a KM500win manufactured by Kumagai Riki Kogyo Co., Ltd. as a dynamic scanning absorption meter, under the conditions of 23° C. and 50% RH, and using a recording medium that is approximately 15 to 20 cm square.

Measurement method: spiral scanning (spiral method)
Measurement start radius: 20 mm
Measurement end radius: 60 mm
Contact time: 10 to 1,000 msec
Number of sampling points: 19 (measured to result in approximately equal intervals relative to the square root of the contact time)
Scanning interval: 7 mm
Speed switching angle of rotation table: 86.3 degrees
Head box conditions: width 5 mm, slit width 1 mm Examples of permeable substrates include uncoated paper such as woody paper, medium-quality paper, high-quality paper, and recycled paper; fabrics such as cotton, synthetic fiber fabric, silk, linen, and non-woven fabrics; and leather. From thereamong, in terms of obtaining a printed material having excellent color development and image quality for a water-based ink, uncoated paper such as woody paper, medium-quality paper, high-quality paper, and recycled paper is preferred.

Furthermore, examples of non-permeable substrates or low-permeation substrates include plastic substrates such as polyvinyl chloride, polyethylene terephthalate (PET), polypropylene, polyethylene, nylon, polystyrene, and polyvinyl alcohol; coated paper substrates such as coated paper, art paper, and cast paper, metal substrates such as aluminum, iron, stainless steel, and titanium; and glass substrates.

The recording mediums listed above may have smooth or uneven surfaces, and may be transparent, semi-transparent, or opaque. Furthermore, two or more of these recording mediums may affixed to each other to form a medium. In addition, a peelable adhesive layer or the like may be provided on the opposite side to the printing surface, or an adhesive layer or the like may be provided on the printed surface subsequent to printing. Furthermore, the shape of the recording medium used in the inkjet recording method of an embodiment of the present invention may be a roll shape or a sheet shape.

Note that, in order for it to be possible to improve the wettability of the water-based inkjet ink of an embodiment of the present invention, to improve image quality, color reproducibility, and drying properties, and to also improve rub fastness and adhesion for a uniform printed material surface, it is preferable that surface modification such as corona treatment or plasma treatment be performed on the recording mediums listed above.

<Coating Treatment>

The printed surface of a printed material produced using the ink set of an embodiment of the present invention may be subjected to a coating treatment as necessary. Specific examples of the coating treatment include coating or printing of a coating composition, and lamination processing using a dry lamination method, solvent-free lamination method, extrusion lamination method, or the like. Either of these techniques may be selected, or a combination of both may be used.

Note that, when a coating treatment is performed on a printed material by coating or printing a coating composition, either of the following systems may be employed as the coating or printing method: a system in which printing is performed on the recording medium in a non-contact manner as in inkjet printing, or a system in which the coating composition is brought into contact with the recording medium to perform printing. Furthermore, when selecting the system of printing the coating composition on the recording medium in a non-contact manner, it is preferable to use, as the coating composition, an ink that contains substantially no colorant component (clear ink), which excludes pigments from the water-based inkjet ink of an embodiment of the present invention.

EXAMPLES

The present invention is described below in further detail using a series of examples and comparative examples. Note that, in the following description, unless specifically stated otherwise, "parts" and "%" represent "parts by mass" and "% by mass", respectively.

Production Example for Naphthol-Based Mixed Crystal Pigment 1

As the base component, 23.4 parts of 3-amino-4-methoxybenzanilide were added to 364.4 parts of water, stirred thoroughly to prepare a suspension, and then ice was added to adjust the liquid temperature to 5° C. Next, 39.7 parts of 35% hydrochloric acid were added to the suspension and stirred for 1 hour. Thereafter, an aqueous solution of 7.1 parts of sodium nitrite dissolved in 22 parts of water was added and stirred for 1 hour to thereby perform diazotization. Next, 1 part of sulfamic acid was added to the reaction mixture to dissipate the nitrite, after which an aqueous solution composed of 20.7 parts of sodium acetate, 1.8 parts of acetic acid, and 165 parts water was added to make a diazonium aqueous solution.

Meanwhile, as a coupler component, 18.0 parts of 3-hydroxy-2-naphthamide and 2.0 parts of N-(5-chloro-2-methoxyphenyl)-3-hydroxy-2-naphthamide were added to 31.8 parts of a 25% sodium hydroxide aqueous solution and 414 parts of water, and stirred thoroughly to dissolve completely and thereby prepare a coupler aqueous solution.

Then, the coupler aqueous solution was added to the diazonium aqueous solution prepared above, and the mixture was stirred for 1 hour to complete the reaction, after which the slurry mixture was heated to 70° C. and, in addition, filtered and washed to thereby obtain a press cake of a pigment composition, which is a naphthol-based mixed crystal pigment. In addition, this press cake was dried under conditions of 90° C. and 18 hours, and was then ground to obtain a naphthol-based mixed crystal pigment 1.

Production Examples for Naphthol-Based Mixed Crystal Pigments 2 to 13

Naphthol-based mixed crystal pigments 2 to 13 were produced in the same way as the naphthol-based mixed crystal pigment 1 described above, except that the base component and the coupler component were altered as shown in Table 1.

TABLE 1

| | | Naphthol-based mixed crystal pigment No. | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Base component | TM-40 | 23.4 | 23.4 | 23.4 | 23.4 | 23.4 | 23.4 | 23.4 | 23.4 | | 23.4 | 23.4 | 23.4 | 11.7 |
| | TM-20 | | | | | | | | | 23.4 | | | | |
| | 2M-5NA | | | | | | | | | | | | | 11.8 |
| Coupler component | Bonamide | 18 | 14 | 9 | 6 | 1 | 15 | 10 | 8 | 10 | 9 | 11 | | |
| | Naphthol AS-CA | 2 | 6 | 11 | 14 | 19 | | | | | | | | |
| | Naphthol AS-BS | | | | | | 5 | 10 | 12 | | | | | 20 |
| | Naphthol AS | | | | | | | | | 10 | | | | |
| | Naphthol AS-LC | | | | | | | | | | 8 | | 10 | |
| | Naphthol AS-BI | | | | | | | | | | | | | |
| | Naphthol AS-KB | | | | | | | | | | | 8 | | 10 |
| PR150 in mixed crystal pigment (mol %) | | 94.0% | 80.3% | 58.9% | 42.9% | 8.4% | 83.2% | 62.2% | 52.3% | 58.4% | 68.3% | 69.6% | — | — |

Note that the abbreviations for compounds used in Table 1 are as follows. Furthermore, Table 1 also lists the blend amount of C.I. Pigment Red 150 in the naphthol-based mixed crystal pigments (except for naphthol-based mixed crystal pigments 12 and 13 which do not contain C.I. Pigment Red 150 as a constituent element).

TM-40: 3-amino-4-methoxybenzanilide
TM-20: 3-amino-4-methoxybenzamide
2M-5NA: 2-methoxy-5-nitroaniline
Bonamide: 3-hydroxy-2-naphthamide
Naphthol AS: 3-hydroxy-N-phenyl-2-naphthamide
Naphthol AS-BS: 3-hydroxy-3'-nitro-2-naphthanilide
Naphthol AS-LC: N-(4-chloro-2,5-dimethoxyphenyl)-3-hydroxy-2-naphthamide
Naphthol AS-BI: 5-(2-hydroxy-3-naphthoylamino)-1H-benzimidazole-2(3H)-one
Naphthol AS-CA: N-(5-chloro-2-methoxyphenyl)-3-hydroxy-2-naphthamide
Naphthol AS-KB: 5'-chloro-3-hydroxy-2'-methyl-2-naphthanilide Furthermore, the correspondence between the structures of the naphthol-based mixed crystal pigments 1 to 13 and the C.I. Pigment No. is shown in Table 2.

TABLE 2

| | | | Naphthol-based mixed crystal pigment No. | | | | | | | | |
|---|---|---|---|---|---|---|---|---|---|---|---|
| | | | 1 | 2 | 3 | 4 | 5 | 6 | 7 | 8 | 9 | 10 |
| Naphthol-based pigment constituting mixed crystal pigment (First type) | C.I. Pigment No. | | Red 150 | | | | | Red 150 | | — | Red 150 |
| | $R^1$ | | Methoxy group | | | | | Methoxy group | | Methoxy group | Methoxy group |
| | $R^2$ | | Hydrogen atom | | | | | Hydrogen atom | | Hydrogen atom | Hydrogen atom |
| | $R^3$ | | Anilide group | | | | | Anilide group | | Carbamoyl group | Anilide group |
| | $R^4$ | | Hydrogen atom | | | | | Hydrogen atom | | Hydrogen atom | Hydrogen atom |
| | (When R4 is structure represented by general formula (2)) | $R^5$ | | | | | | | | | |
| | | $R^6$ | | | | | | | | | |
| | | $R^7$ | | | | | | | | | |
| Naphthol-based pigment constituting mixed crystal pigment (Second type) | C.I. Pigment No. | | Red 269 | | | | | Red 31 | | Red 245 | Red 146 |
| | $R^1$ | | Methoxy group | | | | | Methoxy group | | Methoxy group | Methoxy group |
| | $R^2$ | | Hydrogen atom | | | | | Hydrogen atom | | Hydrogen atom | Hydrogen atom |
| | $R^3$ | | Anilide group | | | | | Anilide group | | Carbamoyl group | Anilide group |
| | $R^4$ | | Structure represented by general formula (2) | | | | | Structure represented by general formula (2) | | Structure represented by general formula (2) | Structure represented by general formula (2) |
| | (When R4 is structure represented by general formula (2)) | $R^5$ | Methoxy group | | | | | Hydrogen atom | | Hydrogen atom | Methoxy group |
| | | $R^6$ | Hydrogen atom | | | | | Hydrogen atom | | Hydrogen atom | Chlorine atom |
| | | $R^7$ | Chlorine atom | | | | | Nitro group | | Hydrogen atom | Methoxy group |
| | | | z | z | z | z | z | z | z | z | z | z |

TABLE 2-continued

| | | | Naphthol-based mixed crystal pigment No. | | |
|---|---|---|---|---|---|
| | | | 11 | 12 | 13 |
| Naphthol-based pigment constituting mixed crystal pigment (First type) | C.I. Pigment No. | | Red 150 | Red 146 | Red 23 |
| | $R^1$ | | Methoxy group | Methoxy group | Methoxy group |
| | $R^2$ | | Hydrogen atom | Hydrogen atom | Hydrogen atom |
| | $R^3$ | | Anilide group | Anilide group | Nitro group |
| | $R^4$ | | Hydrogen atom | Structure represented by general formula (2) | Structure represented by general formula (2) |
| (When R4 is structure represented by general formula (2)) | $R^5$ | | | Methoxy group | Hydrogen atom |
| | $R^6$ | | | Chlorine atom | Hydrogen atom |
| | $R^7$ | | | Methoxy group | Nitro group |
| Naphthol-based pigment constituting mixed crystal pigment (Second type) | C.I. Pigment No. | | | Red 147 | Red 31 |
| | $R^1$ | | | Methoxy group | Methoxy group |
| | $R^2$ | | | Hydrogen atom | Hydrogen atom |
| | $R^3$ | | | Anilide group | Anilide group |
| | $R^4$ | | | Structure represented by general formula (2) | Structure represented by general formula (2) |
| (When R4 is structure represented by general formula (2)) | $R^5$ | | | Methyl group | Hydrogen atom |
| | $R^6$ | | | Hydrogen atom | Hydrogen atom |
| | $R^7$ | | | Chlorine atom | Nitro group |
| | z | z | z | z | z |

Note that the naphthol-based mixed crystal pigments 1 to 13 were all confirmed to be mixed crystal by X-ray diffraction analysis using an X-ray diffraction device (X'Pert PRO MRD) manufactured by Panalytical Ltd.

Production Example for Pigment Dispersing Resin

A reaction container fitted with a gas inlet tube, a thermometer, a condenser, and a stirrer was charged with 93.4 parts of butanol, and the reaction container was flushed with nitrogen gas. The inside of the reaction container was heated to 110° C., and a mixture of 30 parts of acrylic acid, 35 parts of styrene, and 35 parts of lauryl methacrylate as polymerizable monomers, and 6 parts of V-601 (manufactured by Wako Pure Chemical Industries, Ltd.) as a polymerization initiator was added dropwise over 2 hours to perform a polymerization reaction. Following completion of the dropwise addition, the reaction was carried out for 3 hours at 110° C., after which 0.6 parts of V-601 was added, and the reaction was continued for a further 1 hour at 110° C. Thereafter, the reaction system was cooled to room temperature, 39 parts of dimethylaminoethanol was added to perform neutralization, and then 100 parts of water was added. Thereafter, the mixed solution was heated to at least 100° C. and butanol was distilled, and water was used to adjust the solid fraction to 30%, thereby obtaining an aqueous solution of a pigment dispersing resin (solid fraction: 30%). Note that the weight average molecular weight of the pigment dispersing resin was 16,000 and the acid value was 230, measured by the methods described above.

Production Example for Magenta Pigment Dispersion 1

An amount of 20 parts of the naphthol-based mixed crystal pigment 1, 20 parts of a water-based solution of pigment dispersing resin (solid fraction: 30%), and 60 parts of water were sequentially introduced into a mixing container equipped with a stirrer, and then premixing was performed. Thereafter, main dispersion was carried out using a Dyno Mill having a capacity of 0.6 L filled with 1800 g of zirconia beads having a 0.5 mm diameter, thereby obtaining by a magenta pigment dispersion 1 (pigment concentration: 20%).

Note that "water-based solution" mentioned above means a solution containing an aqueous solvent and a component dispersed and/or dissolved in the aqueous solvent.

Production Examples for Magenta Pigment Dispersions 2 to 18

Magenta pigment dispersions 2 to 13 (all having a pigment concentration of 20%) were produced in the same way as the magenta pigment dispersion 1, except that the naphthol-based mixed crystal pigments 2 to 13 were used as pigments. Furthermore, magenta pigment dispersions 14 to 18 (all having a pigment concentration of 20%) were obtained in the same way as the magenta pigment dispersion 1 described above, except that the pigments listed below were used.

Magenta pigment dispersion 14: Toshiki Red 150TR (C.I. Pigment Red 150 manufactured by Tokyo Shikizai Industry Co., Ltd.)

Magenta pigment dispersion 15: Toshiki Red 269N (C.I. Pigment Red 269 manufactured by Tokyo Shikizai Industry Co., Ltd.)

Magenta pigment dispersion 16: Toshiki Red 31N (C.I. Pigment Red 31 manufactured by Tokyo Shikizai Industry Co., Ltd.)

Magenta pigment dispersion 17: FASTGEN SUPER MAGENTA RG (C.I. Pigment Red 122 manufactured by DIC Corporation)

Magenta pigment dispersion 18: FASTGEN SUPER MAGENTA RY (quinacridone solid solution manufactured by DIC Corporation)

Production Examples for Binder Resins 1 to 8 ((Meth)Acrylic Water-Soluble Resin, Styrene-(Meth)Acrylic Water-Soluble Resin)

With the exception of altering, as shown in Table 3, the composition of the mixture added dropwise to butanol (types and amounts of the polymerizable monomers, and the amount of V-601), the amount of V-601 added after reacting for 3 hours at 110° C., and the amount of dimethylaminoethanol used for neutralization, aqueous solutions of binder resins 1 to 8 (solid fraction: 30%), which are (meth)acrylic water-soluble resins or styrene-(meth)acrylic water-soluble resins, were obtained using the same operations as those described for the pigment dispersing resins above.

aqueous solution were added, and a polymerization reaction was started while the temperature inside the reaction container was maintained at 60° C. After performing the reaction for 5 minutes at 60° C., the remainder of the emulsion precursor (151.5 parts), 9 parts of a potassium persulfate 5% aqueous solution, and 1.8 parts of an anhydrous sodium bisulphite 1% aqueous solution were added dropwise over 1.5 hours, and thereafter the reaction continued for a further

TABLE 3

| | Polymerizable monomer amount added (parts) | | | | | Producing condition | | | Parameter of binder resin | | |
|---|---|---|---|---|---|---|---|---|---|---|---|
| | | | | | | V-601 amount added firstly | V-601 amount subsequently | Dimethylamino ethanol amount | Acid value | Glass transition temperature | Weight average molecular |
| | St | MAA | MMA | BA | STMA | (parts) | added (parts) | (parts) | (mgKOH/g) | (° C.) | weight |
| Binder resin 1 | | 2 | 88 | 10 | | 6 | 0.6 | 2.2 | 12 | 80 | 15,000 |
| Binder resin 2 | | 6 | 84 | 10 | | 9 | 0.9 | 6.6 | 38 | 82 | 8,500 |
| Binder resin 3 | | 9 | 81 | 10 | | 6 | 0.6 | 9.9 | 57 | 83 | 14,000 |
| Birder resin 4 | | 12 | 78 | 10 | | 6 | 0.6 | 13.2 | 77 | 85 | 14,000 |
| Binder resin 5 | | 15 | 75 | 10 | | 6 | 0.6 | 16.5 | 95 | 86 | 13,000 |
| Binder resin 6 | 30 | 5 | 30 | 30 | 5 | 6 | 0.6 | 5.5 | 30 | 34 | 16,500 |
| Binder resin 7 | 20 | 5 | 5 | 70 | | 1.5 | 0.15 | 5.5 | 31 | −20 | 38,000 |
| Binder resin 8 | 10 | 10 | 35 | 45 | | 6 | 0.6 | 11.0 | 62 | 13 | 15,500 |

Note that the acid values, glass transition temperatures, and weight average molecular weights of binder resins 1 to 8 are also given in Table 3. Furthermore, the abbreviations for polymerizable monomers given in Table 2 are as follows.
St: styrene
MAA: methacrylic acid
MMA: methyl methacrylate
BA: butyl acrylate
STMA: stearyl methacrylate Production Examples for Binder Resins 9 to 11 (Styrene-(Meth)Acrylic Resin Microparticles)

A reaction container fitted with a gas inlet tube, a thermometer, a condenser, and a stirrer was charged with 40 parts of water and 0.2 parts of AQUALON KH-10 (manufactured by DKS Co. Ltd.) as a surfactant, to produce a surfactant aqueous solution. Furthermore, 50 parts of methyl methacrylate, 29 parts of butyl acrylate, 20 parts of styrene, and 1 part of methacrylic acid as polymerizable monomers, 1.8 parts of AQUALON KH-10 as a surfactant, and 51.2 parts of water were added in a separate mixing container and mixed thoroughly to produce an emulsion precursor.

An amount of 1.5 parts of the produced emulsion precursor was added to a reaction container containing the surfactant aqueous solution and mixed thoroughly. Next, the temperature inside the reaction container was raised to 60° C., the reaction container was flushed with nitrogen gas, and thereafter 1 part of a potassium persulfate 5% aqueous solution and 0.2 parts of an anhydrous sodium bisulphite 1%

2 hours. The reaction system was then cooled to 30° C., and diethylaminoethanol was added to bring the pH of the mixed solution to 8.5, water was additionally used to adjust the solid fraction to 30%, thereby obtaining an aqueous dispersion of binder resin 9 (30% solid content), constituted by styrene methacrylic resin microparticles.

Furthermore, with the exception of altering the polymerizable monomers as shown in Table 4, aqueous dispersions of binder resins 10 and 11 (solid fraction: 30%), constituted by styrene-(meth)acrylic resin microparticles, were obtained using the same operations as those described for the binder resin 9.

TABLE 4

| | Polymerizable monomer amount added (parts) | | | | | Parameter of binder resin | |
|---|---|---|---|---|---|---|---|
| | | | | | | Acid value | Glass transition temperature |
| | St | MAA | MMA | BA | PME-400 | (mgKOH/g) | (° C.) |
| Binder resin 9 | 20 | 1 | 50 | 29 | | 6 | 36 |
| Binder resin 10 | 25 | 1 | 15 | 59 | | 6 | −10 |
| Binder resin 11 | 15 | | 20 | 55 | 10 | 0 | −17 |

Note that the acid values and glass transition temperatures of binder resins 9 to 11 are also given in Table 4. Furthermore, from among the abbreviations for polymerizable monomers shown in Table 4, the abbreviations for materials not shown in Table 3 are as follows.
PME-400: methoxy polyethylene glycol methacrylate (BLEMMER PME-400 manufactured by NOF Corporation)

Production Examples for Binder Resins 12 to 13 ((Meth)Acrylic Resin Microparticles, Styrene-(Meth)Acrylic Resin Microparticles)

A reaction container fitted with a gas inlet, a thermometer, a condenser, and a stirrer was charged with 20 parts of toluene, 7.5 parts of methacrylic acid and 7.5 parts of methyl methacrylate as polymerizable monomers, 0.9 parts of 2,2'-azobisisobutyronitrile as a polymerization initiator, and 3.6 parts of 2-(dodecylthiocarbonothioylthio)-isobutyric acid, and the reaction container was flushed with nitrogen gas. The inside of the reaction container was heated to 75° C. and a polymerization reaction was conducted for 3 hours, thereby obtaining a copolymer (A block) composed of methacrylic acid and methyl methacrylate.

Following completion of the above polymerization reaction, the reaction system was cooled to room temperature, and 60 parts of toluene, and 15 parts of methyl methacrylate, 10 parts of styrene, 45 parts of butyl acrylate, and 15 parts of lauryl methacrylate as polymerizable monomers were introduced to the reaction container, and the reaction container was flushed with nitrogen gas. The inside of the reaction container was then heated to 75° C. and a polymerization reaction was conducted for 3 hours, thereby obtaining an A-B block polymer (binder resin 12) in which a copolymer (B block) composed of methyl methacrylate, styrene, butyl acrylate, and lauryl methacrylate was added to the A block.

Thereafter, the reaction system was cooled to normal temperature, 9.3 parts of dimethylaminoethanol was then added to the reaction container to perform neutralization, and then 200 parts of water was added. Next, the mixed solution was heated and toluene was distilled, after which water was used to adjust the solid fraction to 30%, thereby obtaining an aqueous dispersion of binder resin 12 (solid fraction: 30%), constituted by styrene-(meth)acrylic resin microparticles.

Furthermore, with the exception of altering the polymerizable monomers as shown in Table 5, an aqueous dispersion of binder resin 13 (solid fraction: 30%), constituted by (meth)acrylic resin microparticles, was obtained using the same operations as those described for the binder resin 12.

TABLE 5

| | Polymerizable monomer | | | | | | Parameter of binder resin | | |
|---|---|---|---|---|---|---|---|---|---|
| | amount added (parts) | | | | | | | Gass transition | Weight average |
| | A block | | | B block | | | Acid value | temperature | molecular |
| | MAA | MMA | St | MMA | BA | LMA | (mgKOH/g) | (° C.) | weight |
| Binder resin 12 | 7.5 | 7.5 | 10 | 15 | 45 | 15 | 47 | −11 | 18,000 |
| Binder resin 13 | 7.5 | 7.5 | | 60 | | 25 | 46 | 42 | 19,500 |

Note that the acid values, glass transition temperatures, and weight average molecular weights of binder resins 12 and 13 are also given in Table 5. Furthermore, from among the abbreviations for polymerizable monomers shown in Table 5, the abbreviations for materials not shown in Tables 3 and 4 are as follows.

LMA: lauryl methacrylate

Production Examples for Binder Resins 14 to 16
(Urethane Water-Soluble Resin)

A reaction container fitted with a gas inlet, a thermometer, a condenser, and a stirrer was charged with 43.5 parts of polypropylene glycol (molecular weight 1,000) and 44.5 parts of isophorone diisocyanate as polymerizable monomers, and 0.007 parts of dibutyltin dilaurate, and the reaction container was flushed with nitrogen gas, after which the inside of the reaction container was heated to 100° C. and a polymerization reaction was conducted for 5 hours. The reaction system was cooled to approximately 60° C., after which 150 parts of methyl ethyl ketone, 9 parts of dimethylolpropionic acid, and 3 parts of neopentyl glycol were added, the inside of the reaction container was heated to 80° C., and then a polymerization reaction was conducted. Thereafter, the reaction system was cooled to room temperature, and then 20 parts of methanol was added and the reaction was stopped. Water was then added, and a potassium hydroxide aqueous solution was additionally added while stirring to perform neutralization. The mixed solution was then heated under reduced pressure to distill methyl ethyl ketone and unreacted methanol, after which water was used to adjust the solid fraction to 10%, thereby obtaining an aqueous solution of binder resin 14 (solid fraction: 10%), constituted by a urethane water-soluble resin.

Furthermore, with the exception of altering the polymerizable monomers as shown in Table 6, aqueous dispersions of binder resins 15 and 16 (solid fraction: 10%), constituted by urethane water-soluble resin, were obtained using the same operations as those described for the binder resin 14.

TABLE 6

|  | Polymerizable monomer amount added (parts) | | | | | Parameter of binder resin | |
| --- | --- | --- | --- | --- | --- | --- | --- |
|  | PPG 1000 | PTMG 2000 | IPDI | DMPA | NPG | Acid value (mgKOH/g) | Weight average molecular weight |
| Binder resin 14 | 43.5 |  | 44.5 | 9 | 3 | 37 | 20,000 |
| Binder resin 15 |  | 39.7 | 44.2 | 13.1 | 3 | 54 | 15,000 |
| Binder resin 16 | 35.7 |  | 44.5 | 16.8 | 3 | 69 | 20,000 |

Note that the acid values and weight average molecular weights of binder resins 14 to 16 are also given in Table 6. Furthermore, the abbreviations for polymerizable monomers given in Table 6 are as follows.

PPG 1000: polypropylene glycol (molecular weight 1,000)
PTM 2000: polytetramethylene ether glycol (molecular weight 2,000)
IPDI: isophorone diisocyanate
DMPA: dimethylolpropionic acid
NPG: neopentyl glycol Production Examples for Binder Resins 17 to 18 (Urethane Resin Microparticles)

A reaction container fitted with a gas inlet, a thermometer, a condenser and a stirrer was charged with 150 parts of methyl ethyl ketone, and 34.3 parts of polypropylene glycol (molecular weight 2,000), 22.7 parts of isophorone diisocyanate, 17.2 parts of hexamethylene diisocyanate, and 23.9 parts of dimethylolpropionic acid as polymerizable monomers, and the reaction container was flushed with nitrogen gas, after which the inside of the reaction container was heated to 80° C. and a polymerization reaction was conducted for 6 hours. Next, 1.9 parts of trimethylolpropane was additionally added and the reaction was continued at 80° C. Thereafter, the reaction system was cooled to room temperature, after which water was added and a potassium hydroxide aqueous solution was additionally added while stirring to perform neutralization. The mixed solution was then heated under reduced pressure and methyl ethyl ketone was distilled, after which water was used to adjust the solid fraction to 20%, thereby obtaining an aqueous dispersion of binder resin 17 (solid fraction: 20%), constituted by urethane resin microparticles.

Furthermore, with the exception of altering the polymerizable monomers as shown in Table 7, an aqueous dispersion of binder resin 18 (solid fraction: 10%), constituted by urethane resin microparticles, was obtained using the same operations as those described for the binder resin 17.

PC (HD) 2000: polycarbonate diol having 1,6-hexanediol as the main skeleton (molecular weight 2,000)
HDI: hexamethylene diisocyanate
TMP: trimethylolpropane <Binder Resin 19 (Urethane/Acrylic Composite Resin Microparticles), 20 to 21 (Olefin Resin Microparticles)>

In the ink production example described hereinafter, in addition to the binder resins 1 to 18 described above, the urethane/acrylic composite resin microparticles and the olefin resin microparticles described below, which are commercially available products, were used as binder resins 19 to 21.

Binder resin 19: UREARNO W600 (urethane/acrylic composite resin microparticles manufactured by Arakawa Chemical Industries, Ltd., solid fraction: 35% (containing isopropyl alcohol 5%), acid value: 20 mgKOH/g, glass transition temperature: −55° C.)
Binder resin 20: AUROREN AE-301 (manufactured by Nippon Paper Industries Co., Ltd., solid fraction: 30%, acid value: 25 mgKOH/g, melting point: 70° C.)
Binder resin 21: ZE-1224 (manufactured by Seiko PMC Corporation, solid fraction: 30%, acid value: 50 mgKOH/g, melting point: 70° C.)

Production Examples for Water-Based Inkjet Inks 1 to 96

The materials described below were sequentially introduced into a mixing container while stirring with a disper mixer, and the mixture was stirred until sufficiently uniform. Thereafter, filtration was conducted through a membrane filter having a pore size of 1 μm, and a water-based inkjet ink 1 was obtained:

| Magenta pigment dispersion 1 (pigment concentration: 20%) | 20 parts |
| --- | --- |
| Aqueous solution of binder resin 1 (solid fraction: 30%) | 16.7 parts |
| 1,2-propanediol | 15 parts |

TABLE 7

|  | Polymerizable monomer amount added (parts) | | | | | | Acid value of binder resin (mgKOH/g) |
| --- | --- | --- | --- | --- | --- | --- | --- |
|  | PPG 2000 | PC(HD) 2000 | IPDI | HDI | DMPA | TMP |  |
| Binder resin 17 | 34.3 |  | 22.7 | 17.2 | 23.9 | 1.9 | 98 |
| Binder resin 18 |  | 69 | 11.8 | 9 | 8.3 | 1.9 | 34 |

Note that the acid values of binder resins 17 to 18 are also given in Table 7. Furthermore, from among the abbreviations for polymerizable monomers shown in Table 7, the abbreviations for materials not shown in Table 6 are as follows.

PPG 2000: polypropylene glycol (molecular weight 2,000)

-continued

| Surfynol 420 | 1 part |
| --- | --- |
| Proxel GXL | 0.05 parts |
| Ion-exchanged water | 47.25 parts |

Furthermore, with the exception that the materials listed in Table 8 below were used, water-based inkjet inks 2 to 96 were obtained using the same method as that used for the water-based inkjet ink 1.

TABLE 8

| Water-based inkjet ink No. | | | 1 | 2 | 3 | 4 | 5 | 6 | 7 |
|---|---|---|---|---|---|---|---|---|---|
| Pigment dispersion | Magenta pigment dispersion 1 | | 20 | | | | | | |
| | Magenta pigment dispersion 2 | | | 20 | | | | | |
| | Magenta pigment dispersion 3 | | | | 20 | | | | |
| | Magenta pigment dispersion 4 | | | | | 20 | | | |
| | Magenta pigment dispersion 5 | | | | | | 20 | | |
| | Magenta pigment dispersion 6 | | | | | | | 20 | |
| | Magenta pigment dispersion 7 | | | | | | | | 20 |
| | Magenta pigment dispersion 8 | | | | | | | | |
| | Magenta pigment dispersion 9 | | | | | | | | |
| | Magenta pigment dispersion 10 | | | | | | | | |
| | Magenta pigment dispersion 11 | | | | | | | | |
| | Magenta pigment dispersion 12 | | | | | | | | |
| | Magenta pigment dispersion 13 | | | | | | | | |
| | Magenta pigment dispersion 14 | | | | | | | | |
| | Magenta pigment dispersion 15 | | | | | | | | |
| | Magenta pigment dispersion 16 | | | | | | | | |
| | Magenta pigment dispersion 17 | | | | | | | | |
| | Magenta pigment dispersion 18 | | | | | | | | |
| Aqueous solution or aqueous dispersion of binder resin | Binder resin 1 | Acid value 12 mgKOH/g | | | | | | | |
| | Binder resin 2 | Acid value 38 mgKOH/g | | | | | | | |
| | Binder resin 3 | Acid value 57 mgKOH/g | | | | | | | |
| | Binder resin 4 | Acid value 77 mgKOH/g | | | | | | | |
| | Binder resin 5 | Acid value 95 mgKOH/g | | | | | | | |
| | Binder resin 6 | Acid value 30 mgKOH/g | 16.7 | 16.7 | 16.7 | 16.7 | 16.7 | 16.7 | 16.7 |
| | Binder resin 7 | Acid value 31 mgKOH/g | | | | | | | |
| | Binder resin 8 | Acid value 62 mgKOH/g | | | | | | | |
| Water-soluble organic solvent | IPA | Boiling point 83° C. | | | | | | | |
| | MFG | Boiling point 121° C. | | | | | | | |
| | 1,2-PD | Boiling point 188° C. | 15 | 15 | 15 | 15 | 15 | 15 | 15 |
| | 1,2-BD | Boiling point 192° C. | | | | | | | |
| | DEG | Boiling point 244° C. | | | | | | | |
| | GY | Boiling point 290° C. | | | | | | | |
| Surfactant | S.104 | HLB3.0 | | | | | | | |
| | S.420 | HLB4.0 | 1 | 1 | 1 | 1 | 1 | 1 | 1 |
| | S.465 | HLB13.2 | | | | | | | |
| Others | | Proxel GXL | 0.05 | 0.05 | 0.05 | 0.05 | 0.05 | 0.05 | 0.05 |
| | | Water | 47.25 | 47.25 | 47.25 | 47.25 | 47.25 | 47.25 | 47.25 |
| Spec | | Amount of water-soluble organic solvents having a boiling point of 240° C. or higher | 0 | 0 | 0 | 0 | 0 | 0 | 0 |
| | | Weight average boiling point of water-soluble organic solvent (° C.) | 188.0 | 188.0 | 188.0 | 188.0 | 188.0 | 188.0 | 188.0 |

| Water-based inkjet ink No. | | 8 | 9 | 10 | 11 | 12 | 13 |
|---|---|---|---|---|---|---|---|
| Pigment dispersion | Magenta pigment dispersion 1 | | | | | | |
| | Magenta pigment dispersion 2 | | | | | | |
| | Magenta pigment dispersion 3 | | | | | | |
| | Magenta pigment dispersion 4 | | | | | | |
| | Magenta pigment dispersion 5 | | | | | | |
| | Magenta pigment dispersion 6 | | | | | | |
| | Magenta pigment dispersion 7 | | | | | | |
| | Magenta pigment dispersion 8 | 20 | | | | | |
| | Magenta pigment dispersion 9 | | 20 | | | | |
| | Magenta pigment dispersion 10 | | | 20 | | | |
| | Magenta pigment dispersion 11 | | | | 20 | | |
| | Magenta pigment dispersion 12 | | | | | 20 | |

TABLE 8-continued

| | | | | | | | | |
|---|---|---|---|---|---|---|---|---|
| Pigment dispersion | Magenta pigment dispersion 13 | | | | | | | 20 |
| | Magenta pigment dispersion 14 | | | | | | | |
| | Magenta pigment dispersion 15 | | | | | | | |
| | Magenta pigment dispersion 16 | | | | | | | |
| | Magenta pigment dispersion 17 | | | | | | | |
| | Magenta pigment dispersion 18 | | | | | | | |
| Aqueous solution or aqueous dispersion of binder resin | Binder resin 1 | Acid value 12 mgKOH/g | | | | | | |
| | Binder resin 2 | Acid value 38 mgKOH/g | | | | | | |
| | Binder resin 3 | Acid value 57 mgKOH/g | | | | | | |
| | Binder resin 4 | Acid value 77 mgKOH/g | | | | | | |
| | Binder resin 5 | Acid value 95 mgKOH/g | | | | | | |
| | Binder resin 6 | Acid value 30 mgKOH/g | 16.7 | 16.7 | 16.7 | 16.7 | 16.7 | 16.7 |
| | Binder resin 7 | Acid value 31 mgKOH/g | | | | | | |
| | Binder resin 8 | Acid value 62 mgKOH/g | | | | | | |
| Water-soluble organic solvent | IPA | Boiling point 83° C. | | | | | | |
| | MFG | Boiling point 121° C. | | | | | | |
| | 1,2-PD | Boiling point 188° C. | 15 | 15 | 15 | 15 | 15 | 15 |
| | 1,2-BD | Boiling point 192° C. | | | | | | |
| | DEG | Boiling point 244° C. | | | | | | |
| | GY | Boiling point 290° C. | | | | | | |
| Surfactant | S.104 | HLB3.0 | | | | | | |
| | S.420 | HLB4.0 | 1 | 1 | 1 | 1 | 1 | 1 |
| | S.465 | HLB13.2 | | | | | | |
| Others | Proxel GXL | | 0.05 | 0.05 | 0.05 | 0.05 | 0.05 | 0.05 |
| | Water | | 47.25 | 47.25 | 47.25 | 47.25 | 47.25 | 47.25 |
| Spec | Amount of water-soluble organic solvents having a boiling point of 240° C. or higher | | 0 | 0 | 0 | 0 | 0 | 0 |
| | Weight average boiling point of water-soluble organic solvent (° C.) | | 188.0 | 188.0 | 188.0 | 188.0 | 188.0 | 188.0 |

| | Water-based inkjet ink No. | | 14 | 15 | 16 | 17 | 18 | 19 | 20 | 21 | 22 |
|---|---|---|---|---|---|---|---|---|---|---|---|
| Pigment dispersion | Magenta pigment dispersion 6 | | 20 | 20 | 20 | 20 | 20 | 20 | 20 | 20 | 20 |
| Aqueous solution or aqueous dispersion of binder resin | Binder resin 1 | Acid value 12 mgKOH/g | 16.7 | | | | | | | | |
| | Binder resin 2 | Acid value 38 mgKOH/g | | 16.7 | | | | | | | |
| | Binder resin 3 | Acid value 57 mgKOH/g | | | 16.7 | | | | | | |
| | Binder resin 4 | Acid value 77 mgKOH/g | | | | 16.7 | | | | | |
| | Binder resin 5 | Acid value 95 mgKOH/g | | | | | | | | | |
| | Binder resin 6 | Acid value 30 mgKOH/g | | | | | | | | | |
| | Binder resin 7 | Acid value 31 mgKOH/g | | | | | 16.7 | | | | |
| | Binder resin 8 | Acid value 62 mgKOH/g | | | | | | 16.7 | | | |
| | Binder resin 9 | Acid value 6 mgKOH/g | | | | | | | 16.7 | | |
| | Binder resin 10 | Acid value 6 mgKOH/g | | | | | | | | 16.7 | |
| | Binder resin 11 | Acid value 0 mgKOH/g | | | | | | | | | |
| | Binder resin 12 | Acid value 47 mgKOH/g | | | | | | | | | 16.7 |
| | Binder resin 13 | Acid value 46 mgKOH/g | | | | | | | | | |
| | Binder resin 14 | Acid value 37 mgKOH/g | | | | | | | | | |
| | Binder resin 15 | Acid value 54 mgKOH/g | | | | | | | | | |

TABLE 8-continued

|  |  |  |  |  |  |  |  |  |  |  |
|---|---|---|---|---|---|---|---|---|---|---|
|  | Binder resin 16 | Acid value 69 mgKOH/g |  |  |  |  |  |  |  |  |
|  | Binder resin 17 | Acid value 98 mgKOH/g |  |  |  |  |  |  |  |  |
|  | Binder resin 18 | Acid value 34 mgKOH/g |  |  |  |  |  |  |  |  |
|  | Binder resin 19 | Acid value 20 mgKOH/g |  |  |  |  |  |  |  |  |
|  | Binder resin 20 | Acid value 25 mgKOH/g |  |  |  |  |  |  |  |  |
|  | Binder resin 21 | Acid value 50 mgKOH/g |  |  |  |  |  |  |  |  |
| Water-soluble organic solvent | IPA | Boiling point 83° C. |  |  |  |  |  |  |  |  |
|  | MFG | Boiling point 121° C. |  |  |  |  |  |  |  |  |
|  | 1,2-PD | Boiling point 188° C. | 15 | 15 | 15 | 15 | 15 | 15 | 15 | 15 | 15 |
|  | 1,2-BD | Boiling point 192° C. |  |  |  |  |  |  |  |  |
|  | DEG | Boiling point 244° C. |  |  |  |  |  |  |  |  |
|  | GY | Boiling point 290° C. |  |  |  |  |  |  |  |  |
| Surfactant | S.104 | HLB3.0 |  |  |  |  |  |  |  |  |
|  | S.420 | HLB4.0 | 1 | 1 | 1 | 1 | 1 | 1 | 1 | 1 | 1 |
|  | S.465 | HLB13.2 |  |  |  |  |  |  |  |  |
|  | TW280 | HLB3.5 |  |  |  |  |  |  |  |  |
|  | TG432 | HLB7.5 |  |  |  |  |  |  |  |  |
|  | BYK347 | HLB8.6 |  |  |  |  |  |  |  |  |
|  | TG440 | HLB13.5 |  |  |  |  |  |  |  |  |
| Others | Proxel GXL |  | 0.05 | 0.05 | 0.05 | 0.05 | 0.05 | 0.05 | 0.05 | 0.05 | 0.05 |
|  | Water |  | 47.25 | 47.25 | 47.25 | 47.25 | 47.25 | 47.25 | 47.25 | 47.25 | 47.25 |
| Spec | Amount of water-soluble organic solvents having a boiling point of 240° C. or higher |  | 0 | 0 | 0 | 0 | 0 | 0 | 0 | 0 | 0 |
|  | Weight average boiling point of water-soluble organic solvent (° C.) |  | 188.0 | 188.0 | 188.0 | 188.0 | 188.0 | 188.0 | 188.0 | 188.0 | 188.0 |

| Water-based inkjet ink No. |  |  | 23 | 24 | 25 | 26 | 27 | 28 | 29 | 30 |
|---|---|---|---|---|---|---|---|---|---|---|
| Pigment dispersion | Magenta pigment dispersion 6 |  | 20 | 20 | 20 | 20 | 20 | 20 | 20 | 20 |
| Aqueous solution or aqueous dispersion of binder resin | Binder resin 1 | Acid value 12 mgKOH/g |  |  |  |  |  |  |  |  |
|  | Binder resin 2 | Acid value 38 mgKOH/g |  |  |  |  |  |  |  |  |
|  | Binder resin 3 | Acid value 57 mgKOH/g |  |  |  |  |  |  |  |  |
|  | Binder resin 4 | Acid value 77 mgKOH/g |  |  |  |  |  |  |  |  |
|  | Binder resin 5 | Acid value 95 mgKOH/g |  |  |  |  |  |  |  |  |
|  | Binder resin 6 | Acid value 30 mgKOH/g |  |  |  |  |  |  |  |  |
|  | Binder resin 7 | Acid value 31 mgKOH/g |  |  |  |  |  |  |  |  |
|  | Binder resin 8 | Acid value 62 mgKOH/g |  |  |  |  |  |  |  |  |
|  | Binder resin 9 | Acid value 6 mgKOH/g |  |  |  |  |  |  |  |  |
|  | Binder resin 10 | Acid value 6 mgKOH/g |  |  |  |  |  |  |  |  |
|  | Binder resin 11 | Acid value 0 mgKOH/g |  |  |  |  |  |  |  |  |
|  | Binder resin 12 | Acid value 47 mgKOH/g |  |  |  |  |  |  |  |  |
|  | Binder resin 13 | Acid value 46 mgKOH/g | 16.7 |  |  |  |  |  |  |  |
|  | Binder resin 14 | Acid value 37 mgKOH/g |  | 50.0 |  |  |  |  |  |  |
|  | Binder resin 15 | Acid value 54 mgKOH/g |  |  | 50.0 |  |  |  |  |  |
|  | Binder resin 16 | Acid value 69 mgKOH/g |  |  |  | 50.0 |  |  |  |  |
|  | Binder resin 17 | Acid value 98 mgKOH/g |  |  |  |  |  |  |  |  |
|  | Binder resin 18 | Acid value 34 mgKOH/g |  |  |  |  |  |  | 25.0 |  |

TABLE 8-continued

| | | | | | | | | | | |
|---|---|---|---|---|---|---|---|---|---|---|
| | | Binder resin 19 | Acid value 20 mgKOH/g | | | | | 14.3 | | |
| | | Binder resin 20 | Acid value 25 mgKOH/g | | | | | | 16.7 | |
| | | Binder resin 21 | Acid value 50 mgKOH/g | | | | | | | 16.7 |
| Water-soluble organic solvent | IPA | Boiling point 83° C. | | | | | | | | |
| | MFG | Boiling point 121° C. | | | | | | | | |
| | 1,2-PD | Boiling point 188° C. | 15 | 15 | 15 | 15 | 15 | 15 | 15 | 15 |
| | 1,2-BD | Boiling point 192° C. | | | | | | | | |
| | DEG | Boiling point 244° C. | | | | | | | | |
| | GY | Boiling point 290° C. | | | | | | | | |
| Surfactant | S.104 | HLB3.0 | | | | | | | | |
| | S.420 | HLB4.0 | 1 | 1 | 1 | 1 | 1 | 1 | 1 | 1 |
| | S.465 | HLB13.2 | | | | | | | | |
| | TW280 | HLB3.5 | | | | | | | | |
| | TG432 | HLB7.5 | | | | | | | | |
| | BYK347 | HLB8.6 | | | | | | | | |
| | TG440 | HLB13.5 | | | | | | | | |
| Others | Proxel GXL | | 0.05 | 0.05 | 0.05 | 0.05 | 0.05 | 0.05 | 0.05 | 0.05 |
| | Water | | 47.25 | 13.95 | 13.95 | 13.95 | 38.95 | 49.65 | 47.25 | 47.25 |
| Spec | Amount of water-soluble organic solvents having a boiling point of 240° C. or higher | | 0 | 0 | 0 | 0 | 0 | 0 | 0 | 0 |
| | Weight average boiling point of water-soluble organic solvent (° C.) | | 188.0 | 188.0 | 188.0 | 188.0 | 188.0 | 183.2 | 188.0 | 188.0 |

| | | Water-based inkjet ink No. | 31 | 32 | 33 | 34 | 35 | 36 | 37 | 38 |
|---|---|---|---|---|---|---|---|---|---|---|
| Pigment dispersion | Magenta pigment dispersion 6 | | 20 | 20 | 20 | 20 | 20 | 20 | 20 | 20 |
| Aqueous solution or aqueous dispersion of binder resin | Binder resin 1 | Acid value 12 mgKOH/g | | | | | | | | |
| | Binder resin 2 | Acid value 38 mgKOH/g | | | | | | | | |
| | Binder resin 3 | Acid value 57 mgKOH/g | | | | | | | | |
| | Binder resin 4 | Acid value 77 mgKOH/g | | | | | | | | |
| | Binder resin 5 | Acid value 95 mgKOH/g | | | | | | | | |
| | Binder resin 6 | Acid value 30 mgKOH/g | | | | | 6.7 | 18.3 | 13.3 | |
| | Binder resin 7 | Acid value 31 mgKOH/g | | | | | | | | |
| | Binder resin 8 | Acid value 62 mgKOH/g | | | | | | | | |
| | Binder resin 9 | Acid value 6 mgKOH/g | | | | | | | 10.0 | |
| | Binder resin 10 | Acid value 6 mgKOH/g | | | | | | | | |
| | Binder resin 11 | Acid value 0 mgKOH/g | | | | | | | | |
| | Binder resin 12 | Acid value 47 mgKOH/g | 5.0 | 10.0 | 33.3 | 40.0 | | | | |
| | Binder resin 13 | Acid value 46 mgKOH/g | | | | | | | | |
| | Binder resin 14 | Acid value 37 mgKOH/g | | | | | 20.0 | | | 50.0 |
| | Binder resin 15 | Acid value 54 mgKOH/g | | | | | | | | |
| | Binder resin 16 | Acid value 69 mgKOH/g | | | | | | | | |
| | Binder resin 20 | Acid value 25 mgKOH/g | | | | | | 5.0 | | |
| | Binder resin 21 | Acid value 50 mgKOH/g | | | | | | | 3.3 | |
| Water-soluble organic solvent | IPA | Boiling point 83° C. | | | | | | | | |
| | MFG | Boiling point 121° C. | | | | | | | | |

TABLE 8-continued

|  |  |  | | | | | | | | |
|---|---|---|---|---|---|---|---|---|---|---|
| | 1,2-PD | Boiling point 188° C. | 15 | 15 | 15 | 15 | 15 | 15 | 15 | 15 |
| | 1,2-BD | Boiling point 192° C. | | | | | | | | |
| | DEG | Boiling point 244° C. | | | | | | | | |
| | GY | Boiling point 290° C. | | | | | | | | |
| Surfactant | S.104 | HLB3.0 | | | | | | | | 1 |
| | S.420 | HLB4.0 | 1 | 1 | 1 | 1 | 1 | 1 | 1 | |
| | S.465 | HLB13.2 | | | | | | | | |
| | TW280 | HLB3.5 | | | | | | | | |
| | TG432 | HLB7.5 | | | | | | | | |
| | BYK347 | HLB8.6 | | | | | | | | |
| | TG440 | HLB13.5 | | | | | | | | |
| | S-202 | HLB4.9 | | | | | | | | |
| | P-210 | HLB12.9 | | | | | | | | |
| | E750 | HLB15.6 | | | | | | | | |
| Others | Proxel GXL | | 0.05 | 0.05 | 0.05 | 0.05 | 0.05 | 0.05 | 0.05 | 0.05 |
| | Water | | 58.95 | 53.95 | 30.65 | 23.95 | 37.25 | 40.65 | 37.35 | 13.95 |
| Spec | Amount of water-soluble organic solvents having a boiling point of 240° C. or higher | | 0 | 0 | 0 | 0 | 0 | 0 | 0 | 0 |
| | Weight average boiling point of water-soluble organic solvent (° C.) | | 188.0 | 188.0 | 188.0 | 188.0 | 188.0 | 188.0 | 188.0 | 188.0 |

| Water-based inkjet ink No. | | | 39 | 40 | 41 | 42 | 43 | 44 | 45 | 46 |
|---|---|---|---|---|---|---|---|---|---|---|
| Pigment dispersion | Magenta pigment dispersion 6 | | 20 | 20 | 20 | 20 | 20 | 20 | 20 | 20 |
| Aqueous solution or aqueous dispersion of binder resin | Binder resin 1 | Acid value 12 mgKOH/g | | | | | | | | |
| | Binder resin 2 | Acid value 38 mgKOH/g | | | | | | | | |
| | Binder resin 3 | Acid value 57 mgKOH/g | | | | | | | | |
| | Binder resin 4 | Acid value 77 mgKOH/g | | | | | | | | |
| | Binder resin 5 | Acid value 95 mgKOH/g | | | | | | | | |
| | Binder resin 6 | Acid value 30 mgKOH/g | | | | | | | | |
| | Binder resin 7 | Acid value 31 mgKOH/g | | | | | | | | |
| | Binder resin 8 | Acid value 62 mgKOH/g | | | | | | | | |
| | Binder resin 9 | Acid value 6 mgKOH/g | | | | | | | | |
| | Binder resin 10 | Acid value 6 mgKOH/g | | | | | | | | |
| | Binder resin 11 | Acid value 0 mgKOH/g | | | | | | | | |
| | Binder resin 12 | Acid value 47 mgKOH/g | | | | | | | | |
| | Binder resin 13 | Acid value 46 mgKOH/g | | | | | | | | |
| | Binder resin 14 | Acid value 37 mgKOH/g | 50.0 | 50.0 | 50.0 | 50.0 | 50.0 | 50.0 | 50.0 | 50.0 |
| | Binder resin 15 | Acid value 54 mgKOH/g | | | | | | | | |
| | Binder resin 16 | Acid value 69 mgKOH/g | | | | | | | | |
| | Binder resin 20 | Acid value 25 mgKOH/g | | | | | | | | |
| | Binder resin 21 | Acid value 50 mgKOH/g | | | | | | | | |
| Water-soluble organic solvent | IPA | Boiling point 83° C. | | | | | | | | |
| | MFG | Boiling point 121° C. | | | | | | | | |
| | 1,2-PD | Boiling point 188° C. | 15 | 15 | 15 | 15 | 15 | 15 | 15 | 15 |
| | 1,2-BD | Boiling point 192° C. | | | | | | | | |
| | DEG | Boiling point 244° C. | | | | | | | | |
| | GY | Boiling point 290° C. | | | | | | | | |

TABLE 8-continued

| Surfactant | S.104 | HLB3.0 | | | | | | | | |
|---|---|---|---|---|---|---|---|---|---|---|
| | S.420 | HLB4.0 | | | | | | | | |
| | S.465 | HLB13.2 | 1 | | | | | | | |
| | TW280 | HLB3.5 | | 1 | | | | | | |
| | TG432 | HLB7.5 | | | 1 | | | | | |
| | BYK347 | HLB8.6 | | | | 1 | | | | |
| | TG440 | HLB13.5 | | | | | 1 | | | |
| | S-202 | HLB4.9 | | | | | | 1 | | |
| | P-210 | HLB12.9 | | | | | | | 1 | |
| | E750 | HLB15.6 | | | | | | | | 1 |
| Others | Proxel GXL | | 0.05 | 0.05 | 0.05 | 0.05 | 0.05 | 0.05 | 0.05 | 0.05 |
| | Water | | 13.95 | 13.95 | 13.95 | 13.95 | 13.95 | 13.95 | 13.95 | 13.95 |
| Spec | Amount of water-soluble organic solvents having a boiling point of 240° C. or higher | | 0 | 0 | 0 | 0 | 0 | 0 | 0 | 0 |
| | Weight average boiling point of water-soluble organic solvent (° C.) | | 188.0 | 188.0 | 188.0 | 188.0 | 188.0 | 188.0 | 188.0 | 188.0 |

| | Water-based inkjet ink No. | | 47 | 48 | 49 | 50 | 51 | 52 | 53 | 54 |
|---|---|---|---|---|---|---|---|---|---|---|
| Pigment dispersion | Magenta pigment dispersion 6 | | 20 | 20 | 20 | 20 | 20 | 20 | 20 | 20 |
| Aqueous solution or aqueous dispersion of binder resin | Binder resin 13 | Acid value 46 mgKOH/g | | | | | | | | |
| | Binder resin 14 | Acid value 37 mgKOH/g | 50.0 | 50.0 | 50.0 | 50.0 | 50.0 | 50.0 | 50.0 | 50.0 |
| | Binder resin 20 | Acid value 25 mgKOH/g | | | | | | | | |
| Water-soluble organic solvent | IPA | Boiling point 83° C. | | | | | | | | |
| | MFG | Boiling point 121° C. | | | | | | | | |
| | 1,2-PD | Boiling point 188° C. | 15 | 15 | 15 | 15 | 15 | 15 | 15 | 15 |
| | 1,2-BD | Boiling point 192° C. | | | | | | | | |
| | DEG | Boiling point 244° C. | | | | | | | | |
| | GY | Boiling point 290° C. | | | | | | | | |
| Surfactant | S.104 | HLB3.0 | 0.2 | 0.5 | 2.5 | 4 | | | | 0.5 |
| | S.420 | HLB4.0 | | | | | 0.5 | 0.5 | | |
| | S.465 | HLB13.2 | | | | | 0.5 | | | |
| | TW280 | HLB3.5 | | | | | | | 0.5 | |
| | TG432 | HLB7.5 | | | | | | | | 0.5 |
| | BYK347 | HLB8.6 | | | | | | | | |
| | TG440 | HLB13.5 | | | | | | | 0.5 | |
| | S-202 | HLB4.9 | | | | | | | | |
| | P-210 | HLB12.9 | | | | | | | | 0.5 |
| | E750 | HLB15.6 | | | | | | | | |
| Others | Proxel GXL | | 0.05 | 0.05 | 0.05 | 0.05 | 0.05 | 0.05 | 0.05 | 0.05 |
| | Water | | 14.75 | 14.45 | 12.45 | 10.95 | 13.95 | 13.95 | 13.95 | 13.95 |
| Spec | Amount of water-soluble organic solvents having a boiling point of 240° C. or higher | | 0 | 0 | 0 | 0 | 0 | 0 | 0 | 0 |
| | Weight average boiling point of water-soluble organic solvent (° C.) | | 188.0 | 188.0 | 188.0 | 188.0 | 188.0 | 188.0 | 188.0 | 188.0 |

| | Water-based inkjet ink No. | | 55 | 56 | 57 | 58 | 59 | 60 | 61 |
|---|---|---|---|---|---|---|---|---|---|
| Pigment dispersion | Magenta pigment dispersion 6 | | 20 | 20 | 20 | 20 | 20 | 20 | 20 |
| Aqueous solution or aqueous dispersion of binder resin | Binder resin 13 | Acid value 46 mgKOH/g | | 20.0 | 20.0 | 20.0 | 20.0 | 20.0 | 20.0 |
| | Binder resin 14 | Acid value 37 mgKOH/g | 50.0 | | | | | | |
| | Binder resin 20 | Acid value 25 mgKOH/g | | 3.3 | 3.3 | 3.3 | 3.3 | 3.3 | 3.3 |
| Water-soluble organic solvent | IPA | Boiling point 83° C. | | | | | | | |
| | MFG | Boiling point 121° C. | | | | | | | |
| | 1,2-PD | Boiling point 188° C. | 15 | 7 | 10.5 | 13 | 7 | 10.5 | 13.5 |
| | 1,2-BD | Boiling point 192° C. | | | | | | | |

TABLE 8-continued

|  |  |  |  |  |  |  |  |  |  |
|---|---|---|---|---|---|---|---|---|---|
|  | DEG | Boiling point 244° C. |  |  |  |  | 8 | 4.5 | 1.5 |
|  | GY | Boiling point 290° C. |  | 8 | 4.5 | 2 |  |  |  |
| Surfactant | S.104 | HLB3.0 |  |  |  |  |  |  |  |
|  | S.420 | HLB4.0 |  |  |  |  |  |  |  |
|  | S.465 | HLB13.2 | 0.5 | 0.5 | 0.5 | 0.5 | 0.5 | 0.5 | 0.5 |
|  | TW280 | HLB3.5 | 0.5 | 0.5 | 0.5 | 0.5 | 0.5 | 0.5 | 0.5 |
|  | TG432 | HLB7.5 |  |  |  |  |  |  |  |
|  | BYK347 | HLB8.6 |  |  |  |  |  |  |  |
|  | TG440 | HLB13.5 |  |  |  |  |  |  |  |
|  | S-202 | HLB4.9 |  |  |  |  |  |  |  |
|  | P-210 | HLB12.9 |  |  |  |  |  |  |  |
|  | E750 | HLB15.6 |  |  |  |  |  |  |  |
| Others | Proxel GXL |  | 0.05 | 0.05 | 0.05 | 0.05 | 0.05 | 0.05 | 0.05 |
|  | Water |  | 13.95 | 40.65 | 40.65 | 40.65 | 40.65 | 40.65 | 40.65 |
| Spec | Amount of water-soluble organic solvents having a boiling point of 240° C. or higher |  | 0 | 8 | 4.5 | 2 | 8 | 4.5 | 1.5 |
|  | Weight average boiling point of water-soluble organic solvent (° C.) |  | 188.0 | 242.4 | 218.6 | 201.6 | 217.9 | 204.8 | 193.6 |

| Water-based inkjet ink No. |  |  | 62 | 63 | 64 | 65 | 66 | 67 | 68 | 69 | 70 | 71 | 72 |
|---|---|---|---|---|---|---|---|---|---|---|---|---|---|
| Pigment dispersion | Magenta pigment dispersion 6 |  | 20 | 20 | 20 | 20 | 20 | 20 | 20 | 20 | 20 | 20 | 20 |
| Aqueous solution or aqueous dispersion of binder resin | Binder resin 13 | Acid value 46 mgKOH/g | 20.0 | 20.0 | 20.0 | 20.0 | 20.0 | 20.0 | 20.0 | 20.0 | 20.0 | 20.0 | 20.0 |
|  | Binder resin 20 | Acid value 25 mgKOH/g | 3.3 | 3.3 | 3.3 | 3.3 | 3.3 | 3.3 | 3.3 | 3.3 | 3.3 | 3.3 | 3.3 |
| Water-soluble organic solvent | IPA | Boiling point 83° C. | 15 |  |  |  |  |  |  |  |  |  |  |
|  | MFG | Boiling point 121° C. |  | 15 |  |  |  |  |  |  |  |  |  |
|  | 1,2-PD | Boiling point 188° C. |  |  | 15 |  |  |  |  |  | 5 | 25 | 30 |
|  | 1,2-BD | Boiling point 192° C. |  |  |  | 15 |  |  |  |  |  |  |  |
|  | DEG | Boiling point 244° C. |  |  |  |  |  |  |  |  |  |  |  |
|  | GY | Boiling point 290° C. |  |  |  |  |  |  |  |  |  |  |  |
| Surfactant | S.104 | HLB3.0 |  |  |  |  |  |  |  |  |  |  |  |
|  | S.420 | HLB4.0 |  |  |  |  |  |  |  |  |  |  |  |
|  | S.465 | HLB13.2 | 0.5 | 0.5 | 0.5 | 0.5 | 0.5 | 0.5 | 0.5 | 0.5 | 0.5 | 0.5 | 0.5 |
|  | TW280 | HLB3.5 | 0.5 | 0.5 | 0.5 | 0.5 | 0.5 | 0.5 | 0.5 | 0.5 | 0.5 | 0.5 | 0.5 |
|  | TG432 | HLB7.5 |  |  |  |  |  |  |  |  |  |  |  |
|  | BYK347 | HLB8.6 |  |  |  |  |  |  |  |  |  |  |  |
|  | TG440 | HLB13.5 |  |  |  |  |  |  |  |  |  |  |  |
| pH adjuster | トリエタノールアミン |  |  |  |  |  |  |  |  |  |  |  |  |
|  | ジエタノールアミン |  |  |  |  |  |  |  |  |  |  |  |  |
|  | 28% NH₃ |  |  |  |  |  |  |  |  |  |  |  |  |
|  | DMAE |  |  |  |  |  |  |  |  |  |  |  |  |
|  | CHA |  |  |  |  |  |  |  |  |  |  |  |  |
| Others | Proxel GXL |  | 0.05 | 0.05 | 0.05 | 0.05 | 0.05 | 0.05 | 0.05 | 0.05 | 0.05 | 0.05 | 0.05 |
|  | Water |  | 40.65 | 40.65 | 40.65 | 40.65 | 55.65 | 55.65 | 55.65 | 55.65 | 50.65 | 30.65 | 25.65 |
| Spec | Amount of water-soluble organic solvents having a boiling point of 240° C. or higher |  | 0 | 0 | 0 | 0 | 0 | 0 | 0 | 0 | 0 | 0 | 0 |
|  | Weight average boiling point of water-soluble organic solvent (° C.) |  | 83.0 | 121.0 | 188.0 | 192.0 | — | — | — | — | 188.0 | 188.0 | 188.0 |

| Water-based inkjet ink No. |  |  | 73 | 74 | 75 | 76 | 77 | 78 | 79 | 80 |
|---|---|---|---|---|---|---|---|---|---|---|
| Pigment dispersion | Magenta pigment dispersion 6 |  | 20 | 20 | 20 | 20 | 20 | 20 | 20 | 20 |
| Aqueous solution or aqueous dispersion of binder resin | Binder resin 13 | Acid value 46 mgKOH/g | 20.0 | 20.0 | 20.0 | 20.0 | 20.0 | 20.0 | 20.0 | 20.0 |
|  | Binder resin 20 | Acid value 25 mgKOH/g | 3.3 | 3.3 | 3.3 | 3.3 | 3.3 | 3.3 | .3.3 | 3.3 |
| Water-soluble organic solvent | IPA | Boiling point 83° C. |  |  |  |  |  | 5 |  |  |
|  | MFG | Boiling point 121° C. |  |  |  |  |  |  | 5 | 10 |

TABLE 8-continued

|  |  |  |  |  |  |  |  |  |  |  |
|---|---|---|---|---|---|---|---|---|---|---|
|  | 1,2-PD | Boiling point 188° C. | 15 | 15 | 15 | 15 | 15 | 15 | 15 |  |
|  | 1,2-BD | Boiling point 192° C. |  |  |  |  |  |  |  | 10 |
|  | DEG | Boiling point 244° C. |  |  |  |  |  |  |  |  |
|  | GY | Boiling point 290° C. |  |  |  |  |  |  |  |  |
| Surfactant | S.104 | HLB3.0 |  |  |  |  |  |  |  |  |
|  | S.420 | HLB4.0 |  |  |  |  |  |  |  |  |
|  | S.465 | HLB13.2 | 0.5 | 0.5 | 0.5 | 0.5 | 0.5 | 1 | 1 | 1 |
|  | TW280 | HLB3.5 | 0.5 | 0.5 | 0.5 | 0.5 | 0.5 | 1 | 1 | 1 |
|  | TG432 | HLB7.5 |  |  |  |  |  |  |  |  |
|  | BYK347 | HLB8.6 |  |  |  |  |  |  |  |  |
|  | TG440 | HLB13.5 |  |  |  |  |  |  |  |  |
| pH adjuster | ﾋﾄﾞﾛｷｼﾄﾞ |  | 1 |  |  |  |  |  |  |  |
|  | ｼﾞﾋﾄﾞﾛｷｼﾄﾞ |  |  | 1 |  |  |  |  |  |  |
|  | 28% NH$_3$ |  |  |  | 3.9 |  |  |  |  |  |
|  | DMAE |  |  |  |  | 1.1 |  |  |  |  |
|  | CHA |  |  |  |  |  | 1.1 |  |  |  |
| Others | Proxel GXL |  | 0.05 | 0.05 | 0.05 | 0.05 | 0.05 | 0.05 | 0.05 | 0.05 |
|  | Water |  | 39.65 | 39.65 | 36.75 | 39.55 | 39.55 | 34.65 | 34.65 | 34.65 |
| Spec | Amount of water-soluble organic solvents having a boiling point of 240° C. or higher |  | 1 | 1 | 0 | 0 | 0 | 0 | 0 | 0 |
|  | Weight average boiling point of water-soluble organic solvent (° C.) |  | 188.0 | 188.0 | 188.0 | 184.2 | 184.3 | 161.8 | 171.3 | 156.5 |

| Water-based inkjet ink No. |  |  | 81 | 82 | 83 | 84 | 85 | 86 | 87 | 88 |
|---|---|---|---|---|---|---|---|---|---|---|
| Pigment dispersion | Magenta pigment dispersion 1 |  |  |  |  |  |  |  |  |  |
|  | Magenta pigment dispersion 2 |  |  |  |  |  |  |  |  |  |
|  | Magenta pigment dispersion 3 |  |  |  |  |  |  |  |  |  |
|  | Magenta pigment dispersion 4 |  |  |  |  |  |  |  |  |  |
|  | Magenta pigment dispersion 5 |  |  |  |  |  |  |  |  |  |
|  | Magenta pigment dispersion 6 |  |  |  |  |  |  |  |  |  |
|  | Magenta pigment dispersion 7 |  |  |  |  |  |  |  |  |  |
|  | Magenta pigment dispersion 8 |  |  |  |  |  |  |  |  |  |
|  | Magenta pigment dispersion 9 |  |  |  |  |  |  |  |  |  |
|  | Magenta pigment dispersion 10 |  |  |  |  |  |  |  |  |  |
|  | Magenta pigment dispersion 11 |  |  |  |  |  |  |  |  |  |
|  | Magenta pigment dispersion 12 |  |  |  |  |  |  |  |  |  |
|  | Magenta pigment dispersion 13 |  |  |  |  |  |  |  |  |  |
|  | Magenta pigment dispersion 14 |  | 20 | 30 |  |  |  |  | 15 | 15 |
|  | Magenta pigment dispersion 15 |  |  |  | 20 |  |  |  | 15 |  |
|  | Magenta pigment dispersion 16 |  |  |  |  | 20 |  |  |  | 15 |
|  | Magenta pigment dispersion 17 |  |  |  |  |  | 20 |  |  |  |
|  | Magenta pigment dispersion 18 |  |  |  |  |  |  | 20 |  |  |
| Aqueous solution or aqueous dispersion of binder resin | Binder resin 1 | Acid value 12 mgKOH/g |  |  |  |  |  |  |  |  |
|  | Binder resin 2 | Acid value 38 mgKOH/g |  |  |  |  |  |  |  |  |
|  | Binder resin 3 | Acid value 57 mgKOH/g |  |  |  |  |  |  |  |  |
|  | Binder resin 4 | Acid value 77 mgKOH/g |  |  |  |  |  |  |  |  |
|  | Binder resin 5 | Acid value 95 mgKOH/g |  |  |  |  |  |  |  |  |
|  | Binder resin 6 | Acid value 30 mgKOH/g | 16.7 | 16.7 | 16.7 | 16.7 | 16.7 | 16.7 | 16.7 | 16.7 |
|  | Binder resin 7 | Acid value 31 mgKOH/g |  |  |  |  |  |  |  |  |
|  | Binder resin 8 | Acid value 62 mgKOH/g |  |  |  |  |  |  |  |  |
|  | Binder resin 9 | Acid value 6 mgKOH/g |  |  |  |  |  |  |  |  |
|  | Binder resin 10 | Acid value 6 mgKOH/g |  |  |  |  |  |  |  |  |
|  | Binder resin 11 | Acid value 0 mgKOH/g |  |  |  |  |  |  |  |  |
|  | Binder resin 12 | Acid value 47 mgKOH/g |  |  |  |  |  |  |  |  |
|  | Binder resin 13 | Acid value 46 mgKOH/g |  |  |  |  |  |  |  |  |

TABLE 8-continued

|  |  |  |  |  |  |  |  |  |  |
|---|---|---|---|---|---|---|---|---|---|
|  | Binder resin 14 | Acid value 37 mgKOH/g |  |  |  |  |  |  |  |
|  | Binder resin 15 | Acid value 54 mgKOH/g |  |  |  |  |  |  |  |
|  | Binder resin 16 | Acid value 69 mgKOH/g |  |  |  |  |  |  |  |
|  | Binder resin 17 | Acid value 98 mgKOH/g |  |  |  |  |  |  |  |
|  | Binder resin 18 | Acid value 34 mgKOH/g |  |  |  |  |  |  |  |
|  | Binder resin 19 | Acid value 20 mgKOH/g |  |  |  |  |  |  |  |
|  | Binder resin 20 | Acid value 25 mgKOH/g |  |  |  |  |  |  |  |
|  | Binder resin 21 | Acid value 50 mgKOH/g |  |  |  |  |  |  |  |
| Water-soluble organic solvent | IPA | Boiling point 83° C. |  |  |  |  |  |  |  |
|  | MFG | Boiling point 121° C. |  |  |  |  |  |  |  |
|  | 1,2-PD | Boiling point 188° C. | 15 | 15 | 15 | 15 | 15 | 15 | 15 | 15 |
|  | 1,2-BD | Boiling point 192° C. |  |  |  |  |  |  |  |
|  | DEG | Boiling point 244° C. |  |  |  |  |  |  |  |
|  | GY | Boiling point 290° C. |  |  |  |  |  |  |  |
| Surfactant | S.104 | HLB3.0 |  |  |  |  |  |  |  |
|  | S.420 | HLB4.0 | 1 | 1 | 1 | 1 | 1 | 1 | 1 | 1 |
|  | S.465 | HLB13.2 |  |  |  |  |  |  |  |
|  | TW280 | HLB3.5 |  |  |  |  |  |  |  |
|  | TG432 | HLB7.5 |  |  |  |  |  |  |  |
|  | BYK347 | HLB8.6 |  |  |  |  |  |  |  |
|  | TG440 | HLB13.5 |  |  |  |  |  |  |  |
| Others | Proxel GXL |  | 0.05 | 0.05 | 0.05 | 0.05 | 0.05 | 0.05 | 0.05 | 0.05 |
|  | Water |  | 47.25 | 37.25 | 47.25 | 47.25 | 47.25 | 47.25 | 37.25 | 37.25 |
| Spec | Amount of water-soluble organic solvents having a boiling point of 240° C. or higher |  | 0 | 0 | 0 | 0 | Q | 0 | 0 | 0 |
|  | Weight average boiling point of water-soluble organic solvent (° C.) |  | 188.0 | 188.0 | 188.0 | 188.0 | 188.0 | 188.0 | 188.0 | 188.0 |

| Water-based inkjet ink No. |  |  | 89 | 90 | 91 | 92 | 93 | 94 | 95 | 96 |
|---|---|---|---|---|---|---|---|---|---|---|
| Pigment dispersion | Magenta pigment dispersion 1 |  |  |  |  |  |  |  |  |  |
|  | Magenta pigment dispersion 2 |  |  |  |  |  |  |  |  |  |
|  | Magenta pigment dispersion 3 |  |  |  |  |  |  |  |  |  |
|  | Magenta pigment dispersion 4 |  |  |  |  |  |  |  |  |  |
|  | Magenta pigment dispersion 5 |  |  |  |  |  |  |  |  |  |
|  | Magenta pigment dispersion 6 |  |  | 20 | 20 | 20 | 20 | 20 | 20 | 20 |
|  | Magenta pigment dispersion 7 |  |  |  |  |  |  |  |  |  |
|  | Magenta pigment dispersion 8 |  |  |  |  |  |  |  |  |  |
|  | Magenta pigment dispersion 9 |  |  |  |  |  |  |  |  |  |
|  | Magenta pigment dispersion 10 |  |  |  |  |  |  |  |  |  |
|  | Magenta pigment dispersion 11 |  |  |  |  |  |  |  |  |  |
|  | Magenta pigment dispersion 12 |  |  |  |  |  |  |  |  |  |
|  | Magenta pigment dispersion 13 |  |  |  |  |  |  |  |  |  |
|  | Magenta pigment dispersion 14 |  | 15 |  |  |  |  |  |  |  |
|  | Magenta pigment dispersion 15 |  |  |  |  |  |  |  |  |  |
|  | Magenta pigment dispersion 16 |  |  |  |  |  |  |  |  |  |
|  | Magenta pigment dispersion 17 |  | 15 |  |  |  |  |  |  |  |
|  | Magenta pigment dispersion 18 |  |  |  |  |  |  |  |  |  |
| Aqueous solution or aqueous dispersion of binder resin | Binder resin 1 | Acid value 12 mgKOH/g |  |  |  |  |  |  |  |  |
|  | Binder resin 2 | Acid value 38 mgKOH/g |  |  |  |  |  |  |  |  |
|  | Binder resin 3 | Acid value 57 mgKOH/g |  |  |  |  |  |  |  |  |
|  | Binder resin 4 | Acid value 77 mgKOH/g |  |  |  |  |  |  |  |  |
|  | Binder resin 5 | Acid value 95 mgKOH/g |  |  | 16.7 |  |  |  |  |  |
|  | Binder resin 6 | Acid value 30 mgKOH/g |  | 16.7 |  |  |  |  | 20.0 | 20.0 |
|  | Binder resin 7 | Acid value 31 mgKOH/g |  |  |  |  |  |  |  |  |
|  | Binder resin 8 | Acid value 62 mgKOH/g |  |  |  |  |  |  |  |  |

TABLE 8-continued

| | | | | | | | | | | |
|---|---|---|---|---|---|---|---|---|---|---|
| | Binder resin 9 | Acid value 6 mgKOH/g | | | | | | | | |
| | Binder resin 10 | Acid value 6 mgKOH/g | | | | | | | | |
| | Binder resin 11 | Acid value 0 mgKOH/g | | 16.7 | | | | | | |
| | Binder resin 12 | Acid value 47 mgKOH/g | | | | | | | | |
| | Binder resin 13 | Acid value 46 mgKOH/g | | | | | | | | |
| | Binder resin 14 | Acid value 37 mgKOH/g | | | | | | 50.0 | | |
| | Binder resin 15 | Acid value 54 mgKOH/g | | | | | | | | |
| | Binder resin 16 | Acid value 69 mgKOH/g | | | | | | | | |
| | Binder resin 17 | Acid value 98 mgKOH/g | | | | 25.0 | | | | |
| | Binder resin 18 | Acid value 34 mgKOH/g | | | | | | | | |
| | Binder resin 19 | Acid value 20 mgKOH/g | | | | | | | | |
| | Binder resin 20 | Acid value 25 mgKOH/g | | | | | | | | 3.3 | 3.3 |
| | Binder resin 21 | Acid value 50 mgKOH/g | | | | | | | | |
| Water-soluble organic solvent | IPA | Boiling point 83° C. | | | | | | | | |
| | MFG | Boiling point 121° C. | | | | | | | | |
| | 1,2-PD | Boiling point 188° C. | 15 | 15 | 15 | 15 | 15 | 15 | 5 | 5 |
| | 1,2-BD | Boiling point 192° C. | | | | | | | | |
| | DEG | Boiling point 244° C. | | | | | | | 10 | |
| | GY | Boiling point 290° C. | | | | | | | | 10 |
| Surfactant | S.104 | HLB3.0 | | | | | | | 0.5 | 0.5 |
| | S.420 | HLB4.0 | 1 | 1 | 1 | 1 | 1 | | | |
| | S.465 | HLB13.2 | | | | | | | | |
| | TW280 | HLB3.5 | | | | | | | 0.5 | 0.5 |
| | TG432 | HLB7.5 | | | | | | | | |
| | BYK347 | HLB8.6 | | | | | | | | |
| | TG440 | HLB13.5 | | | | | | | | |
| Others | Proxel GXL | | 0.05 | 0.05 | 0.05 | 0.05 | 0.05 | 0.05 | 0.05 | 0.05 |
| | Water | | 37.25 | 47.25 | 47.25 | 38.95 | 63.95 | 14.95 | 40.65 | 40.65 |
| Spec | Amount of water-soluble organic solvents having a boiling point of 240° C. or higher | | 0 | 0 | 0 | 0.05 | 0 | 0 | 10 | 10 |
| | Weight average boiling point of water-soluble organic solvent (° C.) | | 188.0 | 188.0 | 188.0 | 188.0 | 188.0 | 188.0 | 225.3 | 256.0 |

Note that the materials shown in Table 8 are as follows.

(Water-Soluble Organic Solvents)

IPA: isopropyl alcohol (boiling point: 83° C.)
MFG: propylene glycol monomethyl ether (boiling point: 120° C.)
1,2-PD: 1,2-propanediol (boiling point: 188° C.)
1,2-BD: 1,2-butanediol (boiling point: 192° C.)
DEG: diethylene glycol (boiling point: 244° C.)
GY: glycerol (boiling point: 290° C.)

(Surfactants)

S.104: Surfynol 104 (acetylenediol-based surfactant manufactured by Nissin Chemical Industry Co., Ltd., HLB value: 3.0)
S.420: Surfynol 420 (acetylenediol-based surfactant manufactured by Nissin Chemical Industry Co., Ltd., HLB value: 4.0)
S.465: Surfynol 465 (acetylenediol-based surfactant manufactured by Nissin Chemical Industry Co., Ltd., HLB value: 13.2)
TW280: TEGO Wet 280 (siloxane-based surfactant manufactured by Evonik Industries AG, HLB value: 3.5)
TG432: TEGO Glide 432 (siloxane-based surfactant manufactured by Evonik Industries AG, HLB value: 7.5)
BYK347: BYK-347 (siloxane-based surfactant manufactured by BYK-Chemic GmbH, HLB value: 8.6)
TG440: TEGO Glide 440 (siloxane-based surfactant manufactured by Evonik Industries AG, HLB value: 13.5)
S-202: NONION S-202 (polyoxyalkylene-based surfactant manufactured by NOF Corporation, a compound in which R is a cetyl group, m is 10, and n is 0 in general formula (4) described above, HLB value: 4.9)
P-210: NONION P-210 (polyoxyalkylene-based surfactant manufactured by NOF Corporation, a compound in which R is a stearyl group, m is 2, and n is 0 in general formula (4) described above, HLB value: 12.9)
E750: EMALEX E750 (polyoxyalkylene-based surfactant manufactured by Nihon Emulsion Co., Ltd., a compound in which R is a lauryl group, m is 50, and n is 0 in general formula (4) described above, HLB value: 15.6)

(pH Adjusters)
  Triethanolamine (pKa value: 7.8, boiling point: 335° C.)
  Diethanolamine (pKa value: 8.9, boiling point: 269° C.)
  28% NH₃: 28% ammonia water (ammonia pKa value: 9.3)
  DMAE: Dimethylaminoethanol (pKa value: 9.9, boiling point: 133° C.)
  CHA: Cyclohexylamine (pKa value: 10.6, boiling point: 134° C.)

(Others)
  Proxel GXL: 1,2-benzoisothiazol-3-one solution manufactured by Arch Chemicals, Inc. (preservative)

Examples 1 to 80, Comparative Examples 1 to 16

The evaluations 1 to 7 described below were conducted for the water-based inkjet inks 1 to 96 produced as described above. The evaluation results were as shown in Table 9.

TABLE 9

| | | Example | | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| | | Water-based inkjet ink No. | | | | | | | | | | | | | |
| | | 1 | 2 | 3 | 4 | 5 | 6 | 7 | 8 | 9 | 10 | 11 | 12 | 13 | 14 |
| Evaluation 1 | Dispersion stability | 3 | 3 | 3 | 3 | 2 | 3 | 3 | 3 | 3 | 3 | 3 | 3 | 2 | 3 |
| Evaluation 2 | Discharge stability | 3 | 3 | 3 | 3 | 2 | 3 | 3 | 3 | 3 | 3 | 3 | 3 | 2 | 3 |
| Evaluation 3 | Drying properties | 3 | 3 | 3 | 3 | 3 | 3 | 3 | 3 | 3 | 3 | 3 | 3 | 3 | 3 |
| Evaluation 4 | Rub fastness | 2 | 2 | 2 | 2 | 2 | 2 | 2 | 2 | 2 | 2 | 2 | 2 | 2 | 2 |
| Evaluation 5 | Image quality (coated paper) | 3 | 3 | 3 | 3 | 3 | 3 | 3 | 3 | 3 | 3 | 3 | 3 | 3 | 3 |
| Evaluation 6 | Density of printed material (coated paper) | 3 | 3 | 3 | 3 | 2 | 3 | 3 | 3 | 2 | 2 | 2 | 2 | 2 | 2 |
| Evaluation 7 | Density of printed material (high-quality paper) | 2 | 2 | 3 | 3 | 2 | 2 | 3 | 3 | 2 | 2 | 2 | 2 | 2 | 2 |

| | | Example | | | | | | | | | | | | | | | | |
|---|---|---|---|---|---|---|---|---|---|---|---|---|---|---|---|---|---|---|
| | | 15 | 16 | 17 | 18 | 19 | 20 | 21 | 22 | 23 | 24 | 25 | 26 | 27 | 28 | 29 | 30 | 31 | 32 |
| | | Water-based inkjet ink No. | | | | | | | | | | | | | | | | |
| | | 15 | 16 | 17 | 18 | 19 | 20 | 21 | 22 | 23 | 24 | 25 | 26 | 27 | 28 | 29 | 30 | 31 | 32 |
| Evaluation 1 | | 3 | 3 | 2 | 3 | 2 | 2 | 2 | 3 | 3 | 3 | 2 | 2 | 3 | 3 | 3 | 3 | 3 | 3 |
| Evaluation 2 | | 3 | 3 | 3 | 3 | 3 | 2 | 2 | 3 | 3 | 3 | 3 | 2 | 2 | 2 | 2 | 2 | 4 | 3 |
| Evaluation 3 | | 3 | 3 | 3 | 3 | 3 | 4 | 4 | 3 | 3 | 3 | 3 | 2 | 4 | 3 | 3 | 3 | 3 | 3 |
| Evaluation 4 | | 2 | 2 | 2 | 2 | 2 | 3 | 3 | 2 | 2 | 2 | 2 | 2 | 2 | 3 | 3 | 3 | 2 | 2 |
| Evaluation 5 | | 3 | 3 | 2 | 3 | 2 | 3 | 3 | 3 | 3 | 3 | 2 | 2 | 3 | 3 | 3 | 3 | 2 | 3 |
| Evaluation 6 | | 2 | 2 | 2 | 2 | 2 | 3 | 2 | 2 | 3 | 3 | 3 | 3 | 3 | 3 | 3 | 3 | 3 | 3 |
| Evaluation 7 | | 3 | 3 | 3 | 3 | 3 | 2 | 2 | 3 | 3 | 3 | 3 | 3 | 3 | 3 | 3 | 3 | 2 | 3 |

| | | Example | | | | | | | | | | | | | |
|---|---|---|---|---|---|---|---|---|---|---|---|---|---|---|---|
| | | 33 | 34 | 35 | 36 | 37 | 38 | 39 | 40 | 41 | 42 | 43 | 44 | 45 | 46 |
| | | Water-based inkjet ink No. | | | | | | | | | | | | | |
| | | 33 | 34 | 35 | 36 | 37 | 38 | 39 | 40 | 41 | 42 | 43 | 44 | 45 | 46 |
| Evaluation 1 | Dispersion stability | 3 | 2 | 3 | 3 | 2 | 3 | 3 | 3 | 2 | 2 | 2 | 3 | 2 | 2 |
| Evaluation 2 | Discharge stability | 3 | 2 | 3 | 3 | 2 | 3 | 2 | 3 | 2 | 2 | 2 | 3 | 2 | 2 |
| Evaluation 3 | Drying properties | 3 | 3 | 3 | 3 | 4 | 3 | 3 | 3 | 3 | 3 | 3 | 3 | 3 | 3 |
| Evaluation 4 | Rub fastness | 2 | 3 | 2 | 3 | 3 | 2 | 2 | 3 | 3 | 2 | 2 | 2 | 2 | 2 |
| Evaluation 5 | Image quality (coated paper) | 3 | 3 | 3 | 3 | 3 | 3 | 3 | 3 | 3 | 2 | 2 | 3 | 2 | 2 |
| Evaluation 6 | Density of printed material (coated paper) | 3 | 3 | 3 | 3 | 3 | 3 | 3 | 3 | 3 | 3 | 3 | 3 | 3 | 3 |
| Evaluation 7 | Density of printed material (high-quality paper) | 3 | 2 | 3 | 3 | 3 | 2 | 2 | 2 | 2 | 2 | 2 | 2 | 2 | 2 |

| | | Example | | | | | | | | | | | | | | | | |
|---|---|---|---|---|---|---|---|---|---|---|---|---|---|---|---|---|---|---|
| | | 47 | 48 | 49 | 50 | 51 | 52 | 53 | 54 | 55 | 56 | 57 | 58 | 59 | 60 | 61 | 62 | 63 | 64 |
| | | Water-based inkjet ink No. | | | | | | | | | | | | | | | | |
| | | 47 | 48 | 49 | 50 | 51 | 52 | 53 | 54 | 55 | 56 | 57 | 58 | 59 | 60 | 61 | 62 | 63 | 64 |
| Evaluation 1 | | 3 | 3 | 3 | 2 | 3 | 3 | 2 | 3 | 2 | 3 | 3 | 3 | 3 | 3 | 2 | 2 | 3 |
| Evaluation 2 | | 2 | 3 | 3 | 3 | 3 | 3 | 4 | 2 | 4 | 4 | 4 | 4 | 4 | 3 | 3 | 3 | 4 |
| Evaluation 3 | | 2 | 3 | 3 | 3 | 3 | 3 | 3 | 3 | 3 | 2 | 2 | 3 | 2 | 3 | 3 | 4 | 4 | 4 |

TABLE 9-continued

| | | | | | | | | | | | | | | | | | | |
|---|---|---|---|---|---|---|---|---|---|---|---|---|---|---|---|---|---|---|
| Evaluation 4 | 2 | 2 | 2 | 2 | 2 | 2 | 3 | 3 | 3 | 2 | 2 | 3 | 2 | 3 | 3 | 2 | 3 | 3 |
| Evaluation 5 | 2 | 3 | 3 | 2 | 3 | 3 | 3 | 3 | 3 | 2 | 3 | 3 | 3 | 3 | 3 | 2 | 3 | 3 |
| Evaluation 6 | 3 | 3 | 3 | 3 | 3 | 3 | 3 | 3 | 3 | 2 | 2 | 2 | 2 | 2 | 2 | 3 | 3 | 3 |
| Evaluation 7 | 2 | 2 | 2 | 2 | 2 | 2 | 2 | 2 | 2 | 2 | 2 | 2 | 2 | 2 | 2 | 3 | 3 | 3 |

| | | Example |||||||||||||
|---|---|---|---|---|---|---|---|---|---|---|---|---|---|---|
| | | 65 | 66 | 67 | 68 | 69 | 70 | 71 | 72 | 73 | 74 | 75 | 76 | 77 | 78 |
| | | Water-based inkjet ink No. |||||||||||||
| | | 65 | 66 | 67 | 68 | 69 | 70 | 71 | 72 | 73 | 74 | 75 | 76 | 77 | 78 |
| Evaluation 1 | Dispersion stability | 3 | 3 | 2 | 2 | 2 | 3 | 3 | 3 | 3 | 3 | 3 | 2 | 2 | 3 |
| Evaluation 2 | Discharge stability | 4 | 4 | 3 | 2 | 3 | 4 | 4 | 4 | 4 | 3 | 3 | 3 | 3 | 4 |
| Evaluation 3 | Drying properties | 4 | 3 | 3 | 2 | 2 | 4 | 4 | 3 | 4 | 4 | 3 | 3 | 3 | 4 |
| Evaluation 4 | Rub fastness | 3 | 2 | 2 | 2 | 2 | 3 | 3 | 3 | 3 | 3 | 3 | 3 | 3 | 3 |
| Evaluation 5 | Image quality (coated paper) | 3 | 3 | 3 | 3 | 3 | 3 | 3 | 3 | 4 | 3 | 3 | 3 | 3 | 4 |
| Evaluation 6 | Density of printed material (coated paper) | 3 | 3 | 3 | 3 | 3 | 3 | 3 | 3 | 3 | 3 | 3 | 3 | 3 | 3 |
| Evaluation 7 | Density of printed material (high-quality paper) | 2 | 2 | 2 | 2 | 2 | 3 | 2 | 2 | 3 | 2 | 2 | 2 | 2 | 3 |

| | | Example || Comparative Example |||||||||||||||
|---|---|---|---|---|---|---|---|---|---|---|---|---|---|---|---|---|---|---|
| | | 79 | 80 | 1 | 2 | 3 | 4 | 5 | 6 | 7 | 8 | 9 | 10 | 11 | 12 | 13 | 14 | 15 | 16 |
| | | Water-based inkjet ink No. ||||||||||||||||||
| | | 79 | 80 | 81 | 82 | 83 | 84 | 85 | 86 | 87 | 88 | 89 | 90 | 91 | 92 | 93 | 94 | 95 | 96 |
| Evaluation 1 | | 3 | 3 | 2 | 2 | 2 | 2 | 2 | 2 | 2 | 2 | 2 | 1 | 2 | 1 | 3 | 3 | 2 | 2 |
| Evaluation 2 | | 4 | 4 | 2 | 1 | 2 | 2 | 2 | 1 | 1 | 1 | 1 | 3 | 1 | 2 | 4 | 1 | 4 | 4 |
| Evaluation 3 | | 4 | 4 | 3 | 3 | 3 | 3 | 3 | 3 | 3 | 3 | 3 | 2 | 4 | 3 | 2 | 2 | 1 | 1 |
| Evaluation 4 | | 3 | 3 | 2 | 2 | 2 | 2 | 2 | 2 | 2 | 2 | 2 | 2 | 3 | 2 | 1 | 2 | 1 | 1 |
| Evaluation 5 | | 4 | 4 | 3 | 3 | 3 | 3 | 3 | 3 | 3 | 3 | 3 | 2 | 2 | 2 | 1 | 2 | 2 | 2 |
| Evaluation 6 | | 3 | 3 | 2 | 2 | 2 | 2 | 1 | 2 | 2 | 2 | 2 | 2 | 2 | 2 | 2 | 2 | 2 | 2 |
| Evaluation 7 | | 3 | 3 | 1 | 1 | 1 | 1 | 1 | 1 | 1 | 1 | 1 | 1 | 1 | 1 | 1 | 1 | 1 | 1 |

<Evaluation 1: Evaluation of Dispersion Stability>

The average secondary particle size (D50) of pigments in the water-based inkjet inks 1 to 96 produced as described above was measured at 25° C. using a Nanotrac UPA EX-150 manufactured by MicrotracBEL Corporation. The ink was stored in a thermostatic chamber at 70° C. and subjected to accelerated aging for a predetermined period, after which the D50 was once again measured at 25° C. and the change over the storage period was confirmed, thereby evaluating the dispersion stability. The evaluation criteria were as follows, with evaluations of 2 and 3 being deemed practically usable levels.

3: the change in D50 after storage for 2 weeks was less than ±5%
2: the change in D50 after storage for 1 week was less than ±5%, but the change in viscosity after storage for 2 weeks was ±5% or more
1: the change in D50 after storage for 1 week was ±5% or more <Evaluation 2: Evaluation of Discharge Stability>

An inkjet head KJ4B-QA (manufactured by Kyocera Corporation, design resolution: 600 dpi) was installed above a conveyor capable of conveying a recording medium, and filled with the water-based inkjet inks 1 to 96 produced as described above. After printing a nozzle check pattern and confirming that there were no nozzle misfires, the inkjet head was left on standby for a predetermined time in a 25° C. environment. Thereafter, the nozzle check pattern was printed once again and the number of nozzle misfires was counted, thereby evaluating the discharge stability. The evaluation criteria were as follows, with evaluations of 2 to 4 being deemed practically usable levels.

4: even after standby for 3 hours, absolutely no nozzle misfires occurred
3: absolutely no nozzle misfires occurred even after standby for 2 hours, but one or more nozzle misfires occurred after standby for 3 hours
2: absolutely no nozzle misfires occurred even after standby for 1 hour, but one or more nozzle misfires occurred after standby for 2 hours
1: one or more nozzle misfires occurred after standby for 1 hour <Evaluation 3: Evaluation of Drying Properties>

The inkjet printing device used in Evaluation 2 was filled with the water-based inkjet inks 1 to 96 produced as described above, and then a solid image (print ratio: 100%) was printed on OPU-1 (biaxially stretched polypropylene film, thickness: 20 μm) manufactured by Mitsui Chemicals Tohcello, Inc., at a drop volume of 12 pL, and the printed material was placed in a 50° C. air oven within 10 seconds. Then, the printed material was taken out after each predetermined period of time, and whether or not ink could be removed by rubbing the surface with a finger was visually observed to thereby evaluate the drying properties. The evaluation criteria were as follows, with evaluations of 2 to 4 being deemed practically usable levels.

4: no ink was removed from the printed surface even when the printed material was rubbed with a finger after a drying time of 30 seconds
3: ink was removed from the printed surface when the printed material was rubbed with a finger after a drying time of 30 seconds, but no ink was removed from the printed surface when rubbed after 45 seconds
2: ink was removed from the printed surface when the printed material was rubbed with a finger after a drying time of 45 seconds, but no ink was removed from the printed surface when rubbed after 1 minute 1: ink did not dry even after a drying time of 1 minute, and ink was removed from the printed surface when the printed material was rubbed with a finger <Evaluation 4: Evaluation of Rub Fastness>

The inkjet printing device used in Evaluation 2 was filled with the water-based inkjet inks 1 to 96 produced as described above, and then a solid image (print ratio: 100%) was printed on OK Topcoat+ (coated paper, basis weight: 104.7 g/m$^2$) manufactured by Oji Paper Co., Ltd., at a drop volume of 12 pL, and the printed material was placed in a 70° C. air oven within 10 seconds. The printed material was taken out of the oven after drying for 1 minute, and whether or not ink could be removed by rubbing the printed material a predetermined number of times with a white cotton fabric for testing (unbleached muslin No. 3) while applying a load of 200 g was visually observed to thereby evaluate the rub fastness. The evaluation criteria were as follows, with evaluations of 2 and 3 being deemed practically usable levels.

3: no damage to the printed surface or peeling of ink was observed even after rubbing 20 times 2: no damage to the printed surface or peeling of ink was observed even after rubbing 10 times, but damage to the printed surface or peeling of ink was observed when rubbing was performed 20 times 1: damage to the printed surface or peeling of ink was observed when rubbing was performed 10 times <Evaluation 5: Evaluation of Image Quality (Coated Paper)>

The inkjet printing device used in Evaluation 2 was filled with the water-based inkjet inks 1 to 96 produced as described above, and then a gradation patch image in which the print ratio was altered in 10% increments between print ratios of 10 to 80% was printed on OK Topcoat+(coated paper, basis weight 104.7 g/m$^2$) manufactured by Oji Paper Co., Ltd., at a drop volume of 12 pL, and the printed material was placed in a 70° C. air oven within 10 seconds. The printed material was taken out of the oven after drying for 1 minute, and whether or not there were density irregularities was visually observed to thereby evaluate the image quality with respect to coated paper. The evaluation criteria were as follows, with evaluations of 2 to 4 being deemed practically usable levels.

4: no density irregularities were observed at any of the print ratios

3: no density irregularities were observed at a print ratio of 70% or less

2: no density irregularities were observed at a print ratio of 60% or less

1: density irregularities were clearly observed at a print ratio of 60%

<Evaluation 6: Evaluation of Density of Printed Material (Coated Paper)>

The inkjet printing device used in Evaluation 2 was filled with the water-based inkjet inks 1 to 96 produced as described above, and then a solid image (print ratio: 100%) was printed on OK Topcoat+(coated paper, basis weight: 104.7 g/m$^2$) manufactured by Oji Paper Co., Ltd., at a drop volume of 12 pL, and the printed material was placed in a 70° C. air oven within 10 seconds. The printed material was taken out of the oven after drying for 1 minute, and the optical density (OD value) was measured using a spectral densitometer (eXact manufactured by X-Rite Inc.). Note that the light source was D50, the viewing angle was 2°, the density status was ISO Status T, and the density white reference was an absolute value. The evaluation criteria were as follows, with evaluations of 2 and 3 being deemed practically usable levels.

3: OD value of 0.95 or more
2: OD value of 0.90 or more
1: OD value of less than 0.90

<Evaluation 7: Evaluation of Density of Printed Material (High-Quality Paper)>

The inkjet printing device used in Evaluation 2 was filled with the water-based inkjet inks 1 to 96 produced as described above, and then a solid image (print ratio: 100%) was printed on OK Prince (high-quality paper) manufactured by Oji Paper Co., Ltd., at a drop volume of 12 pL, and the printed material was placed in a 70° C. air oven within 10 seconds. The printed material was taken out of the oven after drying for 1 minute, and the optical density (OD value) was measured using a spectral densitometer (eXact manufactured by X-Rite Inc.). The evaluation criteria were as follows, with evaluations of 2 and 3 being deemed practically usable levels.

3: OD value of 0.95 or more
2: OD value of 0.90 or more
1: OD value of less than 0.90

As a result of the evaluation, it was confirmed that the water-based inkjet inks 1 to 80, which contain a binder resin having an acid value of 1 to 80 mgKOH/g, a surfactant, and a water-soluble organic solvent, and additionally contain 8% by mass or less of a water-soluble organic solvent having a boiling point of 240° C. or more, have practically usable quality in terms of all of dispersion stability, discharge stability, drying properties, printed material rub fastness, image quality, and printed material density.

The water-based inkjet inks 1 to 13 and 81 to 89 are systems in which the type of colorant used is altered. In the water-based inkjet inks 1 to 13, which contain a mixed crystal pigment composed of two or more naphthol-based pigments as the aforementioned colorant, all items evaluated were of a practically usable level. In particular, for the water-based inkjet inks 2 to 4, 7, and 8, dispersion stability, discharge stability, drying properties, image quality, and printed material density were all evaluated as 3 points, confirming that they have particularly excellent quality. Meanwhile, the water-based inkjet inks 81 to 89, which do not contain a mixed crystal pigment composed of two or more naphthol-based pigments, were not of a practically usable level regarding printed material density on high-quality paper, and depending on the pigment used, also had poor results for dispersion stability and/or discharge stability.

Furthermore, from among the water-based inkjet inks 24, 38 to 46, and 51 to 55 that were evaluated by altering the type of surfactant used, the water-based inkjet inks 53 and 55, in which two or more surfactants were used in combination including a siloxane-based surfactant, with the HLB value of one of the two or more surfactants being 0 to 5 and the HLB value of another one surfactant being 6 to 18, had a discharge stability of level 4 and an image quality and density on coated paper each of level 3, and were confirmed as being particularly excellent compared to when the surfactants were used alone.

Examples 81 to 156

As mentioned above, when used with respect to non-permeable substrates typified by plastic substrates, it is preferable to include a binder resin (a-1) that has a glass transition temperature of 45° C. or less, and/or is selected from the group consisting of urethane resins, urethane/acrylic composite resins, and polyolefin resins. Therefore, from among the water-based inks containing a binder resin meeting the aforementioned conditions, the water-based inkjet inks 1 to 13 and 18 to 80 were also subjected to evaluations 8 and 9 described below to be evaluated for image quality and adhesion with respect to non-permeable substrates. Note that the results were as shown in Table 10.

and the printed material was placed in a 70° C. air oven within 10 seconds. After drying for one minute, the printed

TABLE 10

| | | Example | | | | | | | | | | | | |
|---|---|---|---|---|---|---|---|---|---|---|---|---|---|---|
| | | 81 | 82 | 83 | 84 | 85 | 86 | 87 | 88 | 89 | 90 | 91 | 92 | 93 |
| | | Water-based inkjet ink No. | | | | | | | | | | | | |
| | | 1 | 2 | 3 | 4 | 5 | 6 | 7 | 8 | 9 | 10 | 11 | 12 | 13 |
| Evaluation 8 | Image quality (film) | 2 | 2 | 2 | 2 | 2 | 2 | 2 | 2 | 2 | 2 | 2 | 2 | 2 |
| Evaluation 9 | Adhesion to film | 2 | 2 | 2 | 2 | 2 | 2 | 2 | 2 | 2 | 2 | 2 | 2 | 2 |

| | Example | | | | | | | | | | | |
|---|---|---|---|---|---|---|---|---|---|---|---|---|
| | 94 | 95 | 96 | 97 | 98 | 99 | 100 | 101 | 102 | 103 | 104 | 105 | 106 |
| | Water-based inkjet ink No. | | | | | | | | | | | |
| | 18 | 19 | 20 | 21 | 22 | 23 | 24 | 25 | 26 | 27 | 28 | 29 | 30 |
| Evaluation 8 | 3 | 2 | 2 | 3 | 3 | 2 | 3 | 3 | 3 | 3 | 3 | 3 | 3 |
| Evaluation 9 | 4 | 3 | 2 | 4 | 4 | 2 | 4 | 4 | 4 | 2 | 4 | 4 | 4 |

| | | Example | | | | | | | | | | |
|---|---|---|---|---|---|---|---|---|---|---|---|---|
| | | 107 | 108 | 109 | 110 | 111 | 112 | 113 | 114 | 115 | 116 | 117 |
| | | Water-based inkjet ink No. | | | | | | | | | | |
| | | 31 | 32 | 33 | 34 | 35 | 36 | 37 | 38 | 39 | 40 | 41 |
| Evaluation 8 | Image quality (film) | 2 | 3 | 3 | 3 | 3 | 2 | 2 | 3 | 2 | 3 | 3 |
| Evaluation 9 | Adhesion to film | 7 | 3 | 4 | 4 | 3 | 4 | 3 | 4 | 4 | 4 | 4 |

| | Example | | | | | | | | | | | | |
|---|---|---|---|---|---|---|---|---|---|---|---|---|---|
| | 118 | 119 | 120 | 121 | 122 | 123 | 124 | 125 | 126 | 127 | 128 | 129 | 130 | 131 |
| | Water-based inkjet ink No. | | | | | | | | | | | | |
| | 42 | 43 | 44 | 45 | 46 | 47 | 48 | 49 | 50 | 51 | 52 | 53 | 54 | 55 |
| Evaluation 8 | 2 | 2 | 3 | 2 | 2 | 2 | 3 | 3 | 2 | 3 | 3 | 3 | 3 | 3 |
| Evaluation 9 | 4 | 4 | 4 | 4 | 4 | 4 | 4 | 4 | 3 | 4 | 4 | 4 | 4 | 4 |

| | | Example | | | | | | | | | |
|---|---|---|---|---|---|---|---|---|---|---|---|
| | | 132 | 133 | 134 | 135 | 136 | 137 | 138 | 139 | 140 | 141 | 142 |
| | | Water-based inkjet ink No. | | | | | | | | | |
| | | 56 | 57 | 58 | 59 | 60 | 61 | 62 | 63 | 64 | 65 | 66 |
| Evaluation 8 | Image quality (film) | 2 | 2 | 3 | 2 | 3 | 3 | 3 | 3 | 3 | 3 | 3 |
| Evaluation 9 | Adhesion to film | 3 | 4 | 4 | 4 | 4 | 4 | 3 | 4 | 4 | 4 | 4 |

| | Example | | | | | | | | | | | | |
|---|---|---|---|---|---|---|---|---|---|---|---|---|---|
| | 143 | 144 | 145 | 146 | 147 | 148 | 149 | 150 | 151 | 152 | 153 | 154 | 155 | 156 |
| | Water-based inkjet ink No. | | | | | | | | | | | | |
| | 67 | 68 | 69 | 70 | 71 | 72 | 73 | 74 | 75 | 76 | 77 | 78 | 79 | 80 |
| Evaluation 8 | 3 | 2 | 2 | 3 | 3 | 2 | 3 | 2 | 2 | 2 | 2 | 4 | 4 | 4 |
| Evaluation 9 | 4 | 4 | 4 | 4 | 4 | 3 | 4 | 4 | 4 | 4 | 4 | 4 | 4 | 4 |

<Evaluation 8: Evaluation of Image Quality (Film)>

The image quality with respect to film was evaluated using the same method and evaluation criteria as in Evaluation 5 described above, with the exception that OPU-1 (biaxially stretched polypropylene film, thickness: 20 μm) manufactured by Mitsui Chemicals Tohcello, Inc. was used as a recording medium.

<Evaluation 9: Evaluation of Adhesion>

The inkjet printing device used in Evaluation 2 was filled with the water-based inkjet inks 1 to 13 and 18 to 80 produced as described above, and then a solid image (print ratio: 100%) was printed on OPU-1 (biaxially stretched polypropylene film, thickness: 20 μm) manufactured by Mitsui Chemicals Tohcello, Inc., at a drop volume of 12 pL, and the printed material was placed in a 70° C. air oven within 10 seconds. After drying for one minute, the printed material was removed from the oven, and cellophane tape (width: 18 mm) manufactured by Nichiban Co., Ltd. was firmly affixed to the surface of the printed material with the pad of a finger. Then, holding the tip end of the cellophane tape, the tape was instantaneously peeled off while maintaining a 45-degree angle, after which the surface of the printed material was visually observed to thereby evaluate adhesion. The evaluation criteria were as follows, with evaluations of 2 to 4 being deemed practically usable levels.

4: the ratio of the peeled area with respect to the area where the cellophane tape was affixed was less than 10%

3: the ratio of the peeled area with respect to the area where the cellophane tape was affixed was 10% or more and less than 20%

2: the ratio of the peeled area with respect to the area where the cellophane tape was affixed was 20% or more and less than 30%

1: the peeled area with respect to the cellophane tape adhesion surface was 30% or more As a result of the evaluation, it was confirmed that water-based inkjet inks 1 to 13 and 18 to 80 all have excellent image quality and adhesion with respect to polypropylene film.

The disclosure of the present application is related to the subject matter described in Japanese Patent Application No. 2020-091677 filed on May 26, 2020, the entire disclosed content of which is incorporated herein by reference.

The invention claimed is:

1. A water-based inkjet ink comprising a colorant, a binder resin (A), a surfactant, and a water-soluble organic solvent, wherein
the colorant includes a mixed crystal pigment containing two or more naphthol-based azo pigments,
the binder resin (A) includes a binder resin (a-1) having an acid value of 1 to 80 mgKOH/g,
the binder resin (a-1) includes a polyolefin resin, and at least one type of resin selected from the group consisting of a (meth)acrylic resin and a styrene-(meth)acrylic resin, and
an amount of a water-soluble organic solvent having a boiling point of 240° C. or more at 1 atmosphere is 8% by mass or less relative to a total amount of the water-based inkjet ink.

2. The water-based inkjet ink according to claim 1, wherein the water-soluble organic solvent includes an alkanediol of 2 to 5 carbon atoms.

3. The water-based inkjet ink according to claim 1, wherein a total amount of a nitrogen-containing compound having a pKa value of 2 or less at 25° C. and a nitrogen-containing compound having a pKa value of 10 or more at 25° C. is 3% by mass or less relative to a total amount of the water-based inkjet ink.

4. The water-based inkjet ink according to claim 1, wherein the two or more naphthol-based azo pigments include a compound having a structure represented by general formula (1) shown below, General formula (1):

[Chemical formula 1]

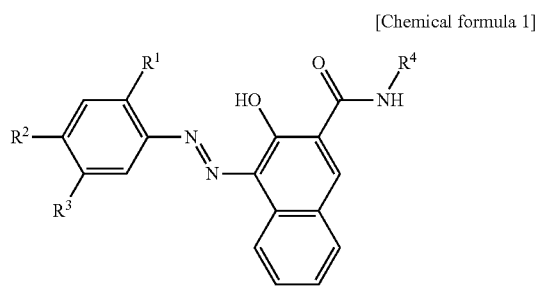

wherein, in general formula (1), $R^1$, $R^2$, and $R^3$ are each independently any one of a hydrogen atom, an alkyl group of 1 to 2 carbon atoms, an alkoxy group of 1 to 2 carbon atoms, an anilide group, a carbamoyl group, a methoxycarbonyl group, an ethoxycarbonyl group, an amino group, a nitro group, a sulfonamide group, a methylaminosulfonyl group, or an ethylaminosulfonyl group, and $R^4$ is any one of a hydrogen atom, an alkyl group of 1 to 2 carbon atoms, or a group having a structure represented by general formula (2) shown below, General formula (2):

[Chemical formula 2]

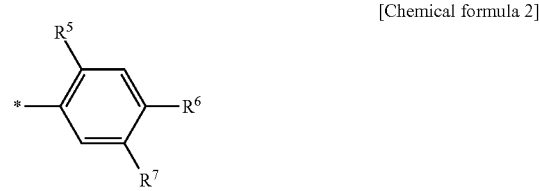

wherein, in general formula (2), $R^5$ is any one of a hydrogen atom, a chlorine atom, a bromine atom, an alkyl group of 1 to 2 carbon atoms, an alkoxy group of 1 to 2 carbon atoms, an amino group, or a nitro group,
$R^6$ and $R^7$ are each independently any one of a hydrogen atom, a chlorine atom, a bromine atom, an alkyl group of 1 to 2 carbon atoms, an alkoxy group of 1 to 2 carbon atoms, an amino group, or a nitro group, or $R^6$ and $R^7$ are bonded to each other to form an imidazolidinone ring, and
a position of * is a bonding site.

5. The water-based inkjet ink according to claim 1, wherein the two or more naphthol-based azo pigments include a compound having a structure represented by general formula (3) shown below, General formula (3):

[Chemical formula 3]

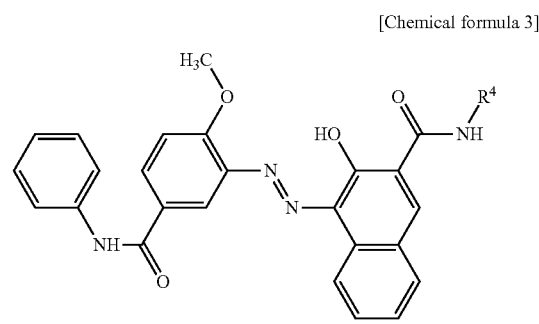

wherein, in general formula (3), $R^4$ is any one of a hydrogen atom, an alkyl group of 1 to 2 carbon atoms, or a group having a structure represented by general formula (2) shown below, General formula (2):

[Chemical formula 4]

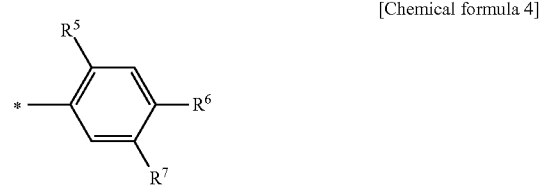

wherein, in general formula (2), $R^5$ is any one of a hydrogen atom, a chlorine atom, a bromine atom, an alkyl group of 1 to 2 carbon atoms, an alkoxy group of 1 to 2 carbon atoms, an amino group, or a nitro group,
$R^6$ and $R^7$ are each independently any one of a hydrogen atom, a chlorine atom, a bromine atom, an alkyl group of 1 to 2 carbon atoms, an alkoxy group of 1 to 2 carbon atoms, an amino group, or a nitro group, or $R^6$ and $R^7$ are bonded to each other to form an imidazolidinone ring, and a position of * is a bonding site.

6. The water-based inkjet ink according to claim 1, wherein the two or more naphthol-based azo pigments include C.I. Pigment Red 150.

7. The water-based inkjet ink according to claim 1, wherein the two or more naphthol-based azo pigments include 10 to 80% by mole of C.I. Pigment Red 150 in a total amount of the naphthol-based pigments.

8. A method for producing an inkjet printed material comprising discharging and applying the water-based inkjet ink according to claim 1 from an inkjet head onto a recording medium.

9. A water-based inkjet ink comprising a colorant, a binder resin (A), a surfactant, and a water-soluble organic solvent, wherein the colorant includes a mixed crystal pigment containing two or more naphthol-based azo pigments, the two or more naphthol-based azo pigments include 10 to 80% by mole of C.I. Pigment Red 150 in a total amount of the naphthol-based pigments, the binder resin (A) includes a binder resin (a-1) having an acid value of 1 to 80 mgKOH/g, and an amount of a water-soluble organic solvent having a boiling point of 240° C. or more at 1 atmosphere is 8% by mass or less relative to a total amount of the water-based inkjet ink.

10. The water-based inkjet ink according to claim 9, wherein the binder resin (a-1) includes at least one type of resin selected from the group consisting of a (meth)acrylic resin, a styrene-(meth)acrylic resin, a urethane resin, a urethane-(meth)acrylic composite resin, and a polyolefin resin.

* * * * *